US012613717B2

(12) United States Patent (10) Patent No.: US 12,613,717 B2
Yang et al. (45) Date of Patent: Apr. 28, 2026

(54) DISPLAY METHOD FOR CARD COMPONENT, GRAPHICAL USER INTERFACE, AND RELATED APPARATUS

(71) Applicant: Huawei Technologies Co., Ltd., Shenzhen (CN)

(72) Inventors: Shishu Yang, Shenzhen (CN); Yue Hu, Shenzhen (CN); Kai Zhang, Shenzhen (CN); Miao Wang, Shenzhen (CN); Xuejiao Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

(21) Appl. No.: 18/548,837

(22) PCT Filed: Mar. 4, 2022

(86) PCT No.: PCT/CN2022/079357
§ 371 (c)(1),
(2) Date: Sep. 1, 2023

(87) PCT Pub. No.: WO2022/184173
PCT Pub. Date: Sep. 9, 2022

(65) Prior Publication Data
US 2024/0176628 A1 May 30, 2024

(30) Foreign Application Priority Data
Mar. 5, 2021 (CN) .......................... 202110245839.1

(51) Int. Cl.
G06F 9/451 (2018.01)
G06F 3/04817 (2022.01)
(Continued)

(52) U.S. Cl.
CPC .......... G06F 9/451 (2018.02); G06F 3/04817 (2013.01); G06F 3/0483 (2013.01);
(Continued)

(58) Field of Classification Search
CPC .... G06F 9/451; G06F 3/04817; G06F 3/0483; G06F 3/0486; G06F 3/0488; G06F 3/0482; G06F 3/04883; G06F 3/04886
See application file for complete search history.

(56) References Cited

U.S. PATENT DOCUMENTS 10,496,258 B2 * 12/2019 Sato .................... G06F 3/04842
2013/0007666 A1 1/2013 Song et al.
(Continued)

FOREIGN PATENT DOCUMENTS

CN 102929479 A 2/2013
CN 103034445 A 4/2013
(Continued)

*Primary Examiner* — Phuong H Nguyen
(74) *Attorney, Agent, or Firm* — Slater Matsil, LLP

(57) ABSTRACT

A display method includes-temporarily displaying, by an electronic device in a floating manner, a card component corresponding to a first application in response to a sliding operation. When the electronic device receives an input for another area other than the card component on the desktop, the electronic device may disable displaying a temporarily displayed card component. When the electronic device receives an input for adding the card component, the electronic device may add the card component on the desktop.

20 Claims, 83 Drawing Sheets

(51) Int. Cl.
    *G06F 3/0483* (2013.01)
    *G06F 3/0486* (2013.01)
    *G06F 3/0488* (2022.01)
    *G06F 3/0482* (2013.01)

(52) U.S. Cl.
    CPC .......... *G06F 3/0486* (2013.01); *G06F 3/0488*
              (2013.01); *G06F 3/0482* (2013.01)

(56) References Cited

U.S. PATENT DOCUMENTS

| | | | |
|---|---|---|---|
| 2020/0264742 A1 | 8/2020 | Wang | |
| 2021/0286510 A1* | 9/2021 | Tyler ..................... | G06F 3/0486 |
| 2022/0279064 A1* | 9/2022 | Hu ................... | H04M 1/72454 |
| 2023/0077467 A1* | 3/2023 | Xu ........................ | G06F 3/0481 |
| | | | 715/835 |

FOREIGN PATENT DOCUMENTS

| | | | |
|---|---|---|---|
| CN | 104142798 A | 11/2014 | |
| CN | 106201208 A | 12/2016 | |
| CN | 107092421 A | 8/2017 | |
| CN | 111966251 A | 11/2020 | |

\* cited by examiner

521

Name 3

521

Name 3

Top

Top

Bottom

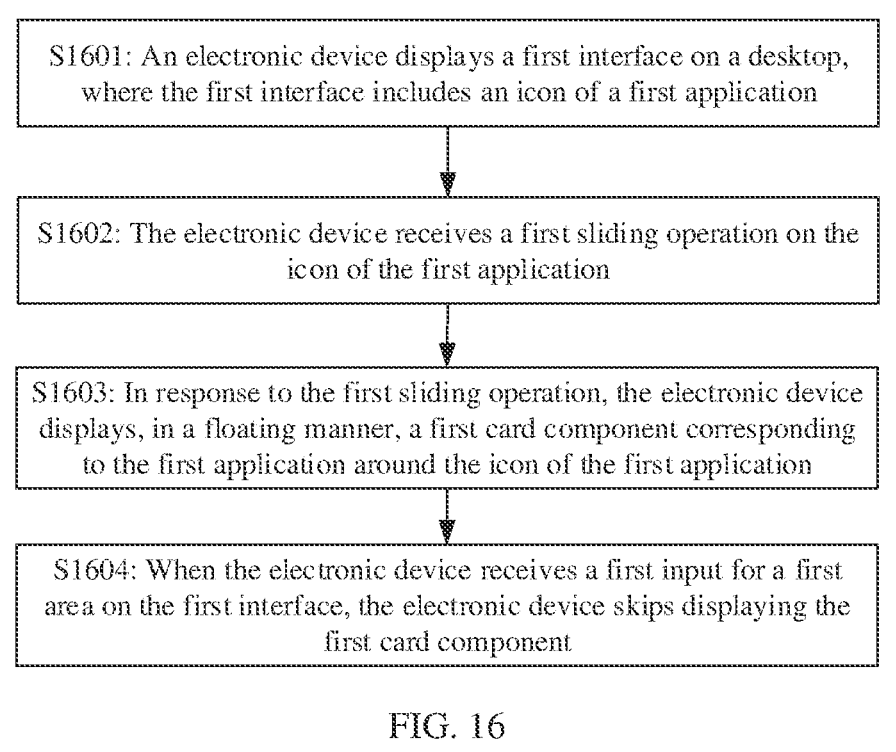

S1601: An electronic device displays a first interface on a desktop, where the first interface includes an icon of a first application S1602: The electronic device receives a first sliding operation on the icon of the first application S1603: In response to the first sliding operation, the electronic device displays, in a floating manner, a first card component corresponding to the first application around the icon of the first application S1604: When the electronic device receives a first input for a first area on the first interface, the electronic device skips displaying the first card component

FIG. 16

DISPLAY METHOD FOR CARD COMPONENT, GRAPHICAL USER INTERFACE, AND RELATED APPARATUS

CROSS-REFERENCE TO RELATED APPLICATIONS

This application is a national stage of International Application No. PCT/CN2022/079357, filed on Mar. 4, 2022, which claims priority to Chinese Patent Application No. 202110245839.1, filed on Mar. 5, 2021. Both of the aforementioned applications are hereby incorporated by reference in their entireties.

TECHNICAL FIELD

This application relates to the field of man-machine interaction technologies, and in particular, to a display method for a card component, a graphical user interface, and a related apparatus.

BACKGROUND

With continuous development of communication technologies, electronic devices (such as a smartphone) become increasingly popular and diversified, and more attention is paid to availability and friendliness of a man-machine interaction interface for interaction between an electronic device and a user. A desktop of the electronic device is an operation entry and an important interface carrier of an application on the electronic device of the user. A conventional desktop of a terminal is designed to arrange and display applications in a form of small icons in a grid. In addition to the application icons, the conventional desktop further allows the user to add widgets (widgets) of the applications to the desktop. The widget may display display information of the application. The user may trigger, by tapping the widget, the electronic device to directly display an application interface corresponding to the display information.

Currently, a conventional widget has a unified entry and library. A user may touch-and-hold a blank area on a desktop of an electronic device, to trigger the electronic device to display a widget control. After the user taps the widget control, the electronic device may display a widget library interface including a plurality of widgets. The user may select a widget and drag the widget to an area on the desktop of the electronic device. If an application icon exists in the area, the electronic device moves the application icon in the area to another location on the desktop. However, the foregoing steps of adding the widget are cumbersome.

SUMMARY

This application provides a display method for a card component, a graphical user interface, and a related apparatus, to quickly trigger, on a desktop through an input operation of a user, an electronic device to display a card component corresponding to an application, so that the user may quickly view the card component, and a display layout of application icons or card components on the desktop is not disrupted.

According to a first aspect, this application provides a display method for a card component, including: An electronic device displays a first interface on a desktop, where the first interface includes an icon of a first application. The electronic device receives a first sliding operation on the icon of the first application. In response to the first sliding operation, the electronic device displays, in a floating manner, a first card component corresponding to the first application around the icon of the first application. The first card component includes first display information of a first function in the first application. When the electronic device receives a first input for a first area on the first interface, the electronic device skips displaying the first card component. The first area does not overlap with a display area of the first card component.

This application provides the display method for a card component. The electronic device may temporarily display, in a floating manner, a card component corresponding to the first application around the icon of the first application in response to a sliding operation (for example, upward sliding) performed by a user on the icon of the first application on the desktop, where display information of the first function in the first application is displayed on the card component. When the electronic device receives an input for another area other than the card component on the desktop, the electronic device may disable displaying the temporarily displayed card component. In this way, the electronic device may be quickly triggered, on the desktop through an input operation of the user, to display a card component corresponding to an application, so that the user may quickly view the card component, and a display layout of application icons or card components on the desktop is not disrupted.

In a possible implementation, the electronic device adds and displays the first card component on the desktop when the electronic device receives a second input. After the card component is fixedly added to a blank area on the desktop, if the electronic device receives an input by the user for another blank area, in this way, the user may quickly find, from the application icon, the card component corresponding to the application icon, or may quickly and fixedly add the temporarily displayed card component to the desktop.

The electronic device may add and display the first card component in a blank area on the first interface on the desktop. Before the first card component is added and displayed to the blank area on the first interface, no interface element such as an application icon, an application folder, a card component, or a text is displayed in the blank area on the first interface.

Optionally, the electronic device may add and display the first card component in a blank area on a second interface on the desktop. Before the first card component is added and displayed to the blank area on the second interface, no interface element such as an application icon, an application folder, a card component, or a text is displayed in the blank area on the second interface.

Optionally, the electronic device may newly create a third interface on the desktop, and add and display the first card component on the third interface. The third interface may be newly created on a left page of the first interface, or newly created on a right page of the first interface. This is not limited.

In a possible implementation, when displaying the first card component on the first interface on the desktop in response to the first sliding operation, the electronic device may further display a first fixed control corresponding to the first card component. The second input may be an input for the first fixed control.

In a possible implementation, a process in which the electronic device adds and displays the first card component on the desktop through the received second input may be: The electronic device may receive a first drag operation on the first card component; and when the electronic device drags the first card component to a second area on the desktop through the first drag operation, the electronic device adds and displays the first card component in the second area on the desktop. In this way, the user may add the card component that is temporarily displayed to a specified placement location on the desktop through one operation. This simplifies an operation step of adding the card component to the specified placement location on the desktop by the user.

The electronic device may further display a cancellation hot area on the desktop in a process of the first drag operation. When the electronic device drags the first card component to the cancellation hot area through the first drag operation, the electronic device cancels adding and displaying of the first card component on the desktop. In this way, in a process in which the user adds the temporarily displayed card component to the desktop through a drag operation, there may be an opportunity to cancel the return.

In a possible implementation, when a fifth card component is displayed in the second area, the electronic device may display a second card stacking component in the second area, where the second card stacking component includes the first card component and the fifth card component. In this way, a plurality of card components may be combined into one card stacking component and placed on the desktop. This saves use space on the desktop.

In a possible implementation, a process in which the electronic device adds and displays the first card component on the desktop through the received second input may be: The electronic device receives a first touch-and-hold operation on the first card component; the electronic device displays a second fixed control in response to the first touch-and-hold operation; the electronic device receives a fourth input for the second fixed control; and in response to the fourth input, the electronic device adds and displays the first card component on the desktop.

In a possible implementation, when the electronic device receives a third input for the first card component, the electronic device displays a fourth interface corresponding to the first function in the first application. In this way, the user may directly trigger, through the first card component, the electronic device to directly jump to display an interface of the first function in the first application. This simplifies an operation of opening the interface of the first function by the user.

In a possible implementation, the first card component further displays and includes a first control. The electronic device receives a fifth input for the first control. In response to the fifth input, the electronic device controls the first application to perform a first control operation corresponding to the first control. In this way, the user directly controls, on the first card component, the first application to perform some control operations, without first invoking a control interface of these control operations, and then triggers the first application to perform these control operations. This simplifies operations performed by the user.

In a possible implementation, after the electronic device adds and displays the first card component on the desktop, the electronic device may receive a second drag operation of dragging the first card component displayed in the second area on the desktop to a third area on the desktop. The electronic device places the first card component from the second area to the third area in response to the second drag operation. In this way, it may be convenient for the user to adjust a display location of the card component on the desktop. This improves user experience.

In a possible implementation, after the electronic device adds and displays the first card component on the desktop, the electronic device receives a third drag operation on the first card component. The electronic device displays a deletion hot area on the desktop in a process of the third drag operation, where an end location of the third drag operation is in the deletion hot area. The electronic device removes the first card component from the desktop in response to the third drag operation. In this way, when the user does not want the card component that has been added on the desktop, the card component may be manually deleted.

In a possible implementation, after the electronic device adds and displays the first card component on the desktop, the electronic device may receive the second touch-and-hold operation on the first card component. The electronic device may display a removal control corresponding to the first card component in response to the second touch-and-hold operation. After the electronic device receives a sixth input for the removal control, the electronic device removes the first card component from the desktop. In this way, when the user does not want the card component that has been added on the desktop, the card component may be manually deleted.

In a possible implementation, after the electronic device displays, in a floating manner around an area of the icon of the first application, the first card component corresponding to the first application, the electronic device displays the first interface on the desktop after receiving a seventh input of switching, by a user, the first card component corresponding to the first application to a second card component. The electronic device receives a second sliding operation on the icon of the first application. In response to the second sliding operation, the electronic device displays, in a floating manner, the second card component corresponding to the first application around the icon of the first application, where a style of the second card component is different from a style of the first card component. In this way, the user may be allowed to select a favorite style of the card component.

In a possible implementation, after the electronic device displays, in a floating manner around the area of the icon of the first application, the first card component corresponding to the first application, the electronic device displays the first interface on the desktop after receiving an eighth input of switching, by a user, the first display information displayed in the first card component to the second display information. The electronic device receives a third sliding operation on the icon of the first application; and in response to the third sliding operation, the electronic device displays, in a floating manner, the first card component corresponding to the first application around the icon of the first application, and displays the second display information on the first card component. In this way, it is convenient for the user to switch display content in the card component.

In a possible implementation, the first interface further includes an application folder, the application folder includes an icon of a second application and an icon of a third application, and the electronic device may receive a fourth sliding operation on the application folder. In response to the fourth sliding operation, the electronic device displays, in a floating manner, a first card stacking component corresponding to the application folder around the application folder, where the first card stacking component includes a third card component corresponding to the second application and a fourth card component corresponding to the third application. The third card component and the fourth card component may be switched to be displayed on the first card stacking component. In this way, use space on the interface may be saved.

In embodiments of this application, when the electronic device displays, in a floating manner, the first card component corresponding to the first application around the icon of the first application, the electronic device skipping displaying an application name of an application icon covered by the first card component, and/or the application icon covered by the first card component.

According to a second aspect, this application provides an electronic device, including one or more processors, a display screen, and one or more memories. The display screen and one or more memories are coupled to one or more processors, the one or more memories are configured to store computer program code, and the computer program code includes computer instructions; and when the one or more processors execute the computer instructions, the electronic device is enabled to perform the display method for the card component in any possible implementation of any one of the foregoing aspects.

According to a third aspect, embodiments of this application provide a computer storage medium, including computer instructions. When the computer instructions are run on an electronic device, the electronic device is enabled to perform the display method for the card component in any possible implementation of any one of the foregoing aspects.

According to a fourth aspect, embodiments of this application provide a computer program product. When the computer program product runs on a computer, the computer is enabled to perform the display method for the card component in any possible implementation of any one of the foregoing aspects.

According to a fifth aspect, embodiments of this application provide a graphical user interface on an electronic device. The electronic device has a display screen, one or more memories, and one or more processors. The one or more processors are configured to execute one or more computer programs stored in the one or more memories. The graphical user interface includes a graphical user interface displayed when the electronic device performs any technical solution in the first aspect and any possible design in the first aspect.

According to a sixth aspect, embodiments of this application provide an electronic device, where the electronic device includes modules/units for performing the method according to the first aspect or any possible design in the first aspect; and these modules/units may be implemented by hardware, or may be implemented by hardware by executing corresponding software.

For beneficial effects of the second aspect to the sixth aspect, refer to the beneficial effects of the first aspect. Details are not described again.

BRIEF DESCRIPTION OF THE DRAWINGS

FIG. 16 is a schematic flowchart of a display method for a card component according to an embodiment of this application.

DETAILED DESCRIPTION OF ILLUSTRATIVE EMBODIMENTS

The following clearly describes technical solutions in embodiments of this application in detail with reference to the accompanying drawings. In the description of embodiments of this application, unless otherwise specified, "/" represents "or". For example, A/B may represent A or B. "and/or" in the text is only an association relationship that describes associated objects, and represents that three relationships may exist. For example, A and/or B may represent: Only A exists, both A and B exist, and only B exists. In addition, in the description of embodiments of this application, "a plurality of" means two or more.

The following terms "first" and "second" are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

Figure 1:
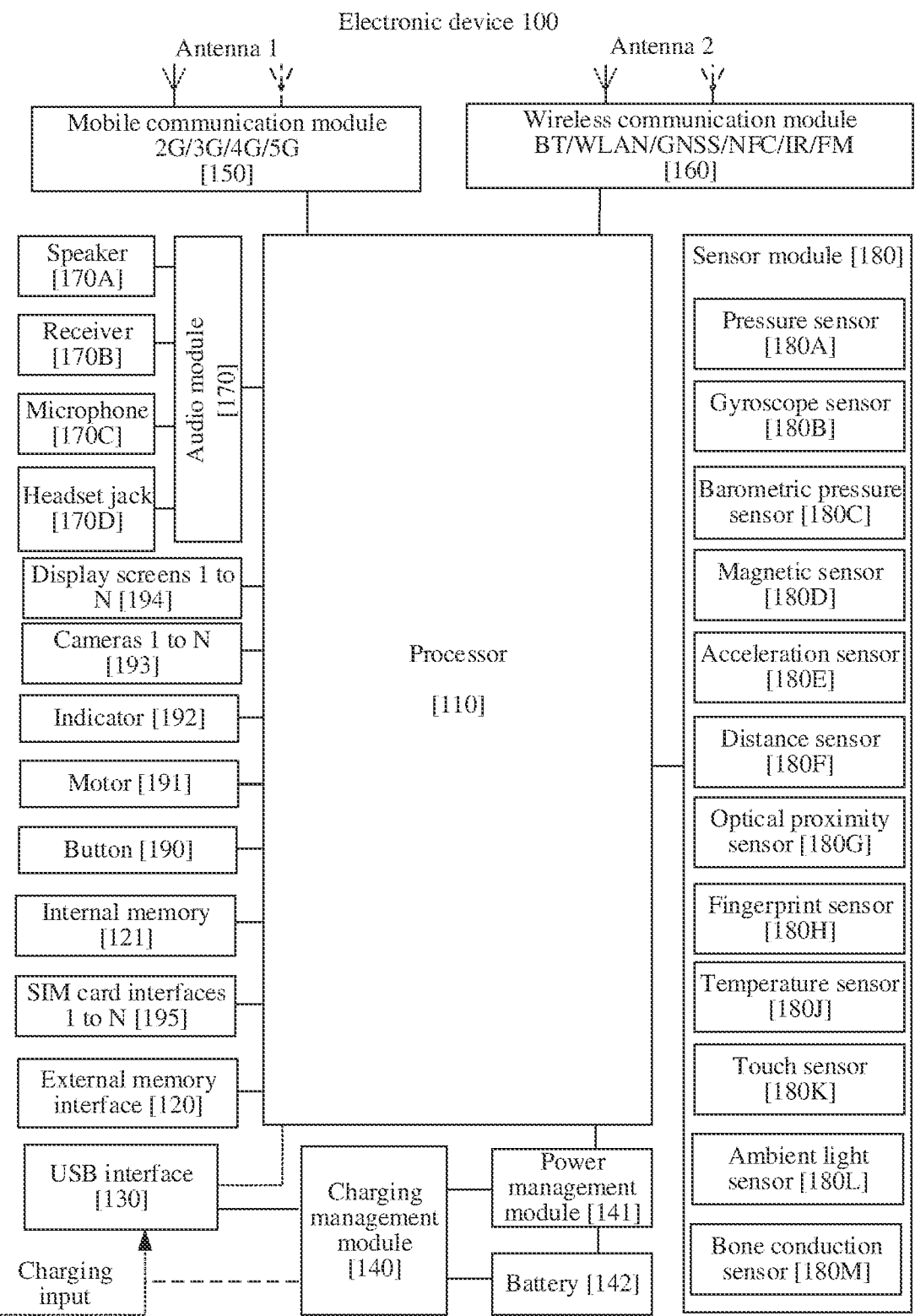
FIG. 1 is a schematic diagram of a structure of an electronic device according to an embodiment of this application.

FIG. 1 is a schematic diagram of a structure of an electronic device 100.

The following uses the electronic device 100 as an example to specifically describe this embodiment. It should be understood that the electronic device 100 shown in FIG. 1 is only an example, and may include more or fewer components than those shown in FIG. 1, or combine two or more components, or have a different component configuration. Various components shown in the figure may be implemented in hardware, software, or in a combination of hardware and software that includes one or more signal processing and/or application-specific integrated circuits.

The electronic device 100 may include: a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in embodiments of the present invention does not constitute a specific limitation on the electronic device 100. In some other embodiments of this application, the electronic device 100 may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor no may be separately coupled to the touch sensor 180K, a charger, a flash, the camera 193, and the like through different I2C bus interfaces. For example, the processor no may be coupled to the touch sensor 180K through the I2C interface, so that the processor no communicates with the touch sensor 180K through the I2C bus interface, to implement a touch function of the electronic device 100.

The I2S interface may be used for audio communication. In some embodiments, the processor no may include a plurality of groups of I2S buses. The processor no may be coupled to the audio module 170 through the I2S bus, to implement communication between the processor no and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display screen 194 or the camera 193. The MIPI interface includes a camera serial interface (camera serial interface, CSI), a display serial interface (display serial interface, DSI), and the like. In some embodiments, the processor 110 communicates with the camera 193 via the CSI, to implement a photographing function of the electronic device 100. The processor 110 communicates with the display screen 194 via the DSI interface, to implement a display function of the electronic device 100.

The GPIO interface may be configured by software. The GPIO interface may be configured to transmit a control signal, or may be configured to transmit a data signal. In some embodiments, the GPIO interface may be configured to connect the processor 110 to the camera 193, the display screen 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the electronic device 100, or may be configured to transmit data between the electronic device 100 and a peripheral device. Alternatively, the USB interface may be configured to connect to a headset for playing audio through the headset. The interface may alternatively be configured to connect to another electronic device such as an AR device.

It may be understood that an interface connection relationship between the modules that is shown in embodiments of the present invention is merely an example for description, and does not constitute a limitation on the structure of the electronic device 100. In some other embodiments of this application, the electronic device 100 may alternatively use an interface connection manner different from an interface connection manner in this embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive wireless charging input through a wireless charging coil of the electronic device 100. When charging the battery 142, the charging management module 140 may further supply power to the electronic device through the power management module 141.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, a display screen 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further reused, to improve antenna utilization. For example, the antenna 1 may be multiplexed as a diversity antenna of a wireless local area network. In some other embodiments, an antenna may be used in combination with a tuning switch.

The mobile communication module 150 may provide a solution to wireless communication such as 2G/3G/4G/5G applicable to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to an application processor. The application processor outputs a sound signal by an audio device (which is not limited to the speaker 170A, the receiver 170B, or the like), or displays an image or a video by the display screen 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 may implement a display function through the GPU, the display screen 194, the application processor, and the like. The GPU is a microprocessor for image processing, and is connected to the display screen 194 and the application processor. The GPU is configured to: perform mathematical and geometric computation, and render an image. The processor 110 may include one or more GPUs, which execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), and the like. In some embodiments, the electronic device 100 may include one or N display screens 194, where N is a positive integer greater than 1.

The electronic device 100 may implement a photographing function through the ISP, the camera 193, the video codec, the GPU, the display screen 194, the application processor and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may further optimize noise point, brightness, and skin tone algorithms. The ISP may further optimize parameters such as exposure and color temperature of a photographing scene. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computation processor. The NPU quickly processes input information by referring to a structure of a biological neural network, for example, by referring to a mode of transmission between human brain neurons, and continuously performs self-learning. Applications such as intelligent cognition of the electronic device 100 may be implemented through the NPU, for example, image recognition, facial recognition, speech recognition, and text understanding.

The external memory interface 120 may be configured to connect to an external storage card such as a micro SD card, to expand a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the electronic device 100. The internal memory 121 may include a program storage region and a data storage region. The program storage area may store an operating system, an application program required by at least one function (such as a sound playing function or an image playing function), and the like. The data storage area may store data (such as audio data and an address book) created during use of the electronic device 100, and the like. In addition, the internal memory 121 may include a high-speed random access memory, or may include a non-volatile memory such as at least one magnetic disk memory, a flash memory, or a universal flash storage (universal flash storage, UFS).

The electronic device 100 may implement an audio function by using the audio module 170, the speaker 170A, the telephone receiver 170B, the microphone 170C, the headset jack 170D, the application processor, and the like, for example, implement a music playback function and a recording function.

The audio module 170 is configured to convert digital audio information into an analog audio signal output, and is further configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display screen 194. There are a plurality of types of pressure sensors 180A, such as a resistive pressure sensor, an inductive pressure sensor, and a capacitive pressure sensor. The capacitive pressure sensor may include at least two parallel plates having conductive materials. When a force is applied to the pressure sensor 180A, capacitance between electrodes changes. The electronic device 100 determines pressure intensity based on the change in the capacitance. When a touch operation is performed on the display screen 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a moving posture of the electronic device 100. In some embodiments, an angular velocity of the electronic device 100 around three axes (namely, axes x, y, and z) may be determined through the gyroscope sensor 180B. The gyroscope sensor 180B may be used for image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in navigation and a motion sensing game scene.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 18J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display screen 194, and the touch sensor 180K and the display screen 194 constitute a touchscreen, which is also referred to as a "touchscreen". The touch sensor 180K is configured to detect a touch operation performed on or near the touch sensor. The touch sensor may transmit the detected touch operation to the application processor, to determine a touch event type. A visual output related to the touch operation may be provided through the display screen 194. In some other embodiments, the touch sensor 180K may also be disposed on a surface of the electronic device 100 at a location different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display screen 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. Types of the plurality of cards may be the same or different. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In embodiments of the present invention, an Android system of a layered architecture is used as an example to illustrate the software structure of the electronic device 100.

Figure 2:
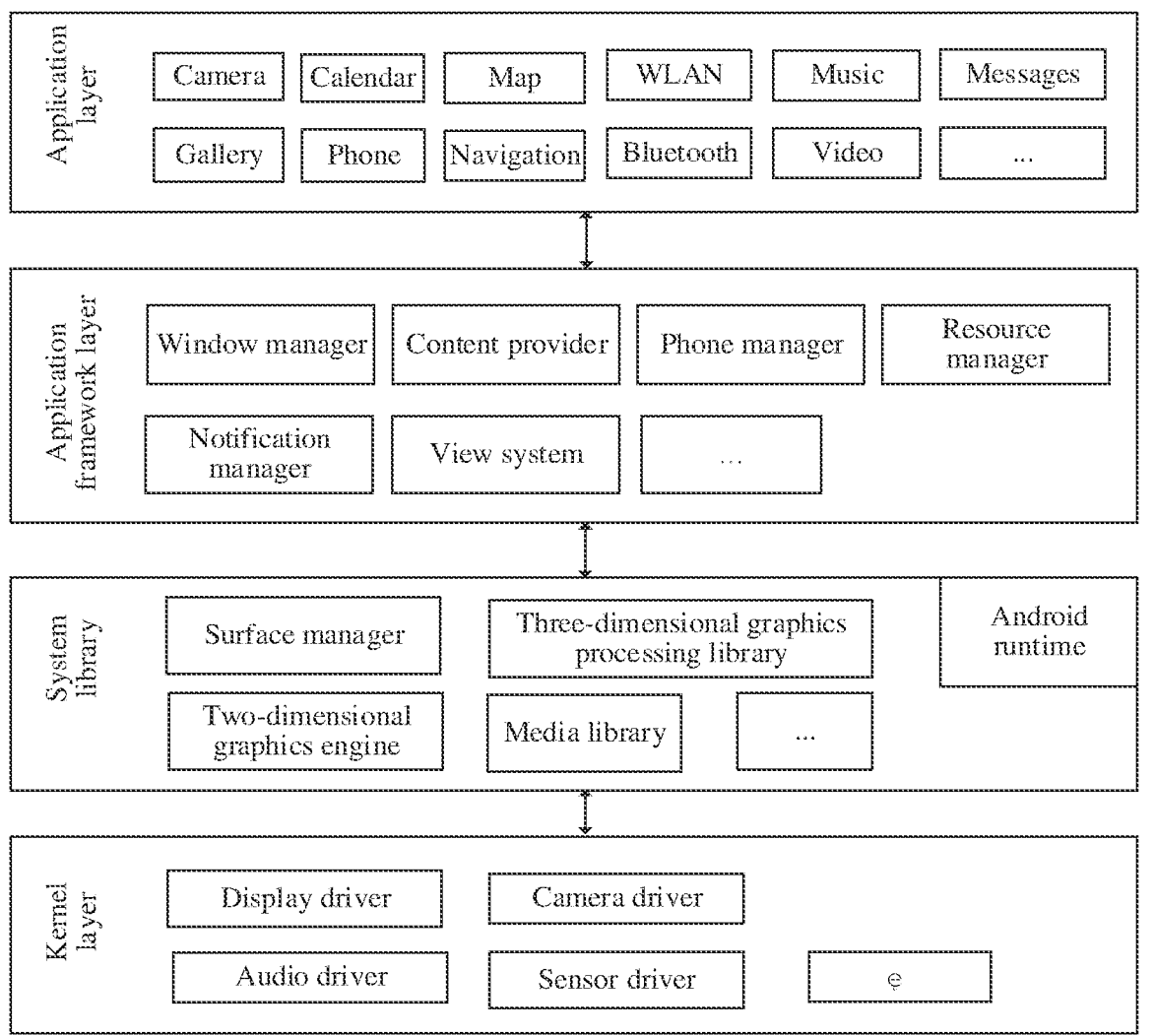
FIG. 2 is a schematic diagram of a software architecture of an electronic device according to an embodiment of this application.

FIG. 2 is a block diagram of a software structure of an electronic device 100 according to an embodiment of the present invention.

In a layered architecture, software is divided into several layers, and each layer has a clear role and task. The layers communicate with each other through a software interface. In some embodiments, the Android system is divided into four layers: an application program layer, an application program framework layer, an Android runtime (Android runtime) and system library, and a kernel layer from top to bottom.

The application program layer may include a series of application program packages.

As shown in FIG. 2, the application program packages may include application programs such as Camera, Gallery, Calendar, Phone, Map, Navigation, WLAN, Bluetooth, Music, Videos, and Messages.

The application program framework layer provides an application programming interface (application programming interface, API) and a programming framework for the application programs at the application program layer. The application program framework layer includes some pre-defined functions.

As shown in FIG. 2, the application program framework layer may include a window manager, a content provider, a view system, a phone manager, a resource manager, a notification manager, and the like.

The window manager is configured to manage a window application program. The window manager may obtain a size of the display screen, determine whether there is a status bar, perform screen locking, take a screenshot, and the like.

The content provider is configured to: store and obtain data, and enable the data to be accessed by an application program. The data may include a video, an image, an audio, calls that are made and answered, a browsing history and bookmarks, an address book, and the like.

The view system includes a visual control such as a control for text display or a control for picture display. The view system may be configured to construct an application program. A display interface may be formed by one or more views. For example, a display interface including an SMS notification icon may include a view for displaying text and a view for displaying a picture.

The phone manager is configured to provide a communication function for the electronic device 100, for example, management of a call status (including answering, declining, or the like).

The resource manager provides various resources for an application program, for example, a localized character string, an icon, a picture, a layout file, and a video file.

The notification manager enables an application program to display notification information on a status bar. The notification information may be a message used to indicate a notification type, and may automatically disappear after a short stay without interacting with a user. For example, the notification manager is configured to notify download completion, give a message notification, and the like. The notification manager may alternatively be a notification that appears in a top status bar of the system in a form of a graph or a scroll bar text, for example, a notification of an application program that is run in a background, or may be a notification that appears on the screen in a form of a dialog window. For example, text information is displayed in the status bar, an announcement is given, the electronic device vibrates, or the indicator light blinks.

The Android Runtime includes a kernel library and a virtual machine. The Android runtime is responsible for scheduling and management of the Android system.

The kernel library includes two parts: a function that needs to be called in Java language and a kernel library of Android.

The application program layer and the application program framework layer run on the virtual machine. The virtual machine executes java files of the application program layer and the application program framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem, and converge 2D and 3D layers of a plurality of application programs.

The media library supports playback and recording in a plurality of commonly used audio and video formats, and static image files. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display drive, a camera drive, an audio drive, and a sensor drive.

The following describes an example of a working process of software and hardware of the electronic device 100 with reference to a photographing scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application program framework layer obtains the original input event from the kernel layer, and identifies a control corresponding to the input event. An example in which the touch operation is a touch operation, and a control corresponding to the touch operation is a control of a camera application icon is used. The camera application invokes an interface of the application framework layer to enable the camera application, then enables the camera driver by invoking the kernel layer, and captures a static image or a video through the camera 193.

The following describes a manner of adding a card component to a desktop provided in embodiments of this application.

Figure 3A:
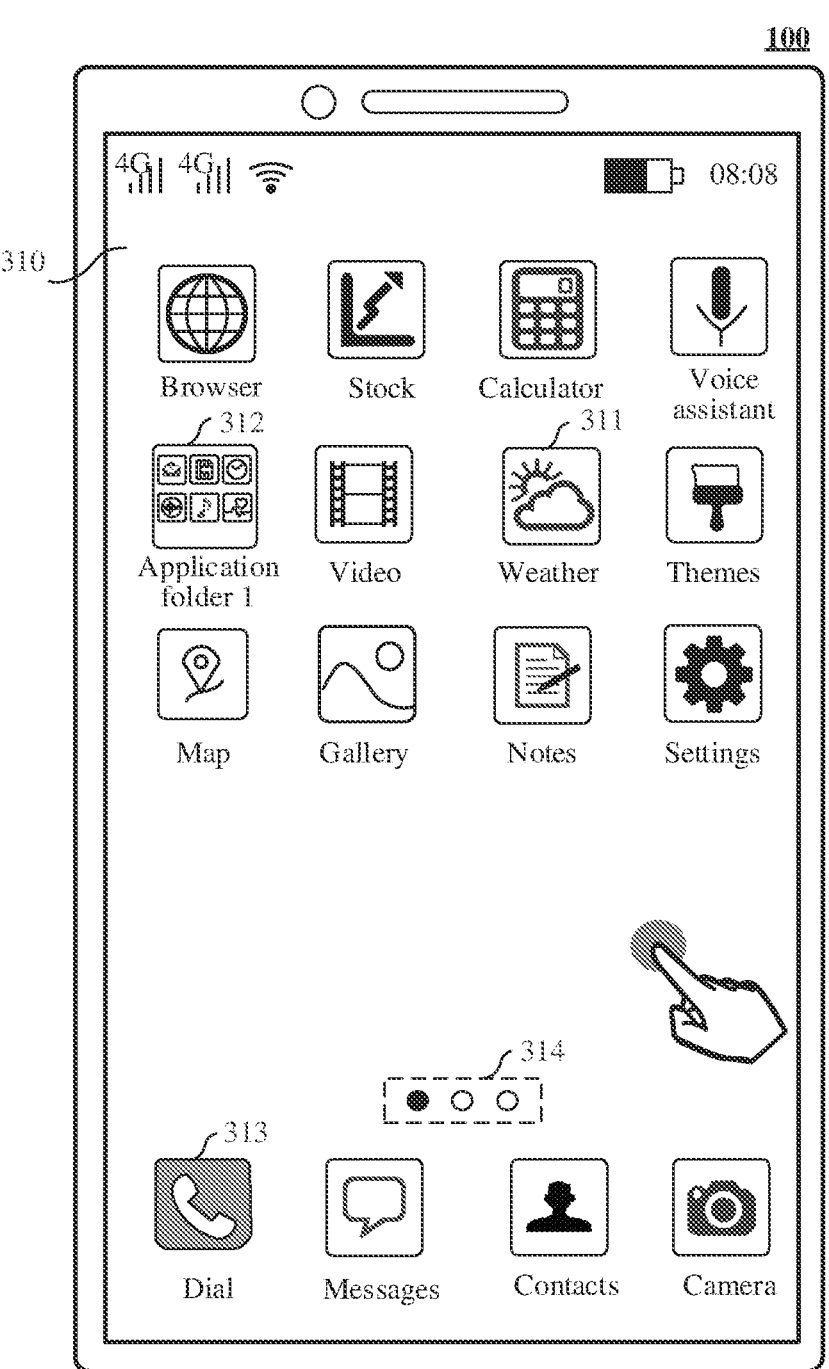
FIG. 3A to FIG. 3D are schematic diagrams of a group of interfaces of a manner of adding a card component to a desktop according to an embodiment of this application.

As shown in FIG. 3A, the electronic device 100 may display an interface 310 on a desktop. The interface 310 displays a page on which an application icon is placed, and the page includes a plurality of application icons (for example, a browser application icon, a stock application icon, a calculator application icon, a voice assistant application icon, a video application icon, a weather application icon 311, a theme application icon, a map application icon, a gallery application icon, a notes application icon, a setting application icon, and the like). The page may further include an application folder icon (for example, an icon 312 of an application folder 1), and the application folder icon may be used to trigger the electronic device 100 to display one or more application icons. Optionally, a page indicator 314 is further displayed and included below the page on which the application icon is placed, to indicate a total quantity of pages on the desktop and a location relationship between a currently displayed page and another page. For example, the interface 310 on the desktop may include three pages, and a black dot in the page indicator is on the leftmost, which may represent that the currently displayed page is a leftmost page of the three pages. Optionally, a status bar is further displayed and included above the page on which the application icon is placed. The status bar may include information such as a strength indicator of a communication signal, a battery level value, and time. Further, optionally, there may be a dock (dock) area below the page indicator, and the dock area may include one or more dock icons (for example, a dial-up application icon 313, a messaging application icon, a contact application icon, a camera application icon, or the like). The one or more dock icons in the dock area may remain displayed during page switching.

Figure 3B:
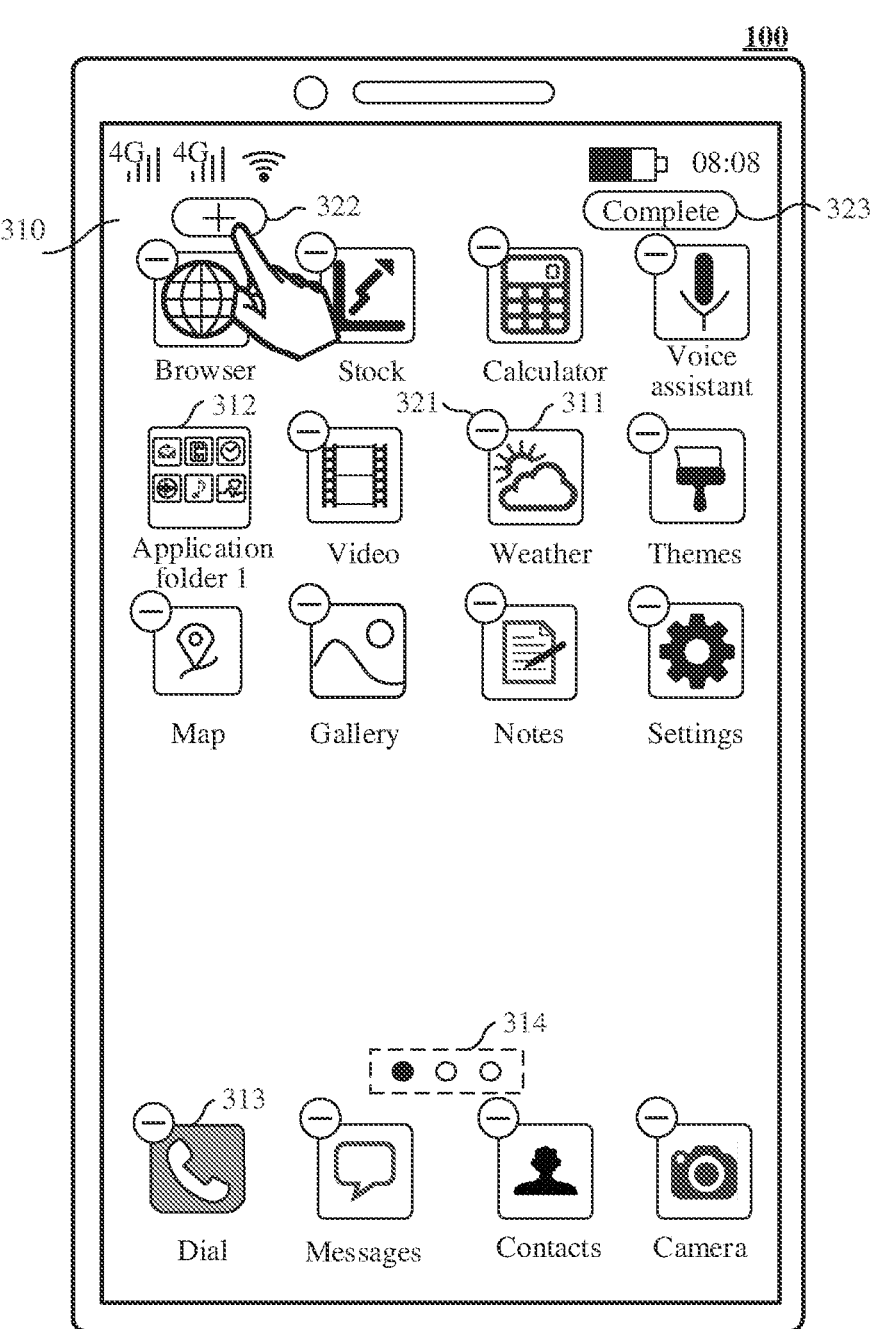

The electronic device 100 may receive a touch-and-hold input by a user for a blank area on the interface 310 on the desktop. In response to the input operation, as shown in FIG. 3B, the electronic device 100 may display, on the interface 310, a component addition control 322, a completion control 323, and a deletion control corresponding to each application icon (for example, a deletion control 321 on the weather application icon 311). The completion control 323 may be used to trigger the electronic device 100 to maintain a current page layout on the desktop, and stop displaying the component addition control 322, the completion control 323, and the deletion control corresponding to each application icon on the interface 310. The deletion control corresponding to the application icon may be used to trigger the electronic device 100 to uninstall an application corresponding to the application icon, and stop displaying, on the desktop, the application icon corresponding to the deletion control.

The electronic device 100 may receive an input (for example, tapping) of the user for the component addition control 322. In response to the input, the electronic device 100 may display a component addition page 330 shown in FIG. 3C.

Figure 3C:
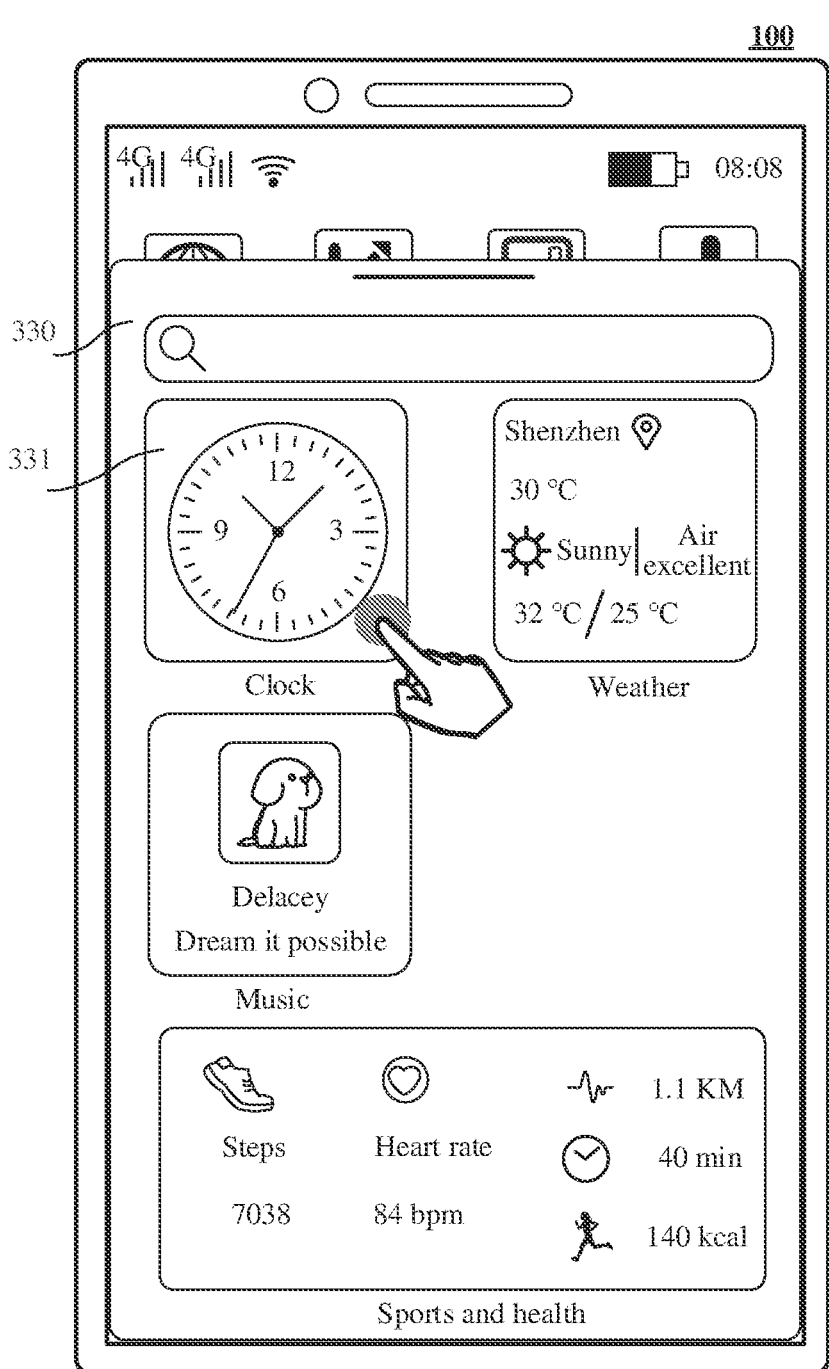

As shown in FIG. 3C, the component addition page 330 includes card components (for example, a clock component 331, a weather component, a music component, a sports and health component, and the like) corresponding to one or more application functions. Function display information of an application function corresponding to a card component may be displayed on the card component, and the card component may be used to trigger the electronic device 100 to jump to display an interface of the application function corresponding to the card component. For example, time information may be displayed on the clock component 331, and the clock component 331 may be used to trigger the electronic device 100 to jump to display a time interface (including the time information) in a clock application. Weather information (including one or more of the current weather, outdoor temperature, air quality, and the like at a location of a specified area) of an area in which the electronic device 100 is currently located may be displayed on the weather component. The weather component may be used to trigger the electronic device 100 to display a weather interface (including the weather information of the current area) in a weather application. Music information (including one or more of an album cover of music, a name of the music, and a name of a singer) may be displayed on the music component. The music component may be used to trigger the electronic device 100 to display a music playing interface (including the music information) in a music application, and the like.

The electronic device 100 may receive a touch-and-hold and drag operation of the user on the clock component 331. In response to the touch-and-hold and drag operation, the electronic device 100 may display the clock component in a specified area on an interface 340 on the desktop shown in FIG. 3D.

Figure 3D:
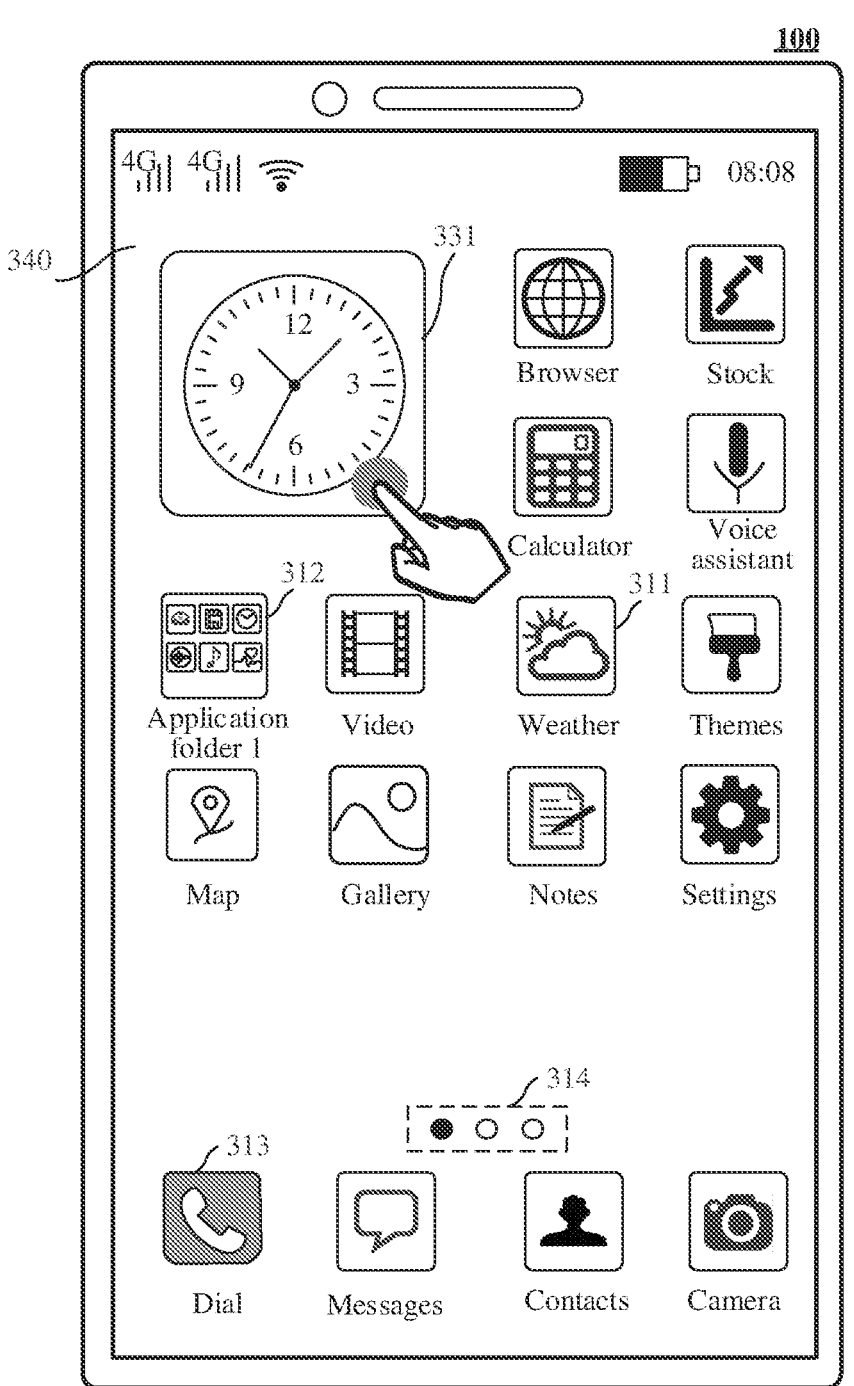

As shown in FIG. 3D, for a text description of the interface 340 on the desktop, refer to the text description of the interface 310. Details are not described again. If the specified area includes another application icon or card component before the clock component 331 is dragged to the specified area, the electronic device 100 may display the another application icon or card component in the specified area at another location when detecting that the user drags the clock component 331 to the specified area. The clock component 331 is displayed in the specified area.

It may be learned from the foregoing manner of adding the card component to the desktop that an operation step of adding the card component by the user is complex, and the user cannot find, in a short period of time, the card component that the user wants to add to the desktop from a large quantity of card components. After a new card component is added to the desktop, a display layout of application icons or card components on an original desktop of the electronic device 100 is disrupted.

Therefore, embodiments of this application provide a display method for a card component. The electronic device 100 may temporarily display, in a floating manner, a card component corresponding to a first application around an icon of the first application in response to a sliding operation (for example, upward sliding) performed by a user on the icon of the first application on the desktop, where display information of a first function in the first application is displayed on the card component. When the electronic device 100 receives an input for another area other than the card component on the desktop, the electronic device 100 may disable displaying the temporarily displayed card component. The electronic device 100 may alternatively add and display the temporarily displayed card component in a specified area on the desktop. In this way, the electronic device 100 may be quickly triggered, on the desktop through an input operation of the user, to display a card component corresponding to an application, so that the user may quickly view the card component, and a display layout of application icons or card components on the desktop is not disrupted.

With reference to an application scenario, the following specifically describes a display method for a card component provided in embodiments of this application.

In some application scenarios, the electronic device 100 may display a card component corresponding to the first application in response to a sliding operation (for example, upward sliding) of the user on the icon of the first application on the desktop. The card component corresponding to the first application may be displayed, in a floating manner, around the icon of the first application. Display information of the first function in the first application is displayed on the card component. Display of the card component corresponding to the first application may be temporary. For example, when the electronic device 100 receives an input for another area other than the card component on the desktop, the electronic device 100 may disable displaying the temporarily displayed card component. In this way, it may be convenient for the user to quickly view a card component of an application, and the temporarily displayed card component may also be quickly disabled.

Figure 4A:
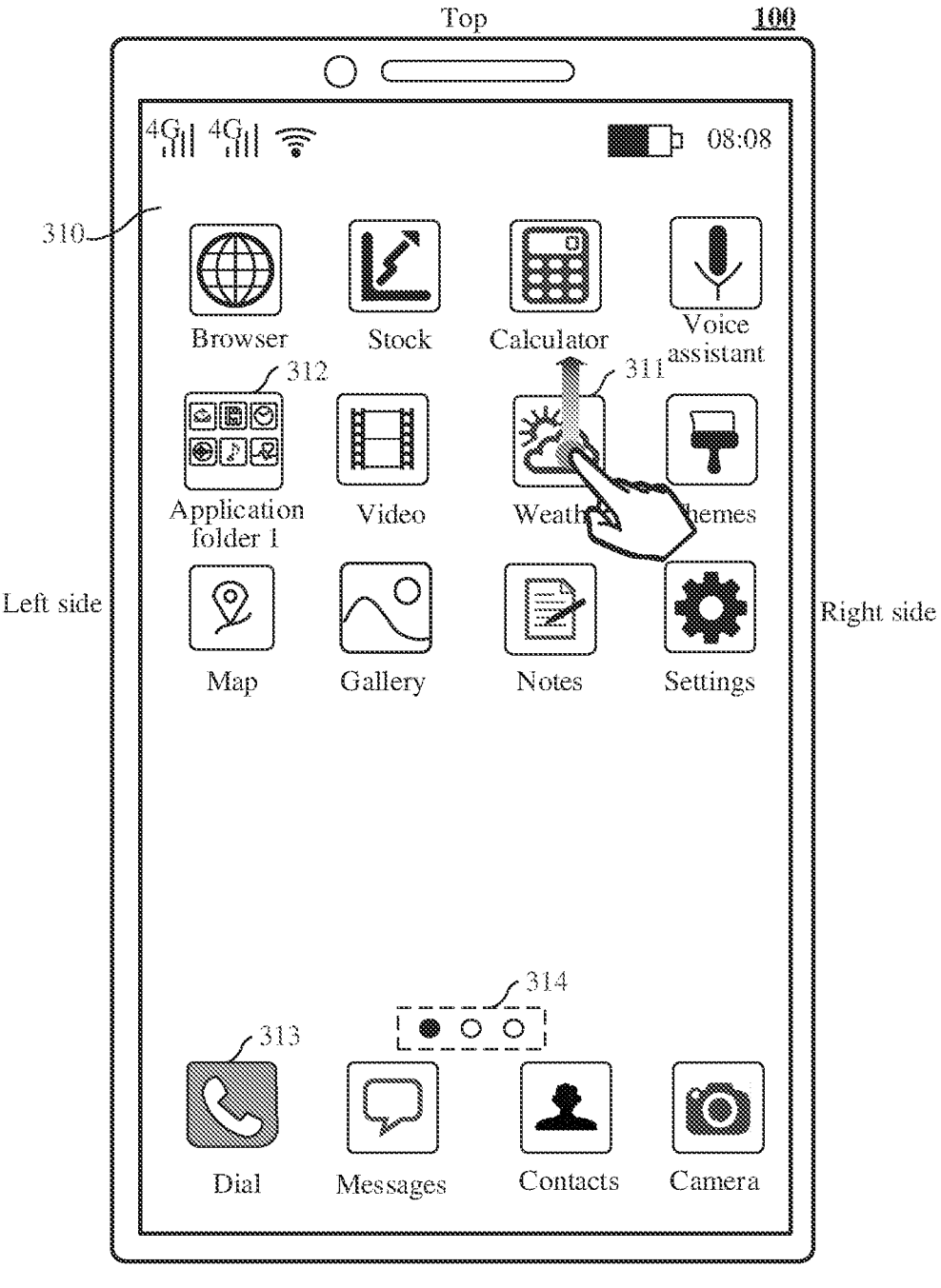
FIG. 4A to FIG. 4K are schematic diagrams of a group of interfaces of a display method for a card component according to an embodiment of this application.

For example, as shown in FIG. 4A, the electronic device 100 may display an interface 310 on a desktop. For a text description of the interface 310, refer to the embodiment shown in FIG. 3A. Details are not described herein again.

The electronic device 100 may receive a sliding operation (for example, upward sliding) on the weather application icon 311. In response to the sliding operation, as shown in FIG. 4B, the electronic device 100 may temporarily display a weather component 411 and a fixed control 412 corresponding to the weather component 411.

Figure 4B:
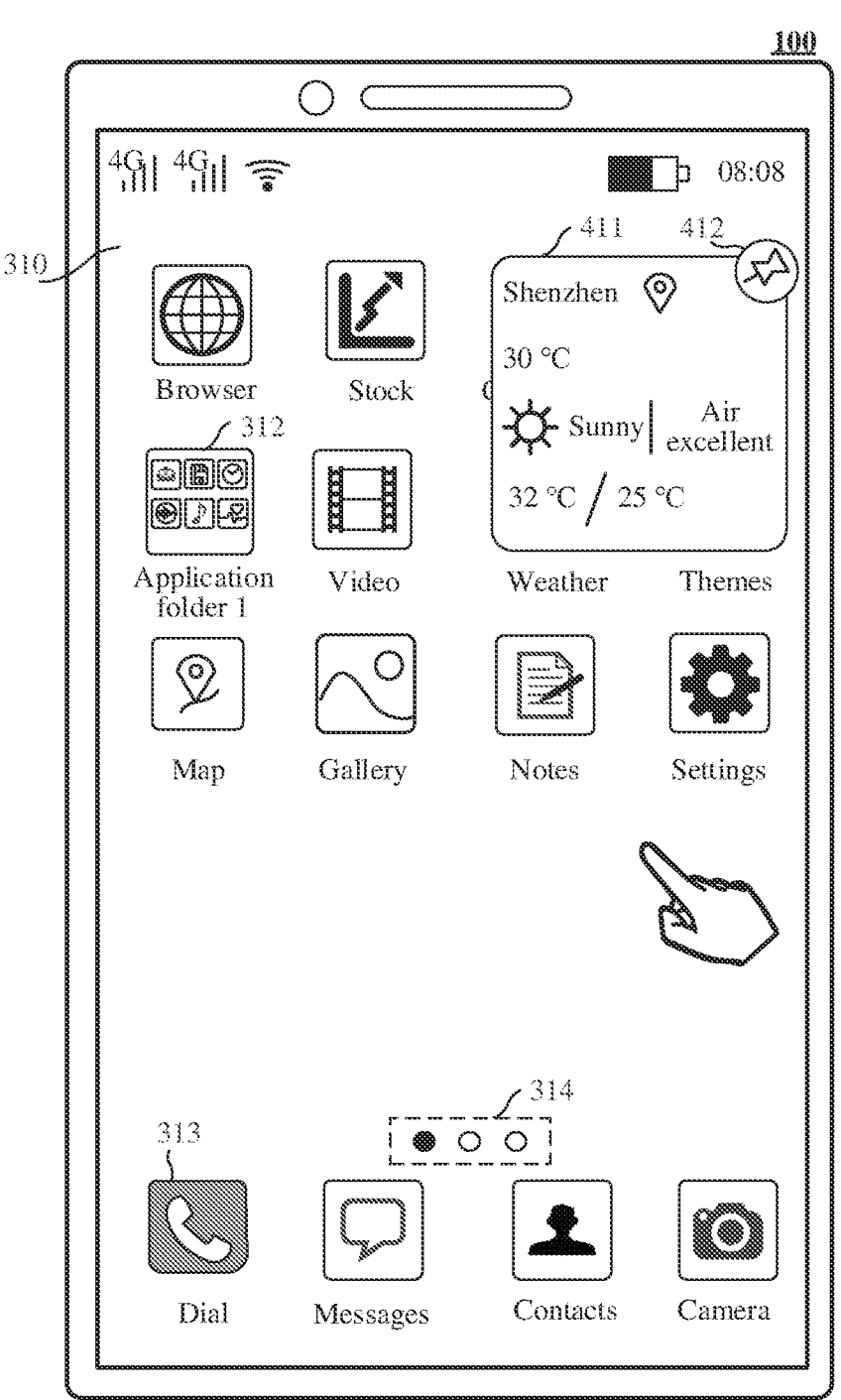

As shown in FIG. 4B, the weather component 411 may cover the weather application icon 311 and an application icon close to the weather icon 311. For example, the weather component 411 may be covered and displayed on the weather application icon 311, a calculator application icon, a voice assistant application icon, a theme application icon. The weather component 411 may display and include weather information that is obtained through a weather application. The weather information may include one or more of current weather (for example, "sunny"), outdoor temperature (for example, "30 degrees Celsius"), air quality (for example, "air excellent"), maximum temperature of the day (for example, "32 degrees Celsius"), minimum temperature of the day (for example, "25 degrees Celsius"), and the like of a location at a specified area (for example, "Shenzhen"). The location at the specified area may be a current location at which the electronic device 100 determined by the electronic device 100 through the weather application is located, or may be a location at one area preset by the user. The fixed control 412 may be used to trigger the electronic device 100 to fixedly display the weather component 411 in a blank area on the desktop.

After temporarily displaying the weather component 411, the electronic device 100 may receive an input (for example, tapping) of the user for another area on the desktop other than the area in which the weather component 411 is located.

Figure 4C:
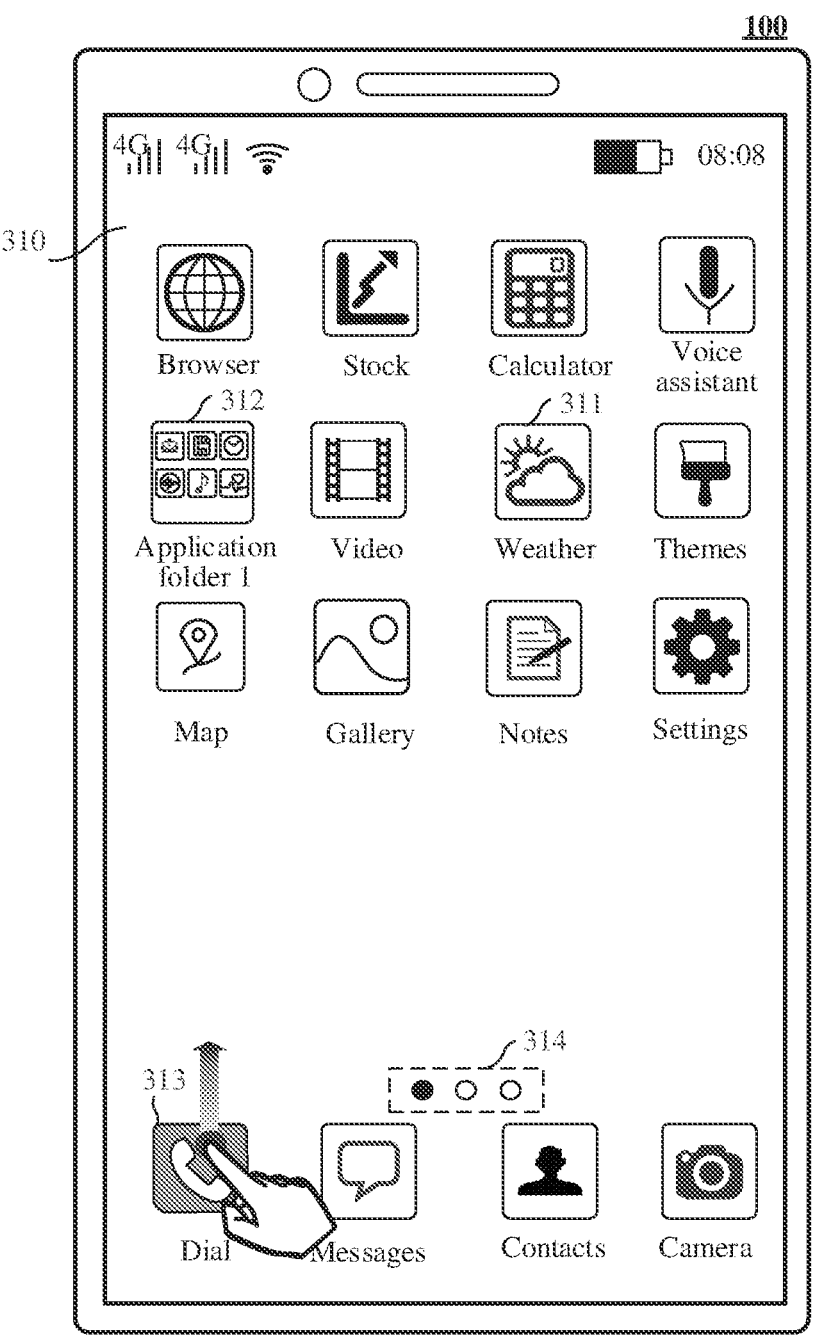

In response to the input, as shown in FIG. 4C, the electronic device 100 may disable the temporarily displayed weather component 411.

In embodiments of this application, a sliding direction of the sliding operation may not be limited to upward sliding. In a possible implementation, the sliding operation may alternatively be sliding downward, sliding leftward, sliding rightward, or the like. In some embodiments, sliding leftward or rightward on the desktop triggers the electronic device 100 to switch to display pages on which an application icon is placed on the desktop, and sliding downward on the desktop may trigger a function of the electronic device 100 to quickly search for an application icon. Therefore, in embodiments of this application, upward sliding is used as a preferred implementation of the foregoing sliding operation, which may prevent the sliding operation from triggering another function.

It should be noted that a start location of the sliding operation is on the application icon or within a preset distance close to the application icon, and a sliding track of the sliding operation may be a straight line or a curve. FIG. 4A marks relative locations of the top, the bottom, the left side, and the right side of the electronic device 100 when the electronic device 100 is placed in the manner shown in FIG. 4A. These locations are used to describe a location on a touchscreen of the electronic device 100 or a location on the interface displayed by the electronic device 100. In addition, upward refers to a direction from bottom to top, downward refers to a direction from top to bottom, rightward refers to a direction from the left side to the right side, and leftward refers to a direction from the right side to the left side. A description of the location is also applicable to a description of the following accompanying drawings.

In embodiments of this application, an icon of the first application is not limited to an application icon directly displayed on a plurality of pages on the desktop, or may be an application icon (for example, the dial-up application icon 313) displayed in a dock (dock) area on the desktop, or may be an application icon included in an application folder displayed on the desktop.

For example, as shown in FIG. 4C, the electronic device 100 may receive a sliding operation (for example, upward sliding) of the user on the dial-up application icon 313 in the dock area. In response to the sliding operation, as shown in FIG. 4D, the electronic device 100 may temporarily display a dial-up component 413 and a fixed control 414 corresponding to the dial-up component 413.

Figure 4D:
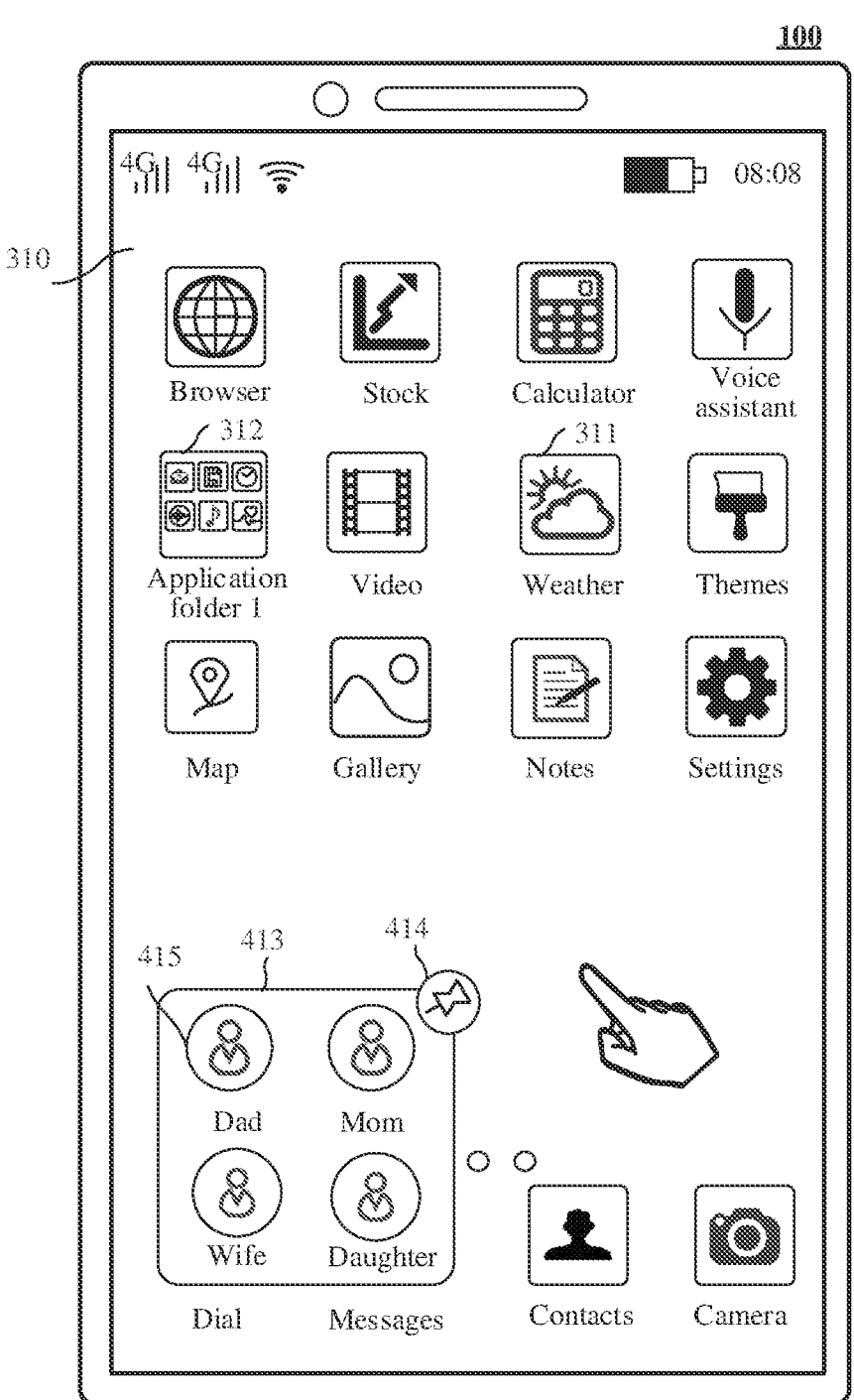

As shown in FIG. 4D, the dial-up component 413 may be covered on the dial-up application icon 313 and an application icon close to the dial-up application icon 313. For example, the dial-up component 413 may be covered and displayed on the dial-up application icon 311 and a messaging application icon. The dial-up component 413 may display and include dial-up controls (for example, a dial-up control 415 of a contact "dad", a dial-up control of a contact "mom", a dial-up control of a contact "wife", a dial-up control of a contact "daughter", and the like) including a plurality of specified contacts in a dial-up application. The specified contact may be a contact of a recent call detected by the electronic device 100, or may be a contact that is pre-added by the electronic device 100 to the dial-up component 413 in response to the input by the user. A dial-up control of the specified contact may be used to trigger the electronic device 100 to dial a specified contact corresponding to the dial-up control. For example, when the electronic device 100 detects that the user taps the dial-up control 415, the electronic device 100 may dial the contact "dad". The fixed control 414 may be used to trigger the electronic device 100 to fixedly display the dial-up component 413 in a blank area on the desktop.

After temporarily displaying the dial-up component 413, the electronic device 100 may receive an input (for example, tapping) of the user for another area on the desktop other than the area in which the dial-up component 413 is located. In response to the input, as shown in FIG. 4E, the electronic device 100 may disable the temporarily displayed dial-up component 413.

Figure 4E:
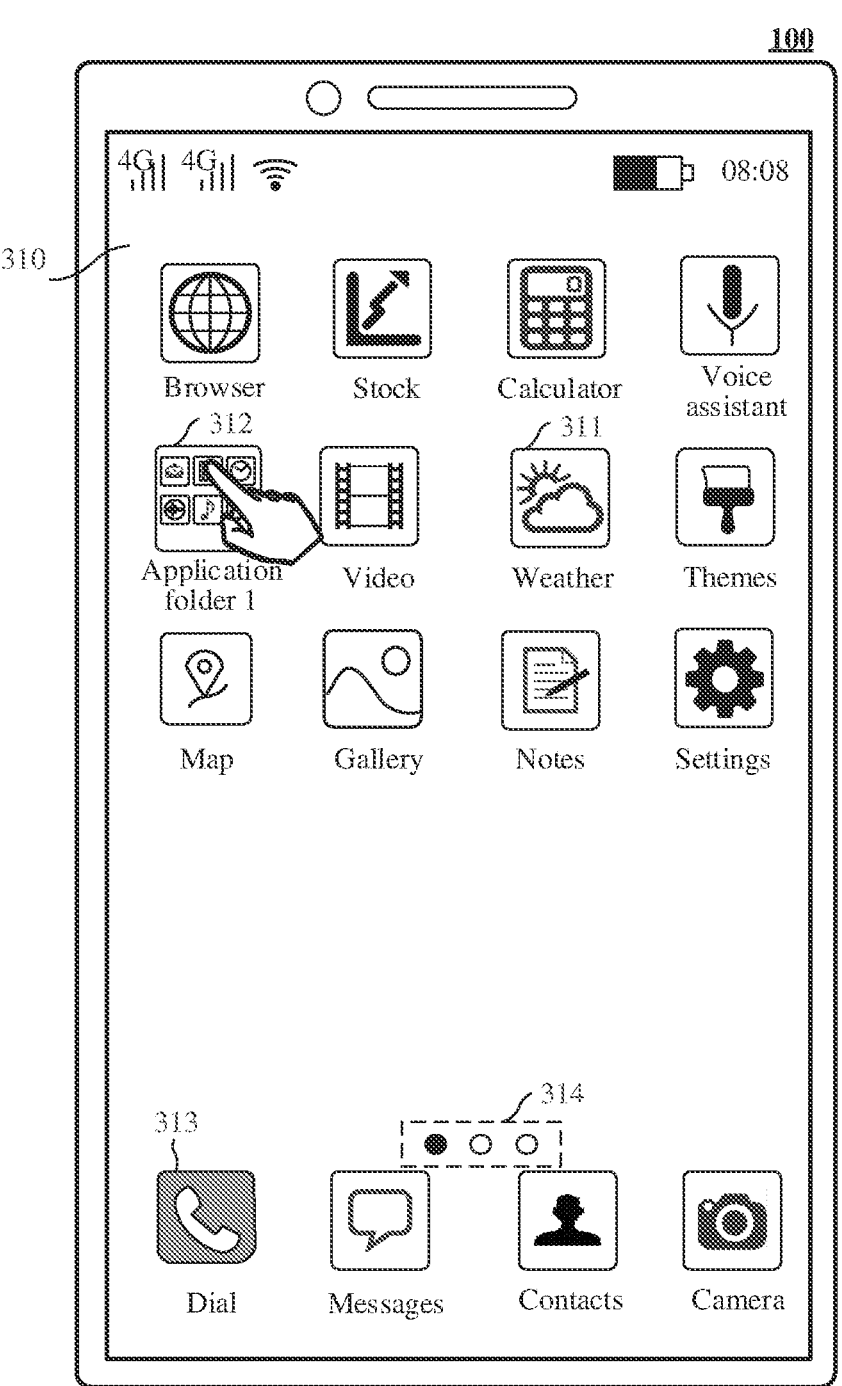

For another example, as shown in FIG. 4E, the electronic device 100 may receive an input (for example, tapping) of the user for an icon 312 of an application folder 1. In response to the tapping operation, the electronic device 100 may display an interface 420 of the application folder 1 shown in FIG. 4F.

Figure 4F:
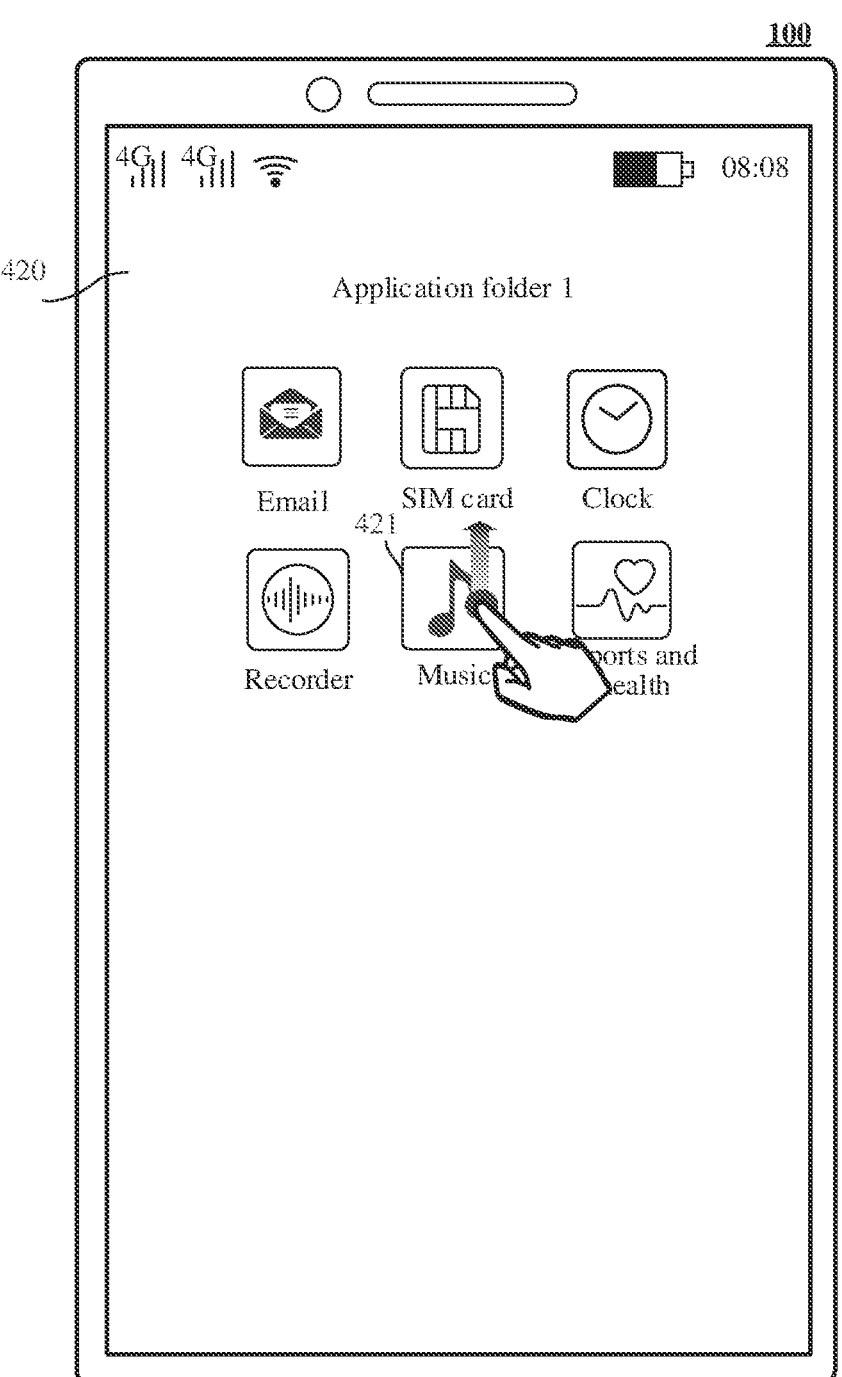

As shown in FIG. 4F, the interface 420 of the application folder 1 may include a plurality of application icons, for example, a mail application icon, a SIM card application icon, a clock application icon, a recorder application icon, a music application icon 421, and a sports and health application icon.

The electronic device 100 may receive a sliding operation (for example, upward sliding) of the user on the music application icon 421. In response to the sliding operation, as shown in FIG. 4G, the electronic device 100 may temporarily cover and display the music component 422 and the fixed control 423 corresponding to the music component on the music application icon 421.

Figure 4G:
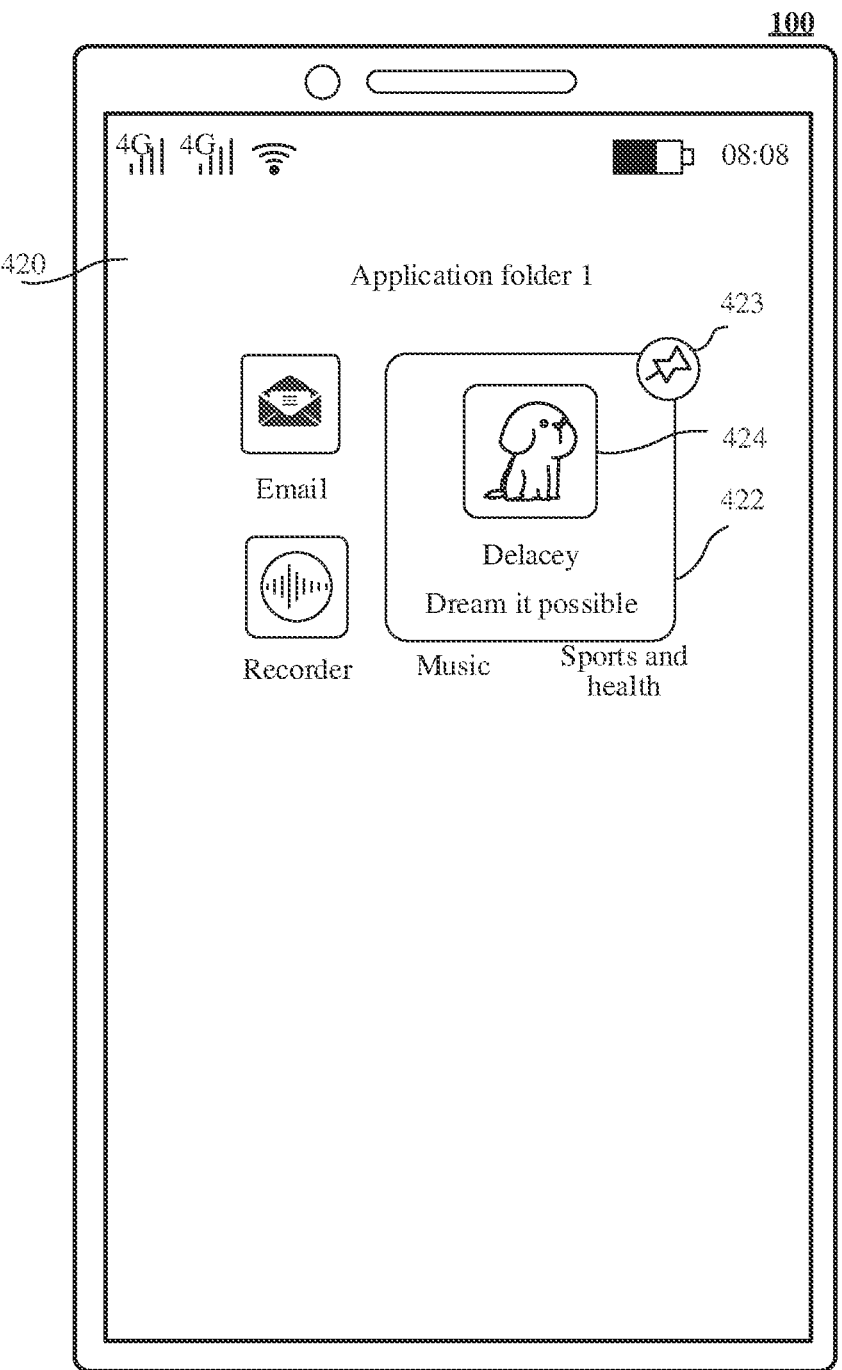

As shown in FIG. 4G, the music component 422 may be covered on a music application icon 421 and an application icon close to the music application icon 421. For example, the music component 422 may be covered and displayed on the music application icon 421, the sports and health application icon, the SIM card application icon, and the clock application icon. The music component 422 may display and include music information that includes music specified in the music application. The music information includes an album image 424, a name of the music (for example, "Dream it possible"), a name of a singer (for example, "Delacey"), and the like. Optionally, a music component corresponding to the music application may further display a play functional control such as a play/pause control, a previous song control, and a next song control, and/or lyric information of the specified music. The fixed control 423 may be used to trigger the electronic device 100 to fixedly display the music component 422 in a blank area on the desktop.

After temporarily displaying the music component 422, the electronic device 100 may receive an input (for example, tapping) of the user for another area on the interface 420 other than the area in which the music component 422 is located. In response to the input, the electronic device 100 may disable the temporarily displayed music component 422. After disabling the temporarily displayed music component 422, the electronic device 100 may display the interface 420 shown in FIG. 4F or the interface 310 shown in FIG. 4E.

In a possible implementation, when the application folder includes icons of a plurality of applications, after detecting a sliding operation (for example, upward sliding) of the user on the application folder, the electronic device 100 may temporarily display a corresponding card stacking component in the application folder. The card stacking component may switch to display card components corresponding to the plurality of applications.

Figure 4H:
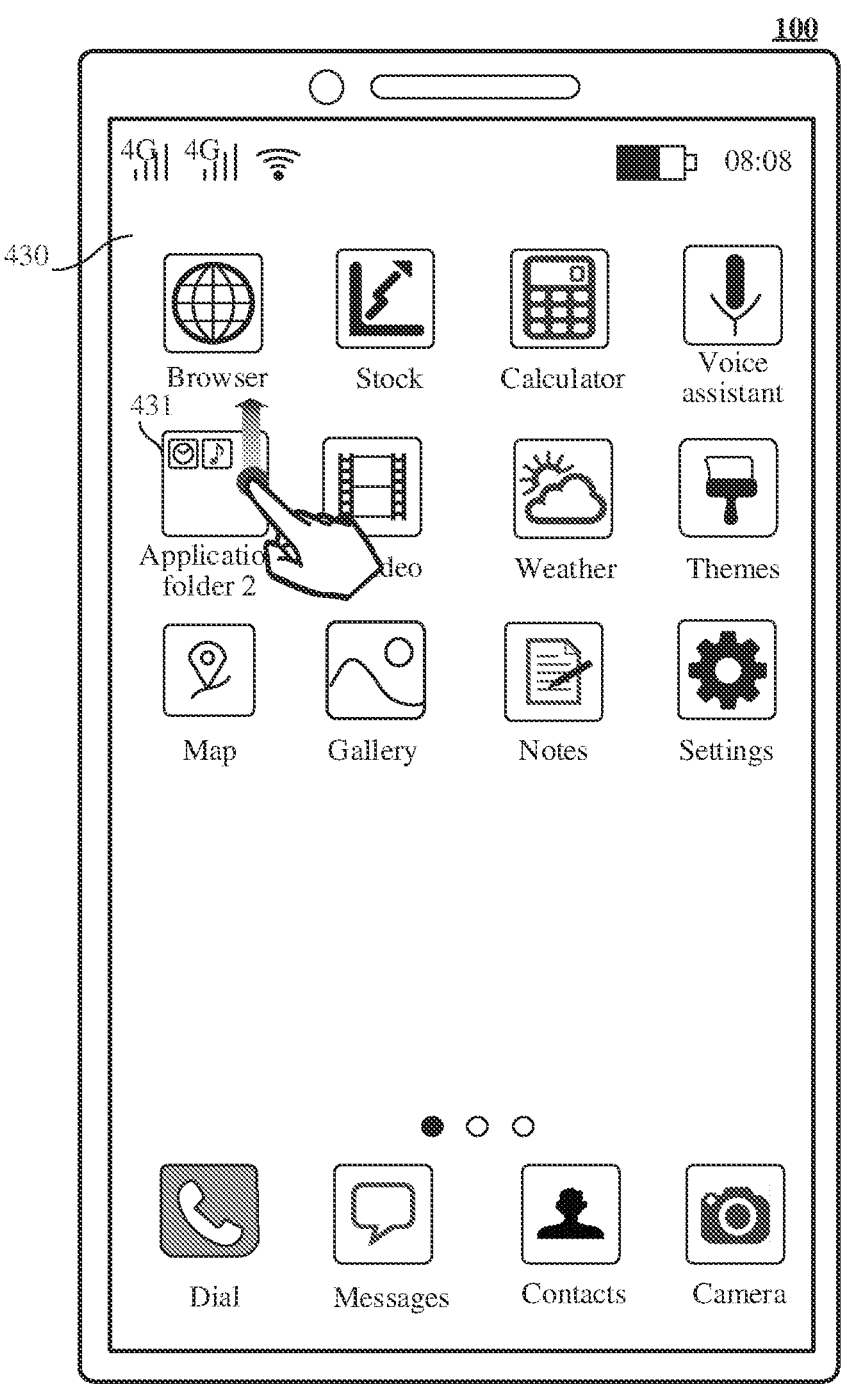

For example, as shown in FIG. 4H, the electronic device 100 displays the interface 430 on the desktop. The interface 430 includes an icon 431 of an application folder 2. The application folder 2 includes the clock application icon and the music application icon. For a text description of another interface element in the interface 430, refer to the description of the interface 310 on the desktop in the embodiment shown in FIG. 3A. Details are not described herein again.

The electronic device 100 may receive a sliding input (for example, upward sliding) of the user for the icon 431 of the application folder 2. In response to the sliding operation, as shown in FIG. 4I, the electronic device 100 may temporarily display the card stacking component 440, a fixed control 441 corresponding to the card stacking component 440, and an indicator 442.

Figure 4I:
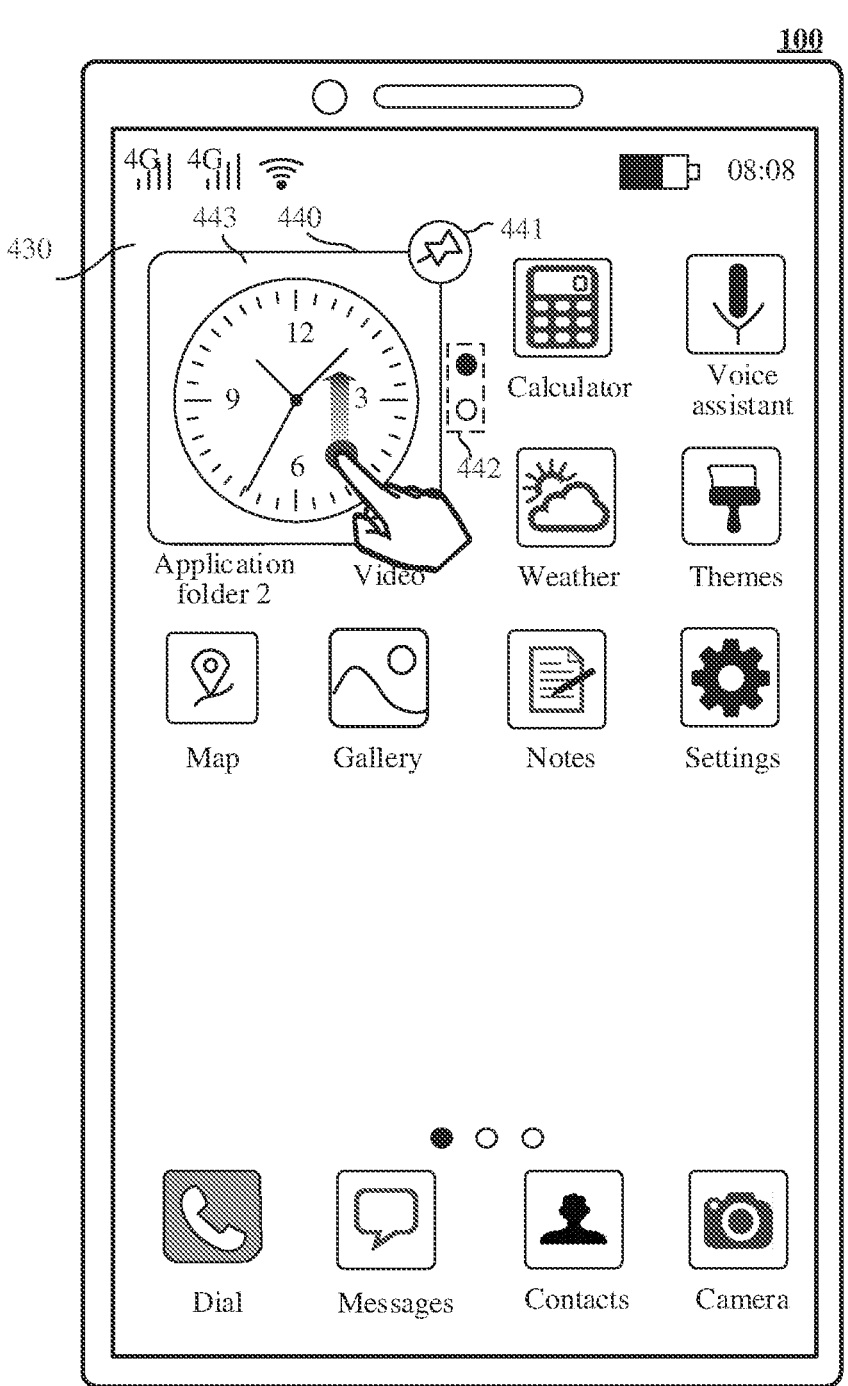

As shown in FIG. 4I, a clock component 443 of a clock application may be currently displayed on the card stacking component 440, and current time information may be displayed on the clock component 443. The indicator 442 may indicate a location relationship of a card component currently displayed on the card stacking component 440 relative to other card components in the card stacking component 440. For example, a black dot in the indicator 442 is above a white dot, representing that the clock component 443 currently displayed on the card stacking component 440 is arranged on top of the other components.

Figure 4J:
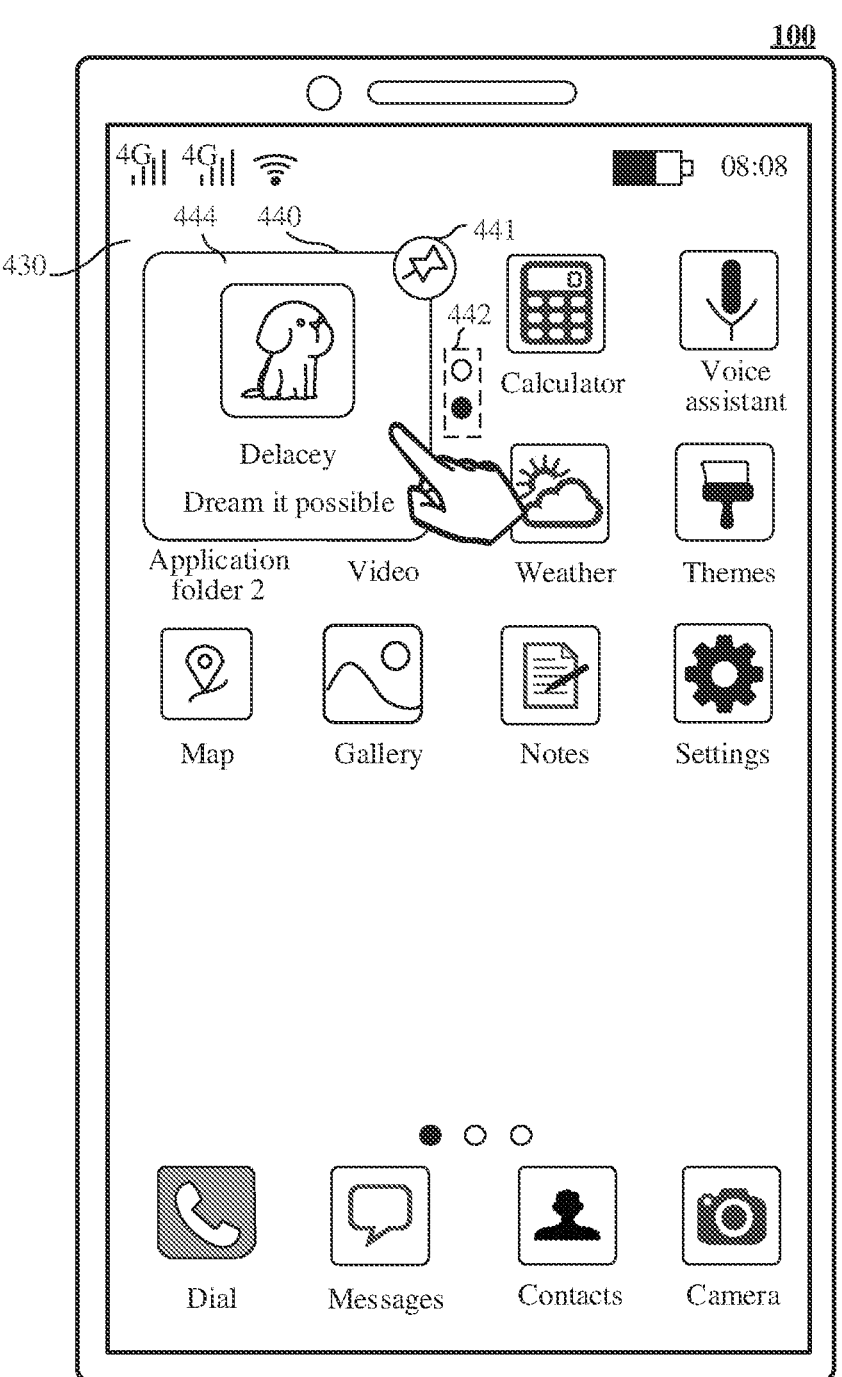

The electronic device 100 may receive the sliding operation (for example, upward sliding) of the user on the card stacking component 440. In response to the sliding operation, as shown in FIG. 4J, the electronic device 100 may switch to display, on the card stacking component 440, a music component 444 corresponding to a music application. For a text description of the music component 444, refer to the text description of the music component 422 in the embodiment shown in FIG. 4G. Details are not described herein again.

In embodiments of this application, after the electronic device 100 temporarily displays a card component corresponding to a first application in response to the sliding operation (for example, upward sliding) for the first application, the electronic device 100 may receive the input (for example, tapping) of the user for the card component. In response to the input, the electronic device 100 may display a specified interface in the first application.

For example, as shown in FIG. 4J, the electronic device 100 may receive a tapping operation of the user on the music component 444. In response to the tapping operation, the electronic device 100 may display a music playing interface 450 of the music application shown in FIG. 4K. The music playing interface 450 includes music information displayed in the music component 444 (for example, an album image, a name, a singer and the like of the specified music).

In a possible implementation, the electronic device 100 may add the card component corresponding to the first application to a blank area on the desktop in response to the sliding operation (for example, upward sliding) of the user on the icon of the first application on the desktop. In this way, it may be convenient for the user to quickly add the card component corresponding to the first application to the desktop.

In embodiments of this application, after receiving the sliding operation of the user on the icon of the first application, the electronic device 100 may temporarily cover and display the card component corresponding to the first application on the icon of the first application and placement areas of a plurality of application icons around the icon of the first application. A size of the card component may be a size covering a plurality of adjacent application icons. For example, the size of the card component may be a size horizontally covering one application icon and vertically covering two adjacent application icons, or a size horizontally covering two adjacent application icons and vertically covering one application icon. For another example, the size of the card component may be a size horizontally covering two adjacent application icons and vertically covering two adjacent application icons. For another example, the size of the card component may be a size horizontally covering two adjacent application icons and vertically covering four adjacent application icons, or a size horizontally covering four adjacent application icons and vertically covering two adjacent application icons. For another example, the size of the card component may be a size horizontally covering four adjacent application icons and vertically covering four adjacent application icons.

For conciseness and a beautiful appearance of the interface when the electronic device 100 temporarily displays the card component, the electronic device 100 may, when temporarily displaying the card component, hide a related element of the application icon covered by the card component. The related element of the application icon includes but is not limited to an application icon, an upper corner mark or a lower corner mark on the application icon, an application name, and the like.

Figure 5A:
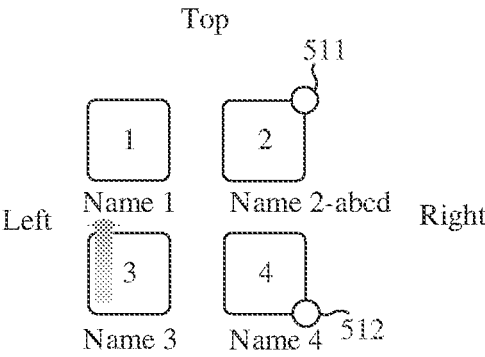
FIG. 5A to FIG. 5N are schematic diagrams of a group of display styles of card components according to an embodiment of this application.

For example, as shown in FIG. 5A, four application icons are arranged in two horizontal arrays and two vertical arrays. A name (for example, a "name 1") of the application icon 1 is displayed below the application icon 1, and a name (for example, a "name 2-abcd") of an application icon 512 is displayed below the application icon 521. A name (for example, a "name 3") of an application icon 513 is displayed below the application icon 513, and a name (for example, a "name 4") of an application icon 514 is displayed below the application icon 514. A corner mark 511 may be displayed in an upper right corner of an application icon 2, and a corner mark 512 may be displayed in a lower right corner of an application icon 4.

When the electronic device 100 detects an upward sliding operation of the user on the application icon 513, the electronic device 100 may temporarily display a card component corresponding to an application icon 3. The electronic device 100 displays a style of the card component corresponding to the application icon 3, which may be shown in FIG. 5B, FIG. 5C, FIG. 5D, or FIG. 5E.

Figure 5B:
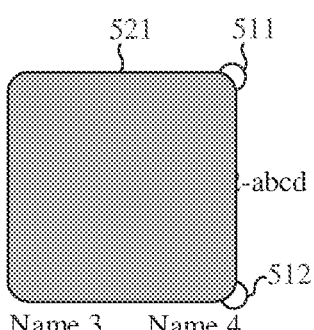

As shown in FIG. 5B, a size of the card component 521 corresponding to the application icon 3 may be the size horizontally covering two adjacent application icons and vertically covering two adjacent application icons. The electronic device 100 may directly cover the card component 521 on the application icon 1, the application icon 2, the application icon 3, and the application icon 4. A name of the application icon 1 may be hidden, and a part of a name of the application icon 2 is not hidden because a length of the name exceeds a length of the application icon 2. The upper corner mark 511 of the application icon 2 and the lower corner mark 512 of the application icon 4 may also remain displayed.

Figure 5C:
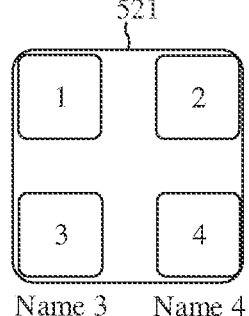

As shown in FIG. 5C, the electronic device 100 may directly cover the card component 521 on the application icon 1, the application icon 2, the application icon 3, and the application icon 4. The name of the application icon 1, the name of the application icon 2, the corner mark 511 of the application icon 2, and the corner mark 512 of the application icon 4 are all hidden. A name of the application icon 3 and a name of the application icon 4 may be displayed in a bottom direction of the card component 521.

Figure 5D:
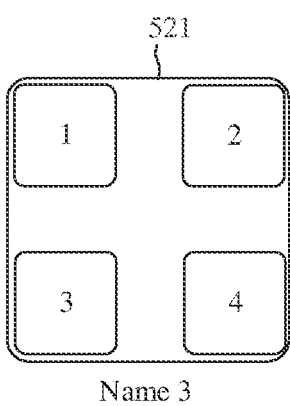

As shown in FIG. 5D, the electronic device 100 may directly cover the card component 521 on the application icon 1, the application icon 2, the application icon 3, and the application icon 4. The name of the application icon 1, the name of the application icon 2, the name of the application icon 4, the corner mark 511 of the application icon 2, and the corner mark 512 of the application icon 4 are all hidden. Only the name of the application icon 3 may be displayed below the card component 521. Optionally, the name of the application icon 3 may be displayed at a middle location in a bottom direction of the card component 521.

Figure 5E:
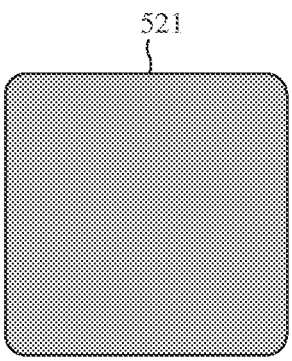

As shown in FIG. 5E, the electronic device 100 may cover the card component 521 on placement areas of the application icon in which the application icon 1, the application icon 2, the application icon 3, and the application icon 4 are located. The application icon 1, the application icon 2, application icon 3, and related elements of the three application icons are all hidden. Only the name of the application icon 3 is displayed in the bottom direction of the card component 521.

In embodiments of this application, when the electronic device 100 temporarily displays the card component of the first application, the card component of the first application preferentially covers the icon of the first application and a placement area of an application icon in a right or top direction of the icon of the first application. When an area in the right direction or an area in the top direction of the icon of the first application is insufficient to accommodate the card component of the first application, the electronic device 100 may cover and display the card component on the icon of the first application and the placement area of the application icon in the left or bottom direction. In the following example, the size of the card component of the first application is horizontally covering two adjacent application icons and vertically covering two adjacent application icons.

Figure 5F:
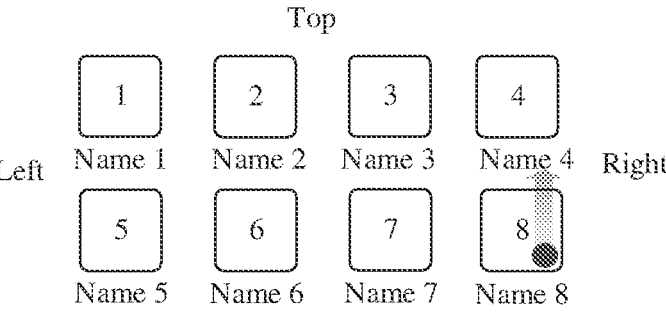
Figure 5G:
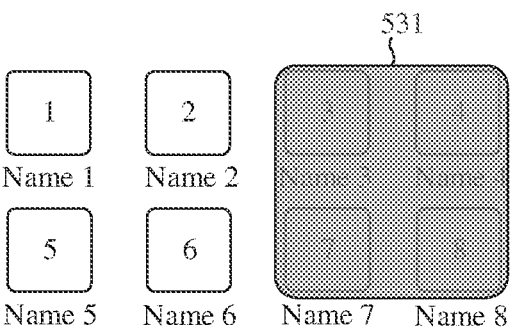

For example, as shown in FIG. 5F and FIG. 5G, four of eight application icons are arranged in a left-right direction and two of eight application icons are arranged in a top-to-bottom direction. The name (for example, the "name 1") of the application icon 1 is displayed below the application icon 1. The name (for example, the "name 2") of the application icon 2 is displayed below the application icon 2. The name (for example, the "name 3") of the application icon 3 is displayed below the application icon 3. The name (for example, the "name 4") of the application icon 4 is displayed below the application icon 4. The name (for example, the "name 5") of the application icon 5 is displayed below the application icon 5. The name (for example, the "name 6") of the application icon 6 is displayed below the application icon 6. The name (for example, the "name 7") of the application icon 7 is displayed below the application icon 7. The name (for example, the "name 8") of the application icon 8 is displayed below the application icon 8. When the electronic device 100 receives an upward sliding operation on the application icon 8, because there is no area on the right of the application icon 8 in which the application icon may be placed, the electronic device 100 may cover and display the card component 531 corresponding to the application icon 8 on the application icon 3, the application icon 4, the application icon 7, and the application icon 8.

Figure 5H:
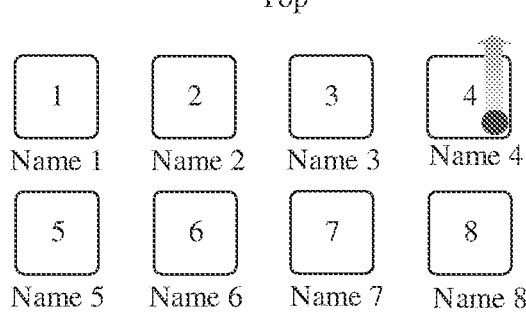
Figure 5I:
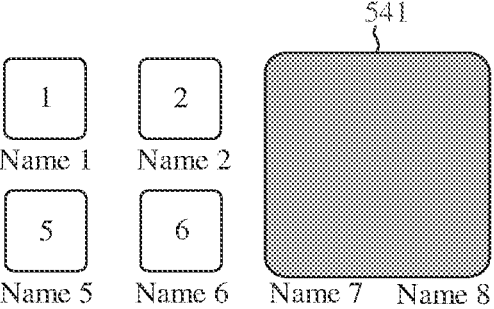

For another example, as shown in FIG. 5H and FIG. 5I, when the electronic device 100 receives an upward sliding operation on the application icon 4, because there is no area in which the application icon may be placed in a right direction and a top direction of the application icon 4, the electronic device 100 may cover and display the card component 541 corresponding to the application icon 4 on the application icon 3, the application icon 4, the application icon 7, and the application icon 8.

Figure 5J:
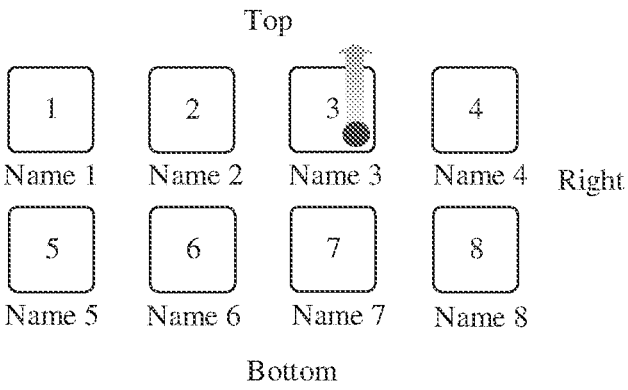
Figure 5K:
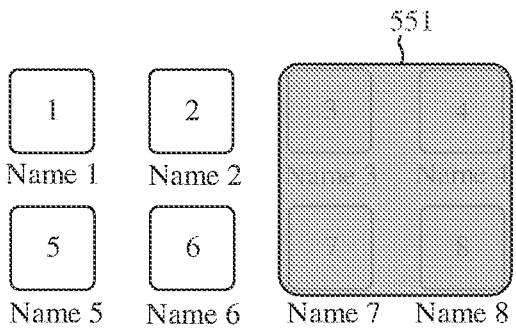

For another example, as shown in FIG. 5J and FIG. 5K, when the electronic device 100 receives an upward sliding operation on the application icon 3, because there is no area in which the application icon may be placed in a top direction of the application icon 3, the electronic device 100 may cover and display the card component 551 corresponding to the application icon 3 on the application icon 3, the application icon 4, the application icon 7, and the application icon 8.

In some embodiments, another card component is fixedly displayed around the first application. When the electronic device 100 temporarily displays the card component of the first application, the electronic device 100 may cover and display the card component of the first application on the icon of the first application and some areas of the another card component.

Figure 5L:
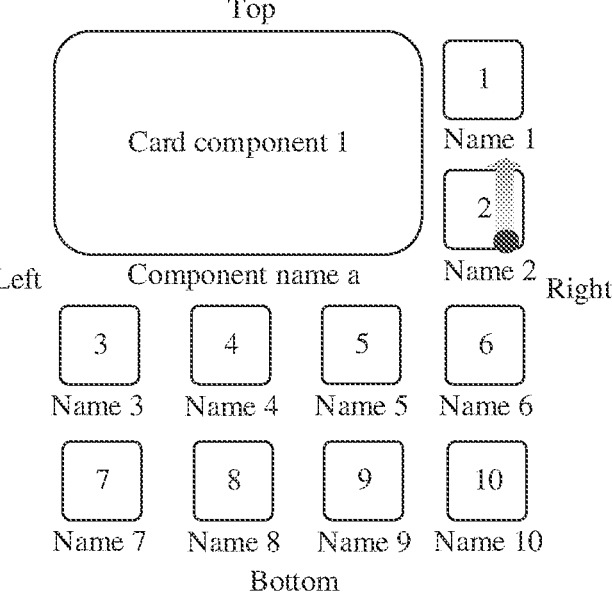
Figures 5M, 5N:
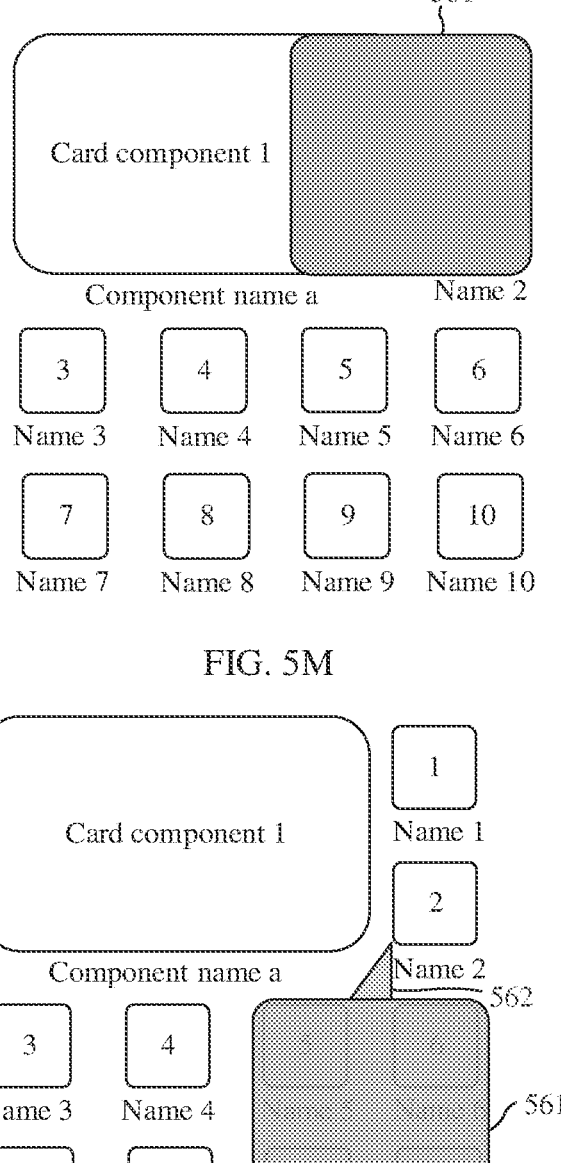

For example, as shown in FIG. 5L and FIG. 5M, the card component 1 is fixedly displayed on the left of the application icon 2, the application icon 1 is displayed in a top direction, there is no area in which the application icon may be placed on the right, and the application icon 6 is displayed in a bottom direction. The size of the card component 1 is horizontally covering two adjacent application icons and vertically covering two adjacent application icons. The name of the card component 1 (for example, a "component name a") is displayed below the card component 1. The name (for example, the "name 1") of the application icon 1 is displayed below the application icon 1. The name (for example, the "name 2") of the application icon 2 is displayed below the application icon 2. The name (for example, the "name 3") of the application icon 3 is displayed below the application icon 3. The name (for example, the "name 4") of the application icon 4 is displayed below the application icon 4. The name (for example, the "name 5") of the application icon 5 is displayed below the application icon 5. The name (for example, the "name 6") of the application icon 6 is displayed below the application icon 6. The name (for example, the "name 7") of the application icon 7 is displayed below the application icon 7. The name (for example, the "name 8") of the application icon 8 is displayed below the application icon 8. The name (for example, the "name 9") of the application icon 9 is displayed below the application icon 9. The name (for example, the "name 10") of the application icon 10 is displayed below the application icon 10. When the electronic device 100 receives an upward sliding operation on the application icon 2, the electronic device 100 may temporarily cover and display the card component 561 corresponding to the application icon 2 on the application icon 1, the application icon 2, and placement areas of two rightmost application icons of the card component 1.

In some embodiments, another card component is fixedly displayed around the first application. When the electronic device 100 temporarily displays the card component of the first application, the electronic device 100 may cover and display the card component of the first application in another area without overlapping with the another card component that has been fixedly displayed. In this way, when the card component of the first application is invoked and displayed, the card component that has been fixedly displayed is not shielded, to avoid that display content in the card component of the first application is shielded.

For example, as shown in FIG. 5N, when the electronic device 100 receives the upward sliding operation on the application icon 2, the electronic device 100 may temporarily cover and display the card component 561 corresponding to the application icon 2 on the application icon 5, the application icon 6, the application icon 9, and the application icon 10, and display a mark 562. The mark 562 indicates that the card component 561 is the card component corresponding to the application icon 2.

Optionally, if another card component is fixedly displayed around the first application, when the electronic device 100 temporarily displays the card component of the first application, the electronic device 100 may also reduce a display size of the fixedly displayed card component, so that the card component of the first application may be displayed around the first application (not shown in the figure). Alternatively, the electronic device 100 may reduce the display size of the card component of the first application, so that the card component of the first application may be displayed around the first application (not shown in the figure).

In some application scenarios, after temporarily displaying, in a floating manner, the card component corresponding to the first application around the icon of the first application, the electronic device 100 may fixedly add the temporarily displayed card component to a blank area on the desktop of the electronic device 100 through the input by the user. After the card component is fixedly added to the blank area on the desktop, if the electronic device 100 receives the input by the user for another blank area, the electronic device 100 still displays the card component on the desktop. In this way, the user may quickly find, from the application icon, the card component corresponding to the application icon, or may quickly and fixedly add the temporarily displayed card component to the desktop.

When temporarily displaying the card component corresponding to the first application, the electronic device 100 may further display a fixed control corresponding to the card component. After the electronic device 100 receives the input by the user for the fixed control, the electronic device 100 may fixedly display the temporarily displayed card component in a blank area that is on the desktop and that is not occupied by an application icon or another component.

Figure 6A:
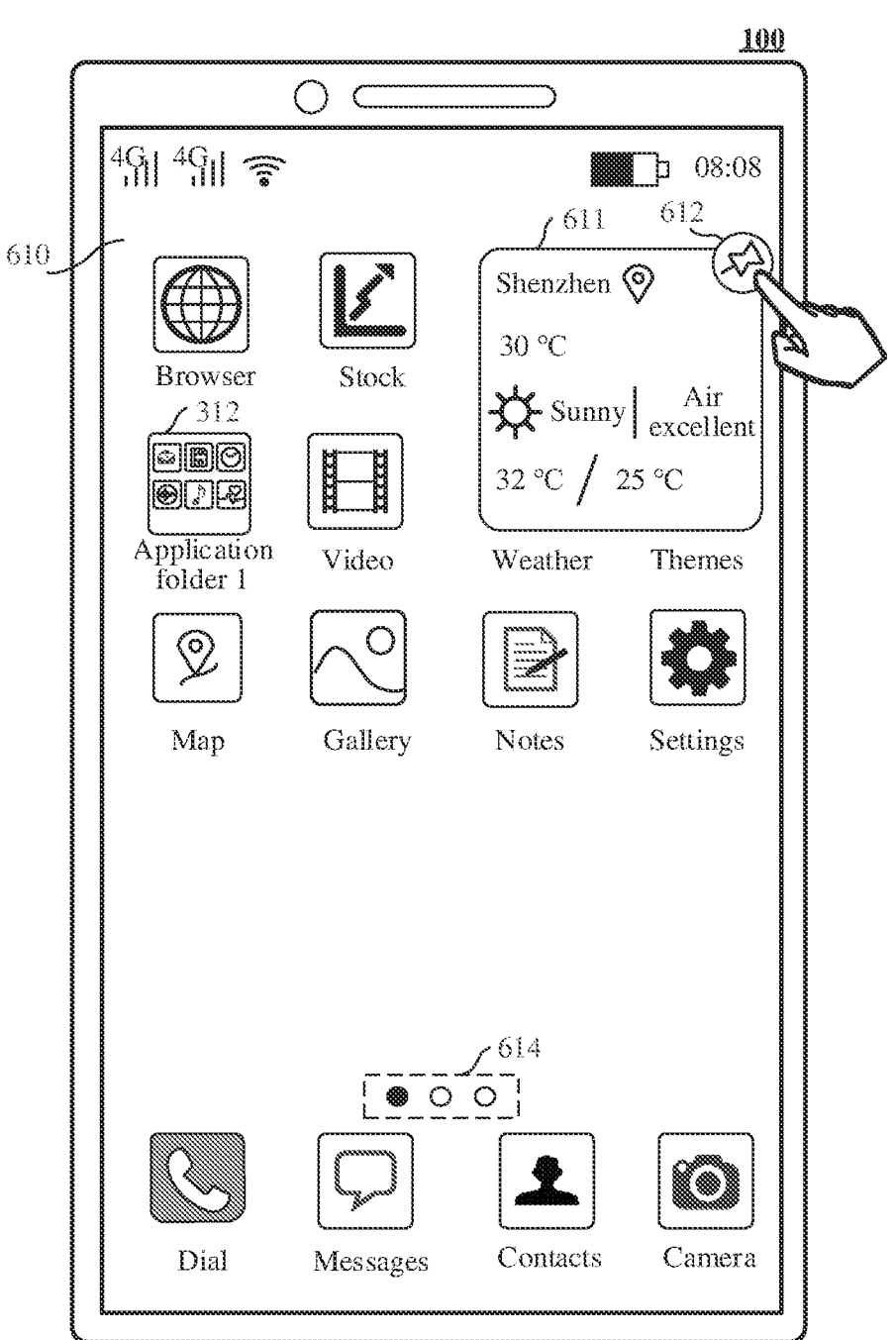
FIG. 6A to FIG. 6E are schematic diagrams of a group of interfaces of adding a card component to a desktop according to an embodiment of this application.

For example, as shown in FIG. 6A, an electronic device 100 may display an interface 610 on a desktop. The electronic device 100 may display, on the interface 610, a weather component 611 and a fixed control 612 that correspond to a weather application icon in response to a sliding operation (for example, upward sliding) performed by a user on the weather application icon. For a text description of the interface 610, refer to a text description of the interface 310 in the embodiment shown in FIG. 4B. Details are not described herein again.

Figure 6B:
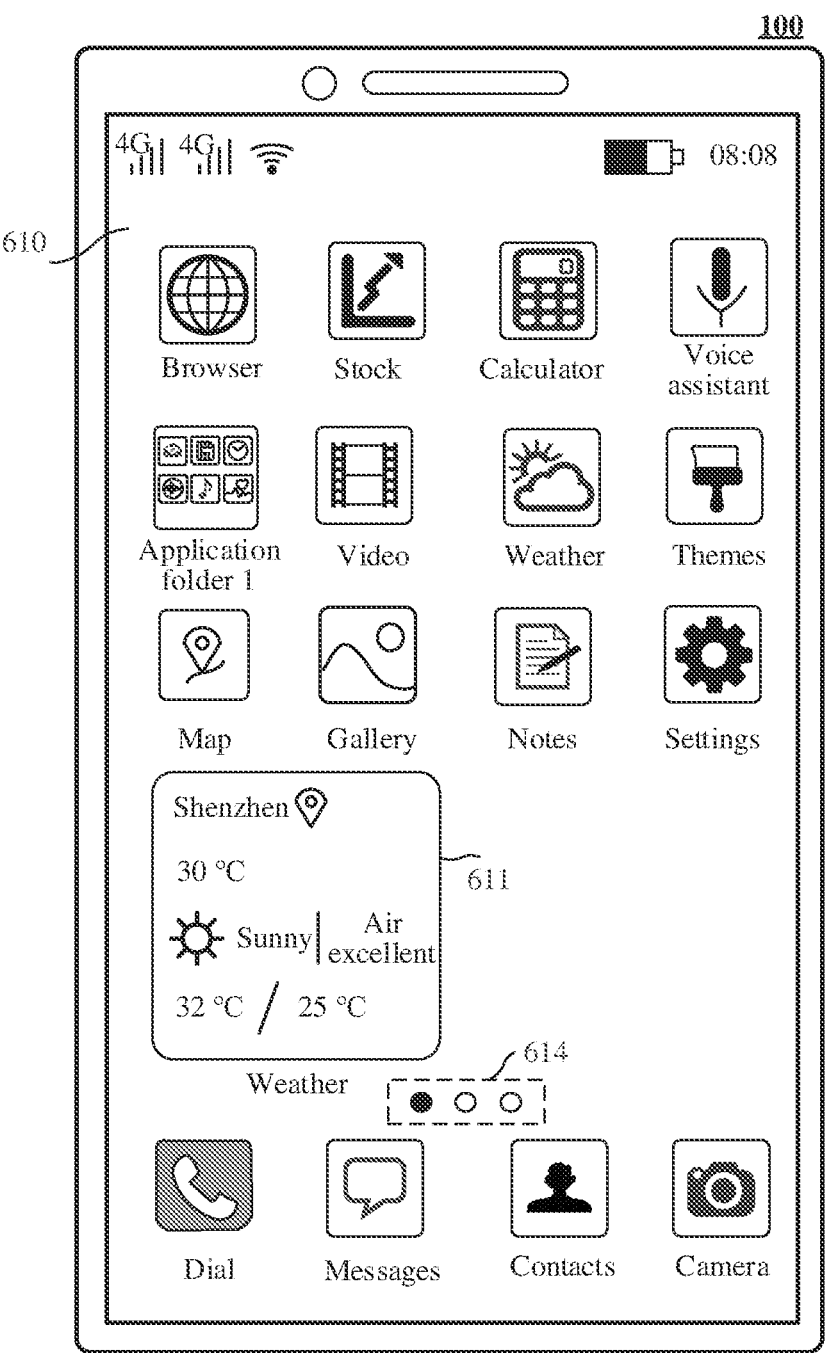

The electronic device 100 may receive an input (for example, tapping) of the user for the fixed control 612. In response to the input, as shown in FIG. 6B, the electronic device 100 may add the weather component 611 to a blank area on a page on which the weather application icon is located on the interface 610 on the desktop. After the weather component 611 is added to the blank area on the desktop, if the electronic device 100 receives the input by the user for another blank area, the electronic device 100 still displays the weather component 611 on the desktop.

When the page on which an icon of a first application on the desktop is located does not have a blank area that may accommodate a card component corresponding to the first application, the electronic device 100 may add the card component to a blank area on a last page on the desktop.

Figure 6C:
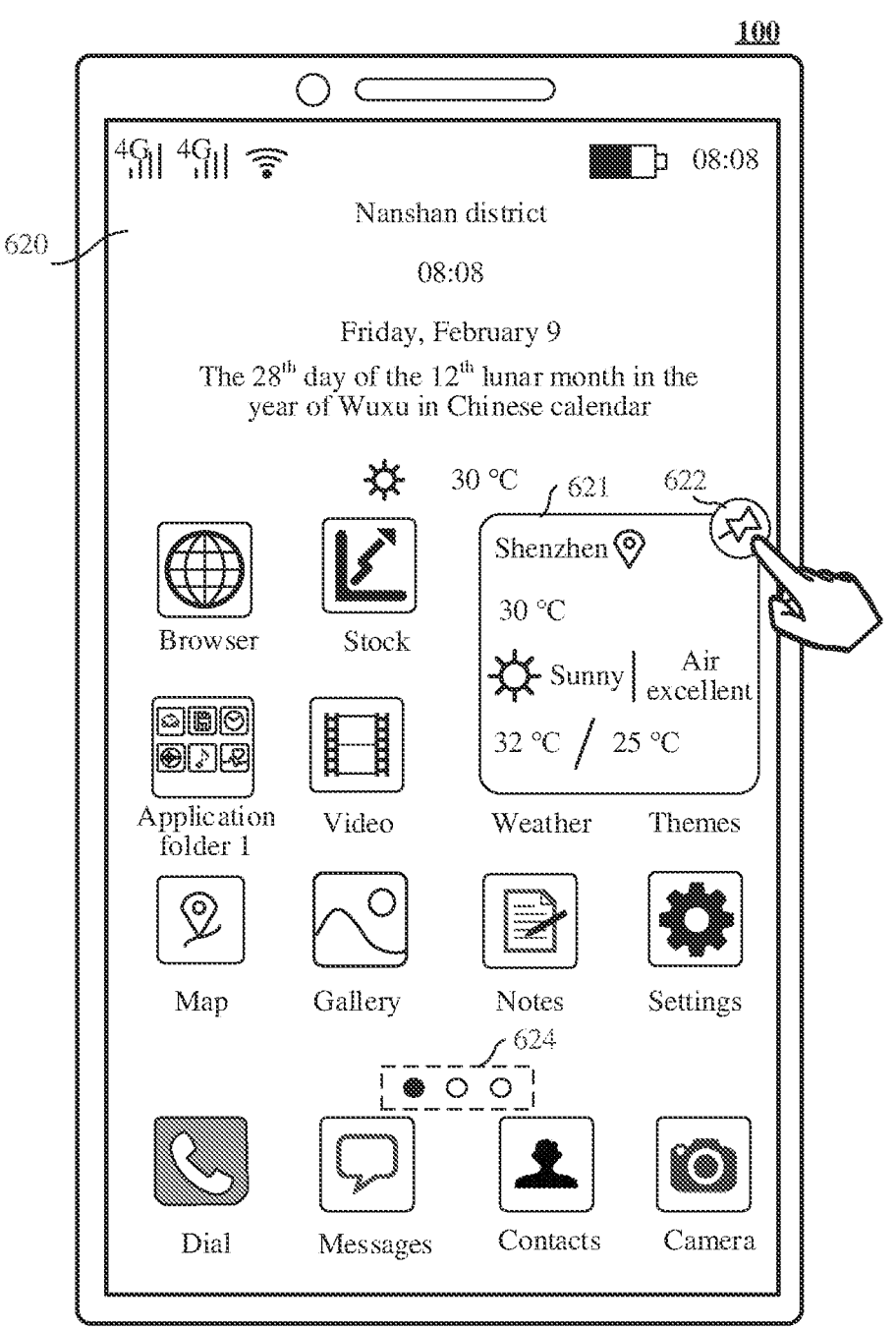

For example, as shown in FIG. 6C, the electronic device 100 displays an interface 620 on the desktop. The interface 620 temporarily displays a weather component 621 and a fixed control 622 corresponding to the weather application icon. There is no blank area for accommodating the weather component 621 on the page displayed on the interface 620. After the electronic device 100 receives an operation for the fixed control 622, as shown in FIG. 6D, the electronic device 100 may add the weather component 621 to the blank area on the last page on which an application icon is placed on the desktop.

Figure 6D:
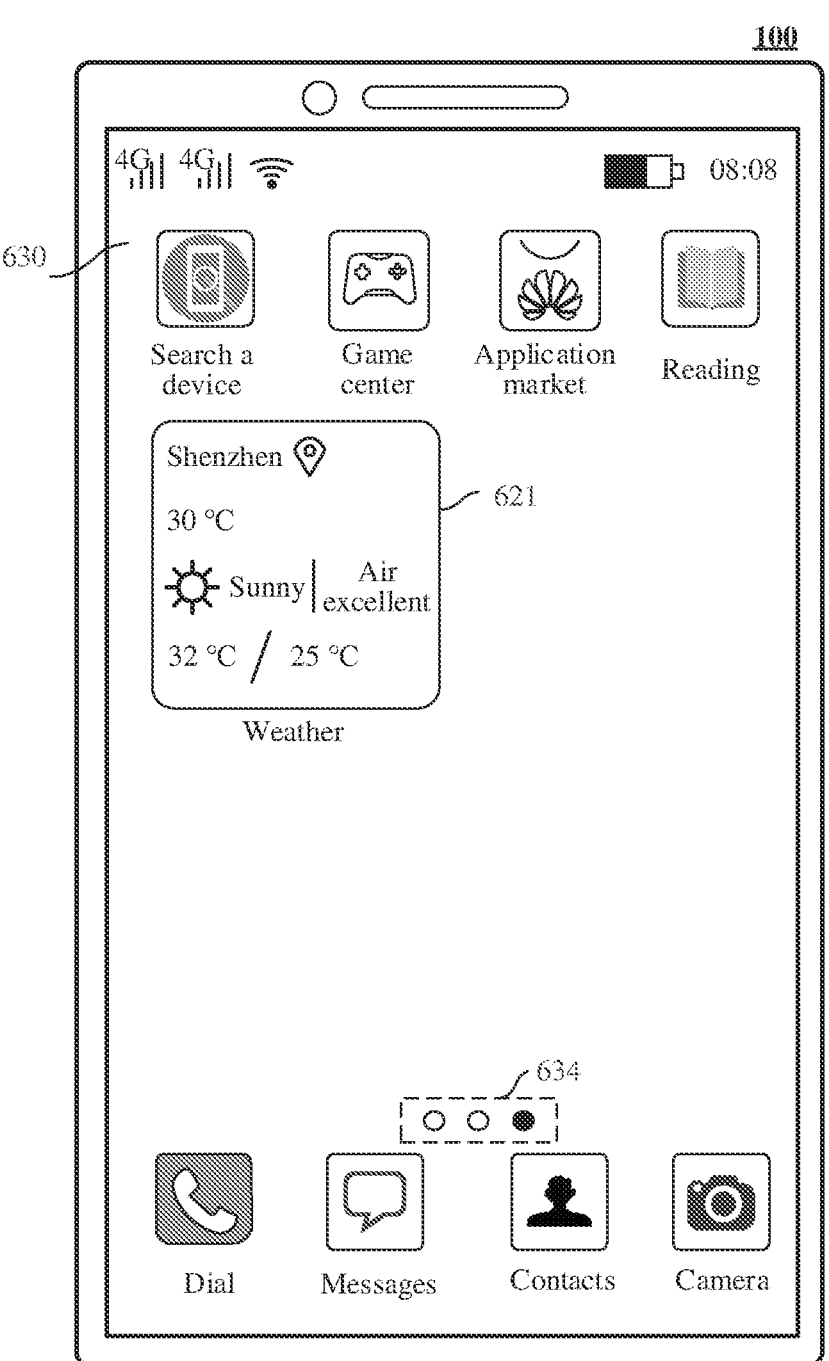

As shown in FIG. 6D, the electronic device 100 displays an interface 630 on the desktop, and a black dot in a page indicator 634 indicates that a page currently displayed on the interface 630 is the last page on which the application icon is placed on the desktop. The interface 630 displays one or more application icons (for example, searching for a device application icon, a game center application icon, an application market application icon, a reading application icon, or the like) and weather components 621.

In a possible implementation, when the page on which the icon of the first application on the desktop is located does not have a blank area that may accommodate the card component corresponding to the first application, the electronic device 100 may newly create a page on the desktop that may place the application icon and the card component, and add the card component corresponding to the first application to the newly created page.

The newly created page may be a newly created blank page before a page on which the icon of the first application is located, or a newly created blank page after the page on which the icon of the first application is located, or may be a newly created blank page on the last page on the desktop.

Figure 6E:
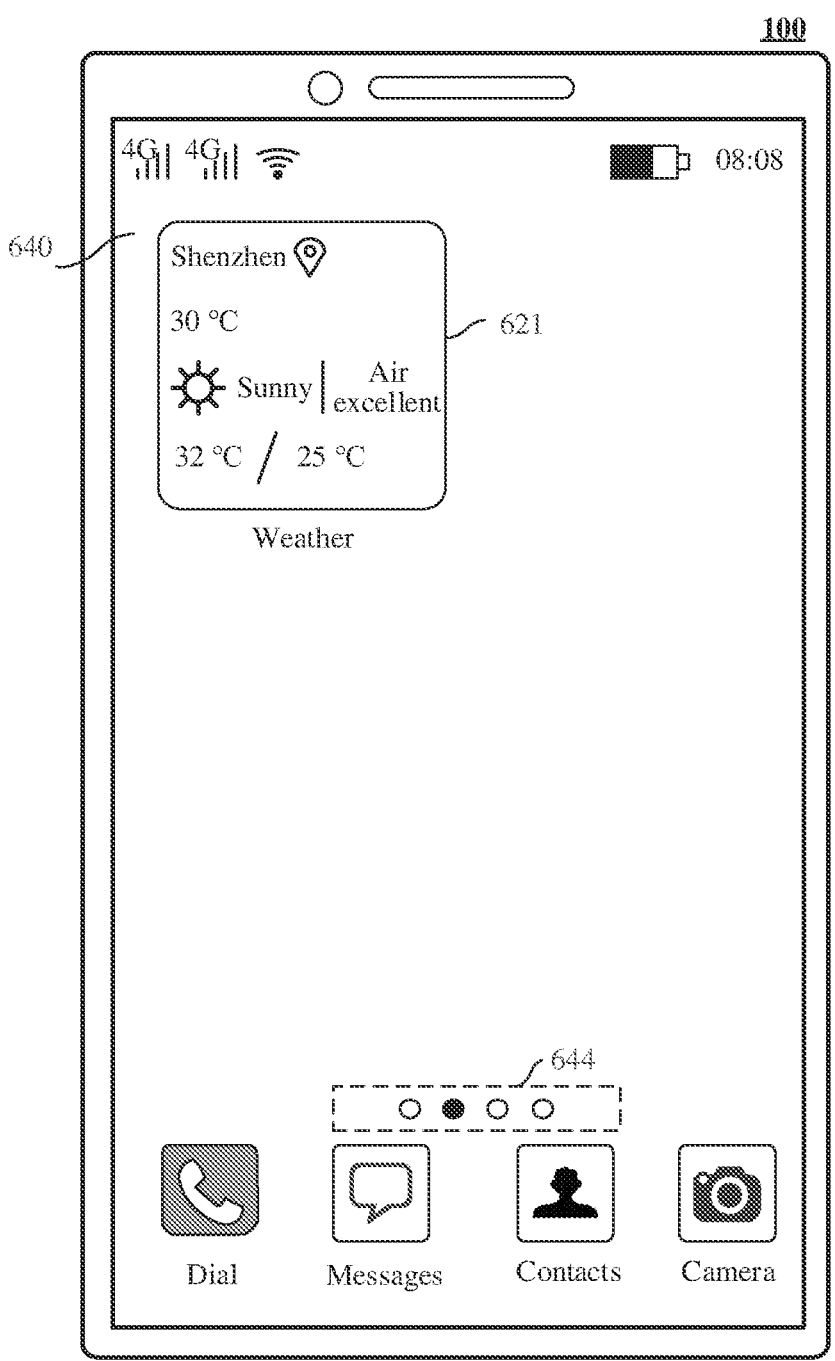

As shown in FIG. 6E, after the electronic device 100 receives the input by the user for the fixed control 622 shown in FIG. 6C, the electronic device 100 may display an interface 640 on the desktop. The interface 640 displays the weather component 621 and a page indicator 644. A black dot in the page indicator 644 indicates that a page displayed on the interface 640 is a newly created page on the right of the page displayed on the interface 620 shown in FIG. 6C.

In a possible implementation, when the page on which the icon of the first application on the desktop is located does not have the blank area that may accommodate the card component corresponding to the first application, the electronic device 100 may add the card component corresponding to the first application to a specified interface. For example, the electronic device 100 may add the card component to a HiBoard, a control center interface, a service center interface, and the like.

In a possible implementation, after temporarily displaying the card component corresponding to the first application, the electronic device 100 may receive a drag operation of the user on the card component. Based on the drag operation, the electronic device 100 may add the temporarily displayed card component to the blank area on the desktop.

Figure 7A:
FIG. 7A to FIG. 7I are schematic diagrams of another group of interfaces of adding a card component to a desktop according to an embodiment of this application.

For example, as shown in FIG. 7A, an electronic device 100 may display an interface 710 on a desktop. The electronic device 100 may display, on the interface 710, a weather component 711 corresponding to a weather application icon in response to a sliding operation (for example, upward sliding) performed by a user on the weather application icon. For a text description of the interface 710, refer to a text description of the interface 310 in the embodiment shown in FIG. 4B. Details are not described herein again.

The electronic device 100 may receive a drag operation of the user on the card component 711. In response to the drag operation, the electronic device 100 may fix the electronic device 100 at an end location of the drag operation based on the drag operation. In this way, the user may add the card component that is temporarily displayed to a specified placement location on the desktop through one operation. This simplifies an operation step of adding the card component to the specified placement location on the desktop by the user.

Figure 7B:
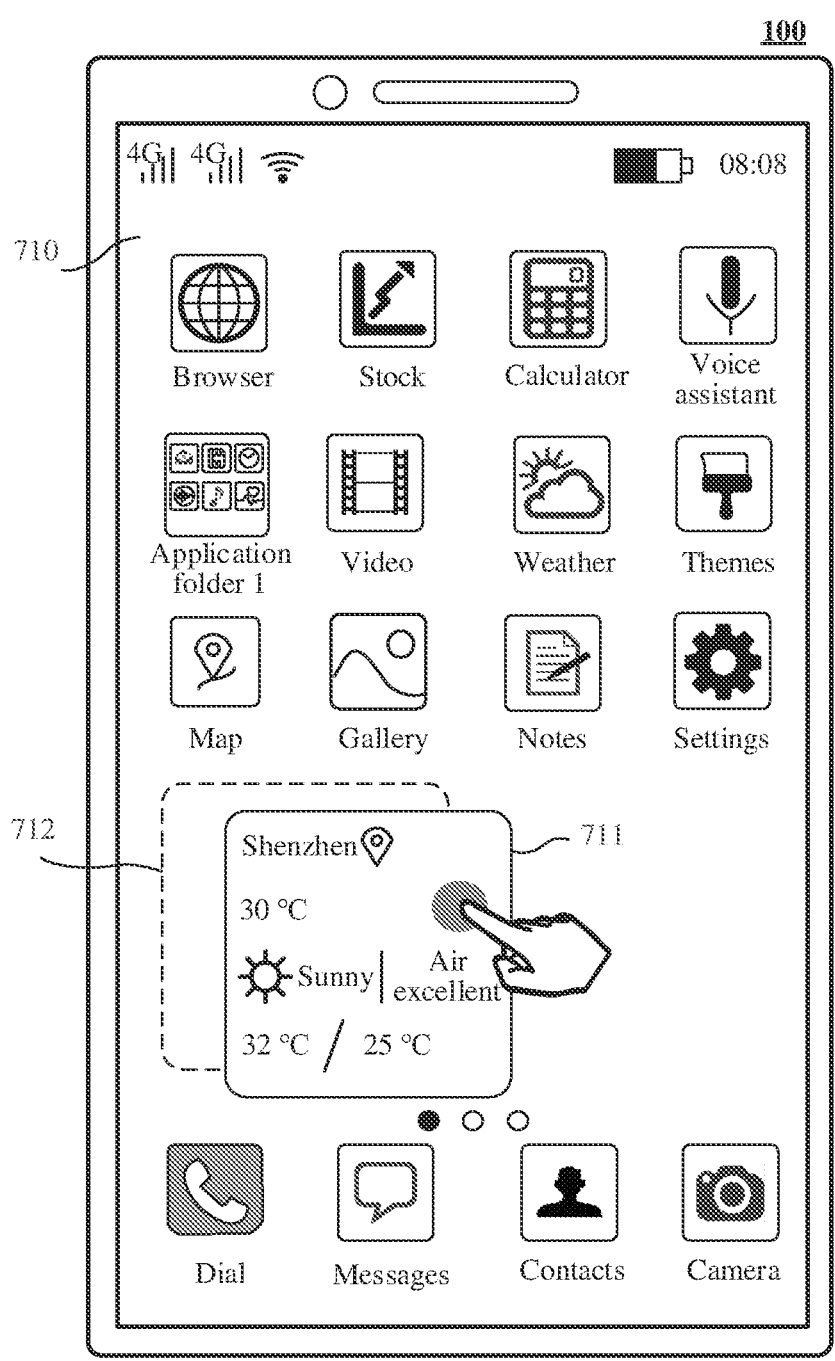

As shown in FIG. 7B, when the drag operation stays in an area 712, the electronic device 100 may display a placement prompt in the area 712. The placement prompt may be used to prompt the user to place the weather component 711 in the area 712.

Figure 7C:
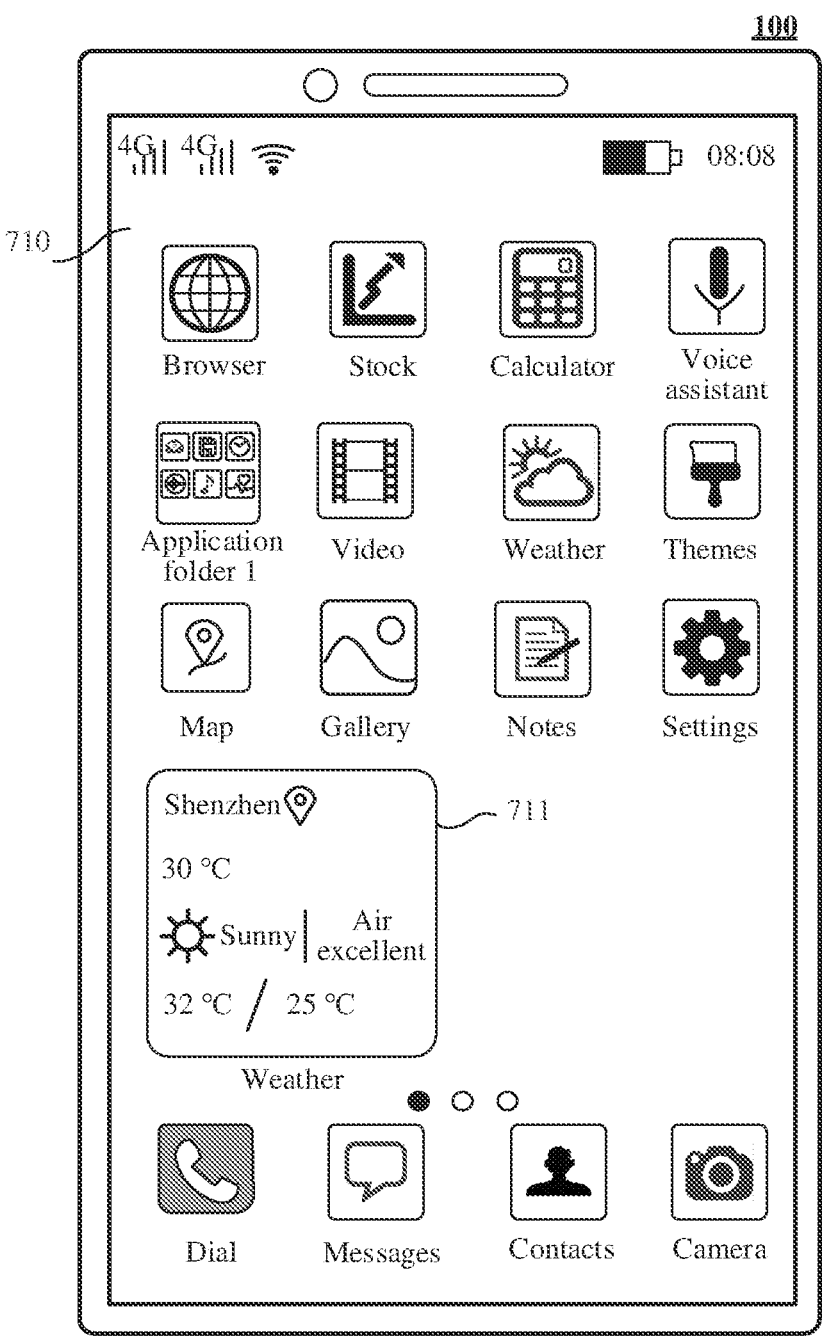

As shown in FIG. 7C, when the end location of the drag operation is close to the area 712, the electronic device 100 may fixedly add the weather component 711 to the area 712.

In a possible implementation, after temporarily displaying a card component corresponding to a first application, the electronic device 100 may receive a drag operation of the user on the card component. Based on the drag operation, the electronic device 100 combines the card component with other card components that have been added to the desktop into one card stacking component.

Figure 7D:
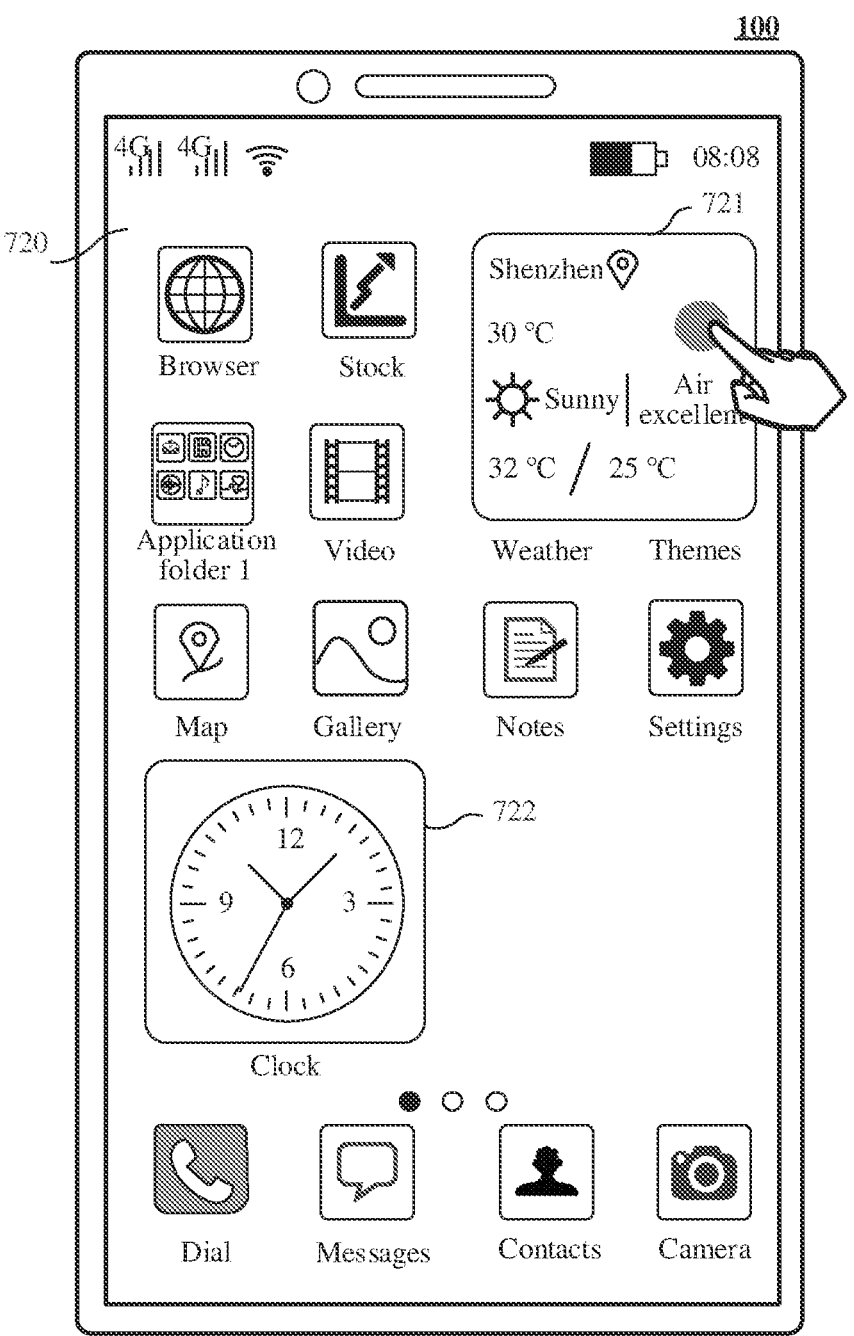

For example, as shown in FIG. 7D, the electronic device 100 displays an interface 720 on the desktop. The electronic device 100 may display, on the interface 720, a weather component 721 corresponding to a weather application icon in response to a sliding operation (for example, upward sliding) performed by a user on the weather application icon. The interface 720 further displays a clock component 722 that has been added to the desktop.

Figure 7E:
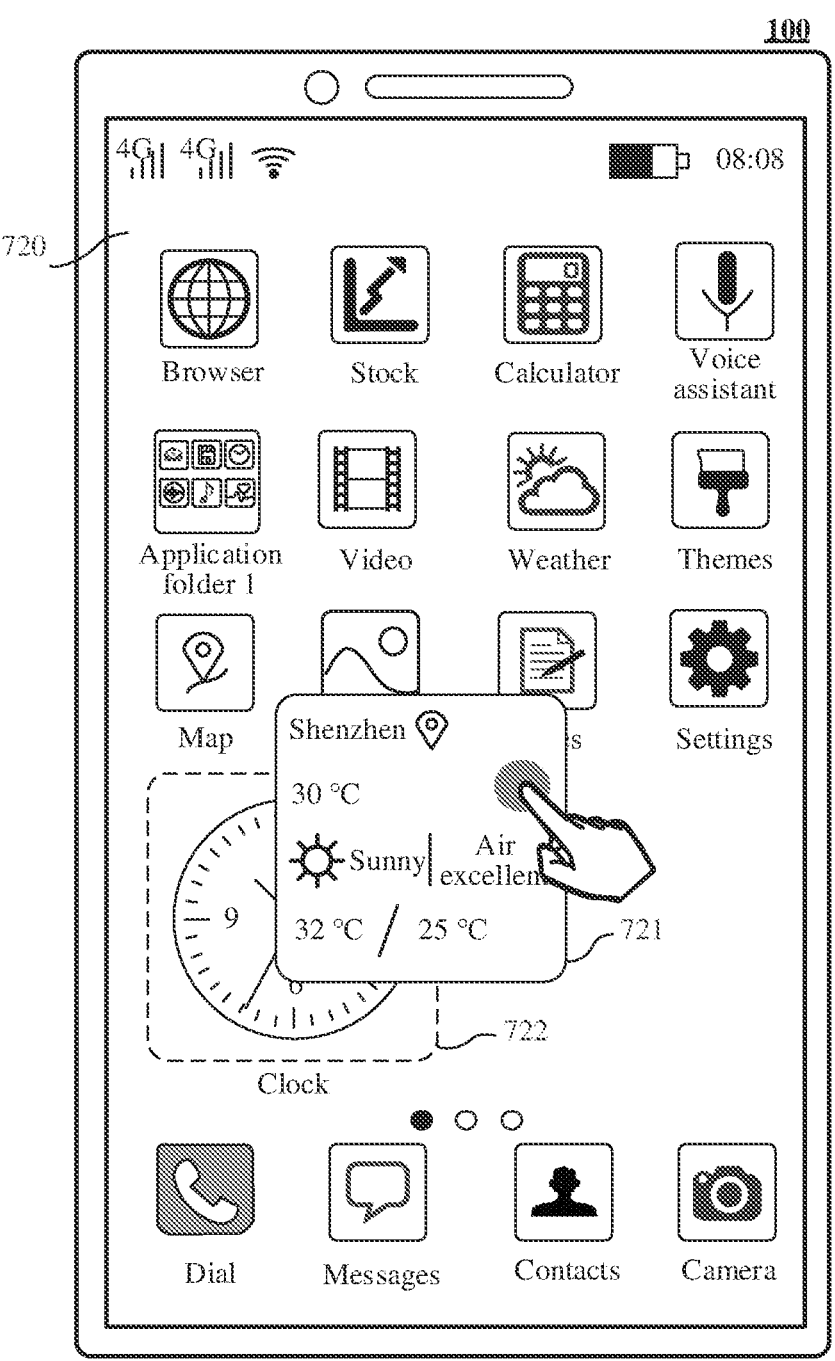

As shown in FIG. 7E, the electronic device 100 may receive a drag operation of the user on the weather component 721. When the weather component 721 is dragged close to the clock component 722, the electronic device 100 may display the placement prompt around the clock component 722. The placement prompt is used to prompt the user that the weather component 721 and the clock component 722 may be combined into a same card stacking component.

Figure 7F:
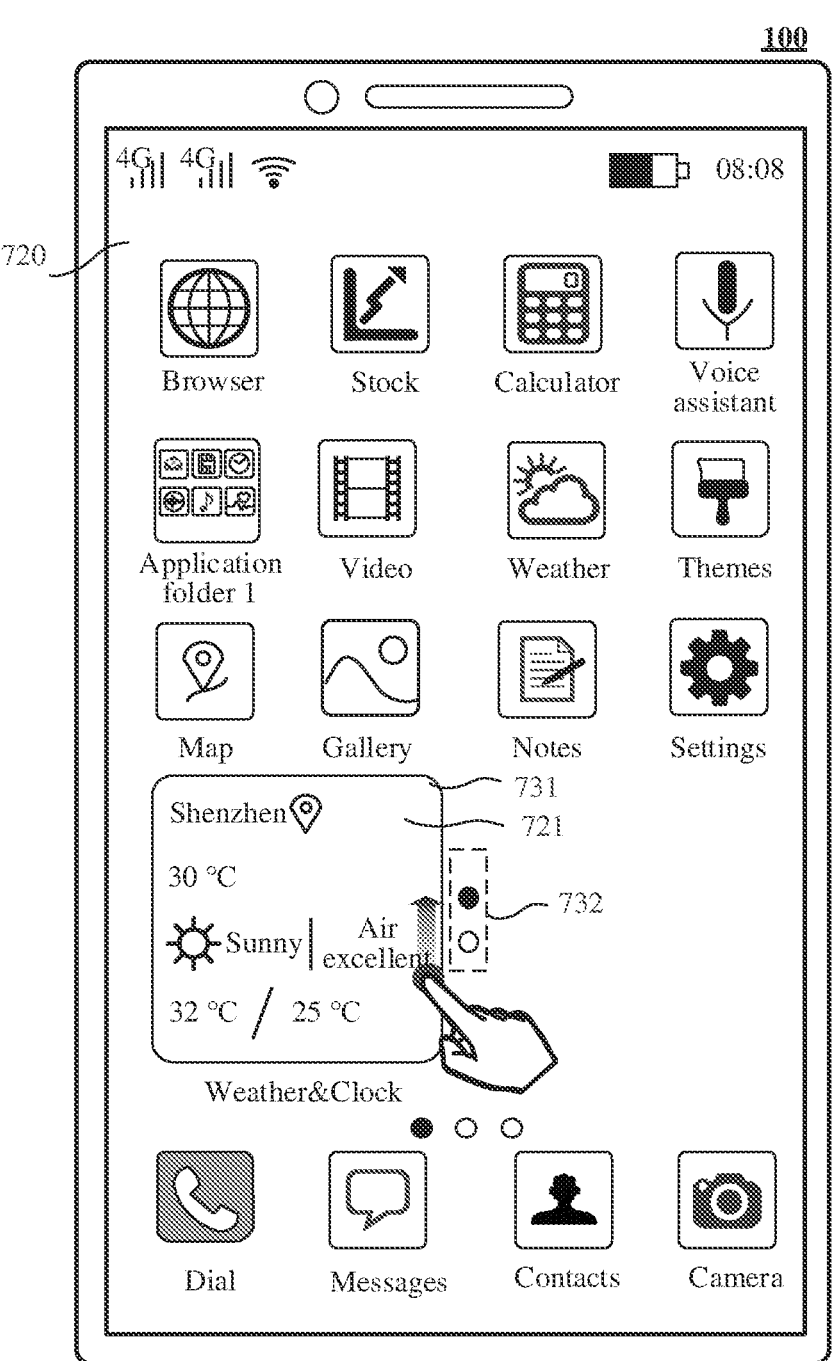

As shown in FIG. 7F, when the end location of the drag operation is close to the clock component 722, the electronic device 100 may display a card stacking component 731 and an indicator 732 on the interface 720. The weather component 721 may be currently displayed on the card stacking component 731. The indicator 732 may indicate a location relationship of a card component currently displayed on the card stacking component 731 relative to other card components in the card stacking component 731. For example, a black dot in the indicator 732 is above a white dot, representing that the weather component 721 currently displayed on the card stacking component 731 is arranged on top of the clock component 722.

Figure 7G:
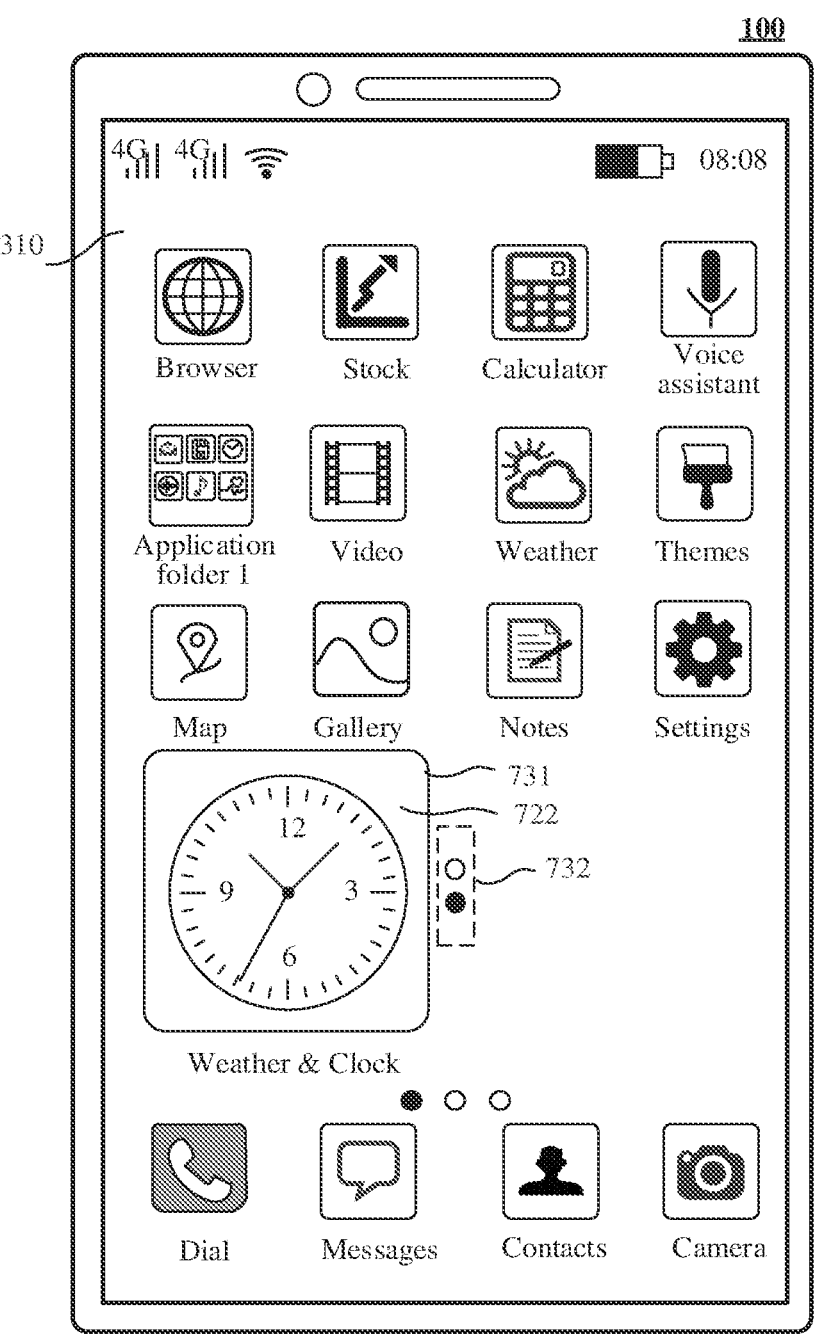

The electronic device 100 may receive a sliding operation (for example, upward sliding) of the user on the card stacking component 731. In response to the sliding operation, as shown in FIG. 7G, the electronic device 100 may switch to display, on the card stacking component 731, the clock component 722.

In embodiments of this application, in a process in which the electronic device 100 adds the temporarily displayed card component to the desktop based on the drag operation, the electronic device 100 may display a cancellation hot area. When the temporarily displayed card component is dragged close to the cancellation hot area, the electronic device 100 may exit displaying the card component. In this way, in a process in which the user adds the temporarily displayed card component to the desktop through a drag operation, there may be an opportunity to cancel the return.

Figure 7H:
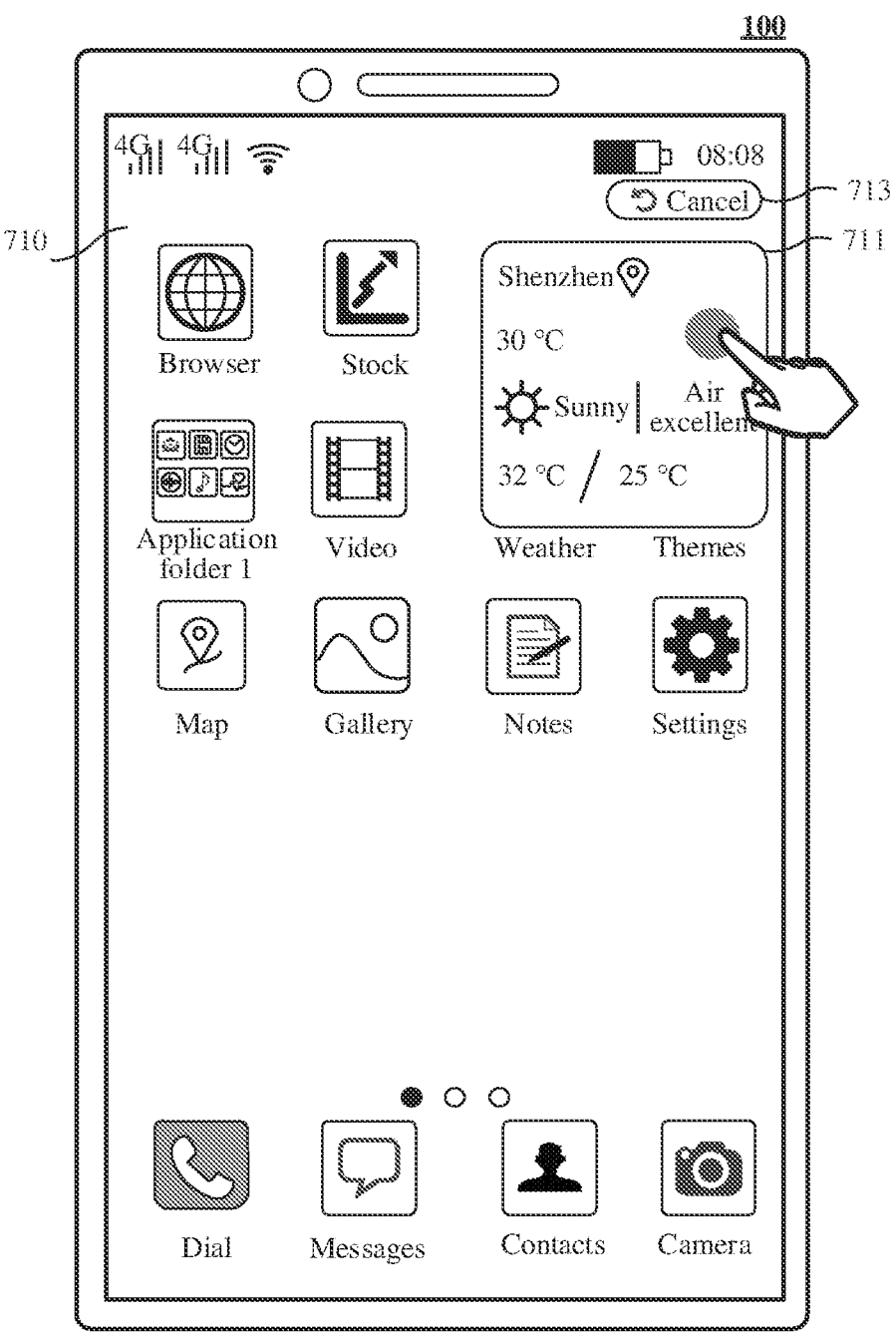
Figure 7I:
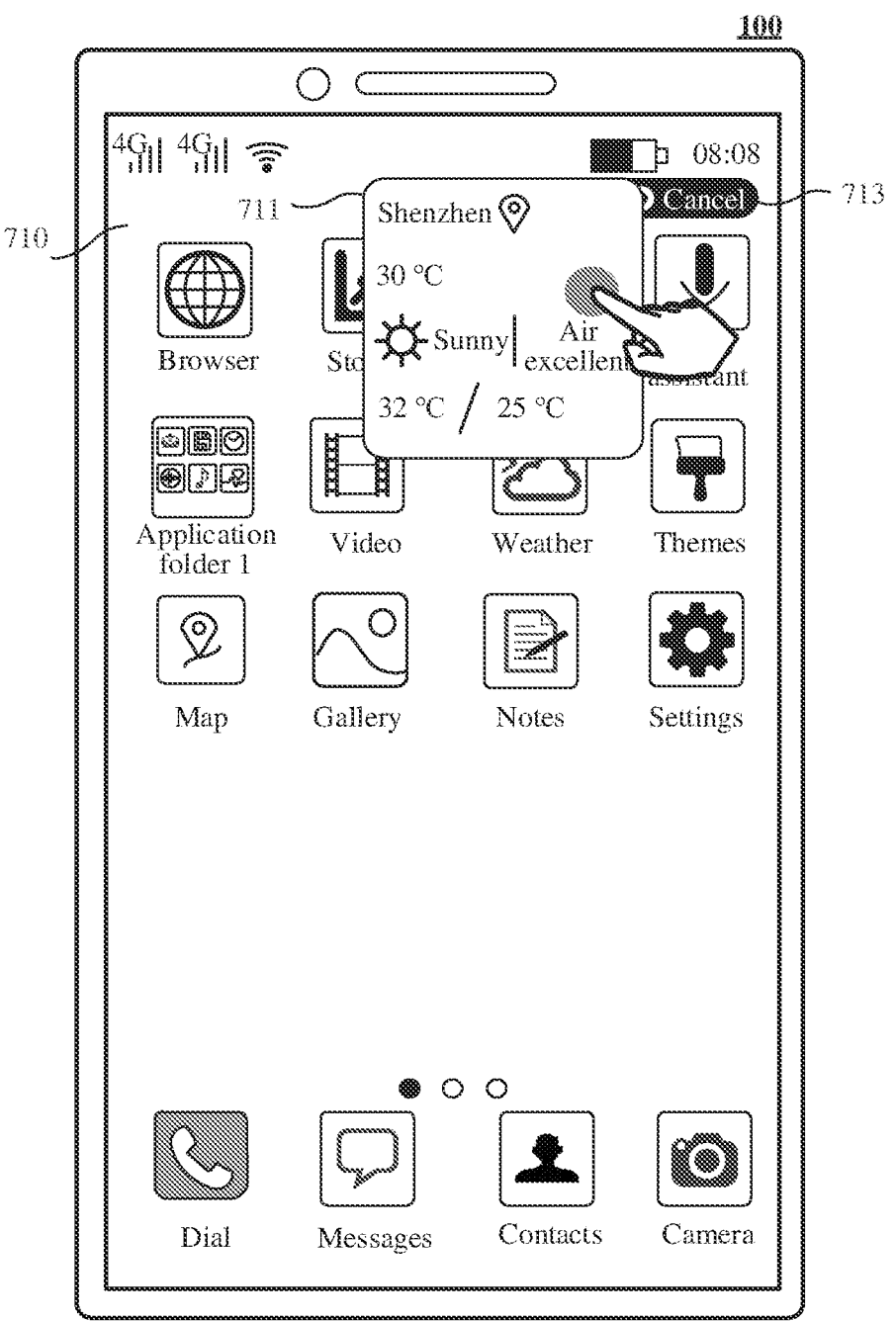

For example, as shown in FIG. 7H and FIG. 7I, the electronic device 100 displays an interface 710 on the desktop. For a text description of the interface 710, refer to a text part in the embodiment shown in FIG. 7A. Details are not described herein again. In a process in which the temporarily displayed weather component 711 is dragged by the user, the electronic device 100 may display the cancellation hot area 713 on the interface 710. When the weather component 711 is dragged close to the cancellation hot area 713, the electronic device 100 may exit displaying the weather component 711. After the electronic device 100 exits displaying the weather component 711, the electronic device 100 receives a sliding operation (for example, upward sliding) of the user for a weather application, and the electronic device 100 may still temporarily display the weather component 711 again.

In a possible implementation, after the electronic device 100 temporarily displays the card component corresponding to the first application, the electronic device 100 may receive an input (for example, touch-and-hold) for the card component. In response to the input, the electronic device 100 may display a shortcut menu corresponding to the card component. The shortcut menu includes an add-to-desktop control. After the electronic device 100 receives an input (for example, tapping) of the user for the add-to-desktop control, the electronic device 100 may add the card component to a blank area that is on the desktop and that is not occupied by an application icon or another component.

Figure 8A:
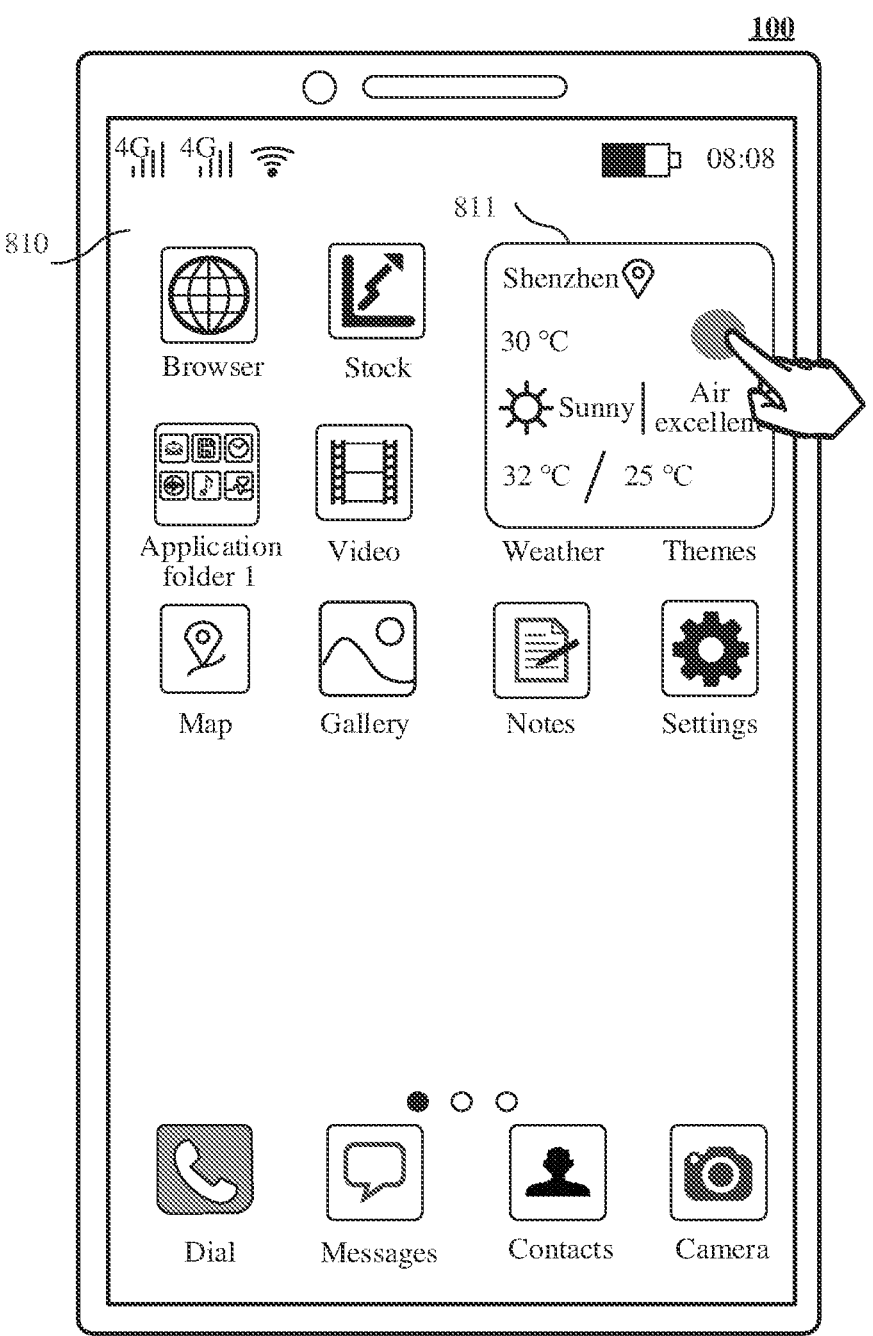
FIG. 8A to FIG. 8C are schematic diagrams of another group of interfaces of adding a card component to a desktop according to an embodiment of this application.

For example, as shown in FIG. 8A, an electronic device 100 may display an interface 810 on a desktop. The electronic device 100 may display, on the interface 810, a weather component 811 corresponding to a weather application icon in response to a sliding operation (for example, upward sliding) performed by a user on the weather application icon. For a text description of the interface 810, refer to a text description of the interface 310 in the embodiment shown in FIG. 4B. Details are not described herein again.

The electronic device 100 may receive a touch-and-hold operation on the weather component 811. In response to the touch-and-hold operation, as shown in FIG. 8B, the electronic device 100 may display a shortcut menu 812 corresponding to the weather component 811.

Figure 8B:
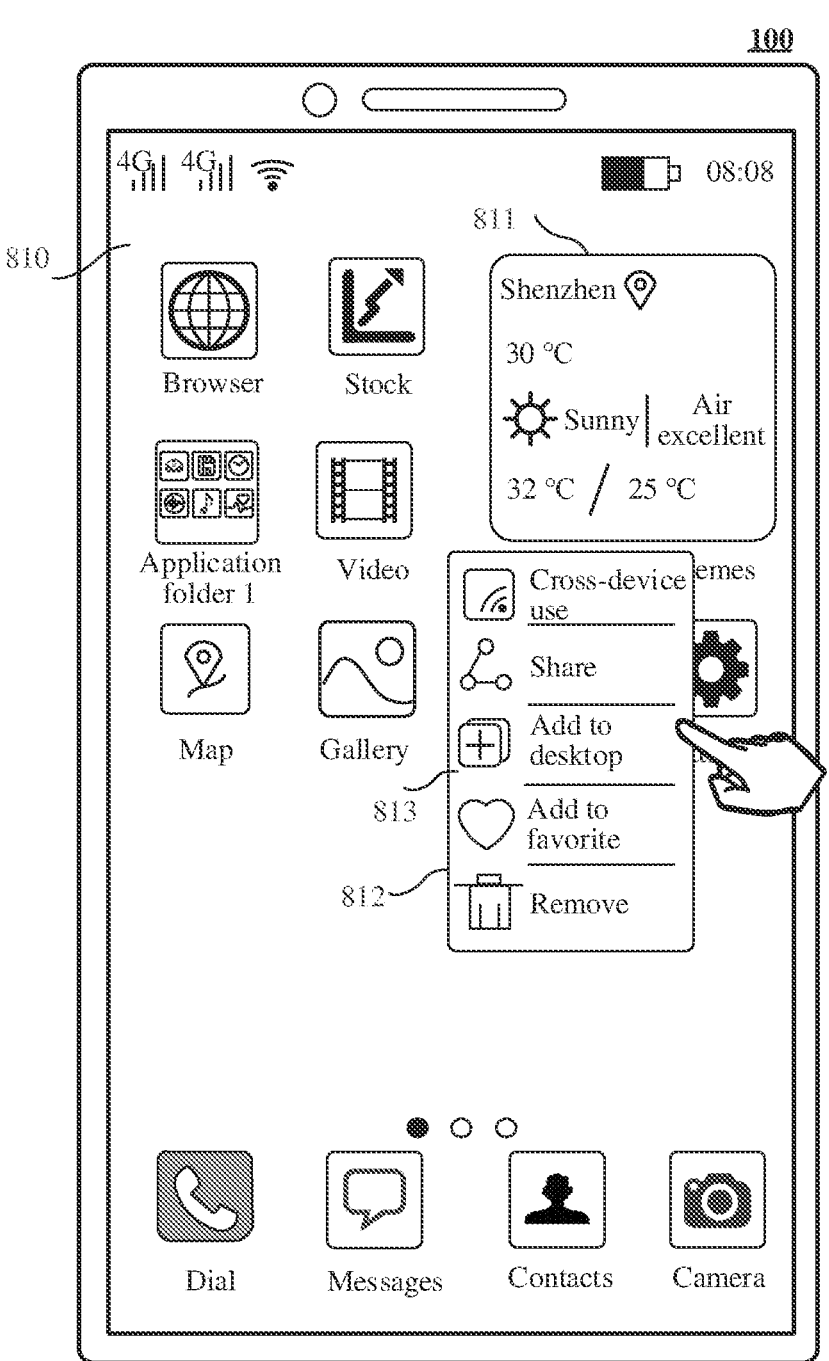

As shown in FIG. 8B, the shortcut menu 812 may include an add-to-desktop control 813 and another control (for example, a cross-device use control, a sharing control, a favorite control, a removal control, or the like). The add-to-desktop control 813 may be used to trigger the electronic device 100 to add the weather component 811 to a blank area on the desktop. The cross-device use control may be used to trigger the electronic device 100 to provide the weather component 811 for another device for use. The sharing control may be used to trigger the electronic device 100 to share information displayed in the weather component 811 with another device. The favorite control may be used to trigger the electronic device 100 to save the weather component 811 to a specified interface or a specified folder. The removal control may be used to trigger the electronic device 100 to exit displaying the weather component 811.

Figure 8C:
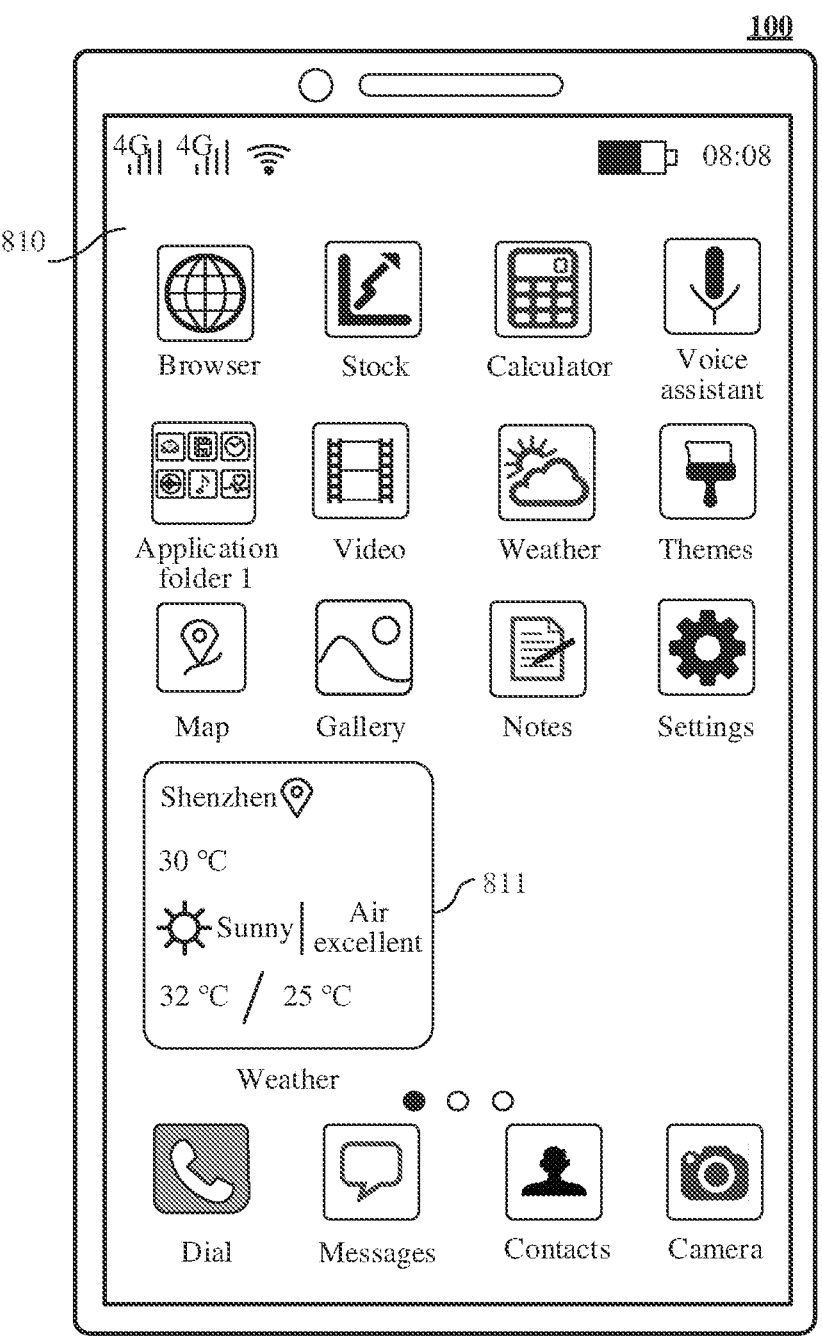

The electronic device 100 may receive an input (for example, tapping) for the add-to-desktop control 813. In response to the input, as shown in FIG. 8C, the electronic device 100 may add the weather component 811 to a blank area on a page on which a weather application icon is located on an interface 810 on the desktop. After the weather component 811 is added to the blank area on the desktop, if the electronic device 100 receives the input by the user for another blank area, the electronic device 100 still displays the weather component 811 on the desktop.

Optionally, when the page on which the weather application icon is located on the desktop does not have a blank area that may accommodate the weather component 811, the electronic device 100 may add the weather component 811 to a blank area on a last page on the desktop, or newly create a page on which the application icon and card component may be placed on the right of the page on which the weather application icon is located, and add the weather component to the newly created page.

In some embodiments, after adding the card component to the desktop, the electronic device 100 may adjust a location of the card component on the desktop through the input by the user. In this way, it may be convenient for the user to adjust a display location of the card component on the desktop. This improves user experience.

Figure 9A:
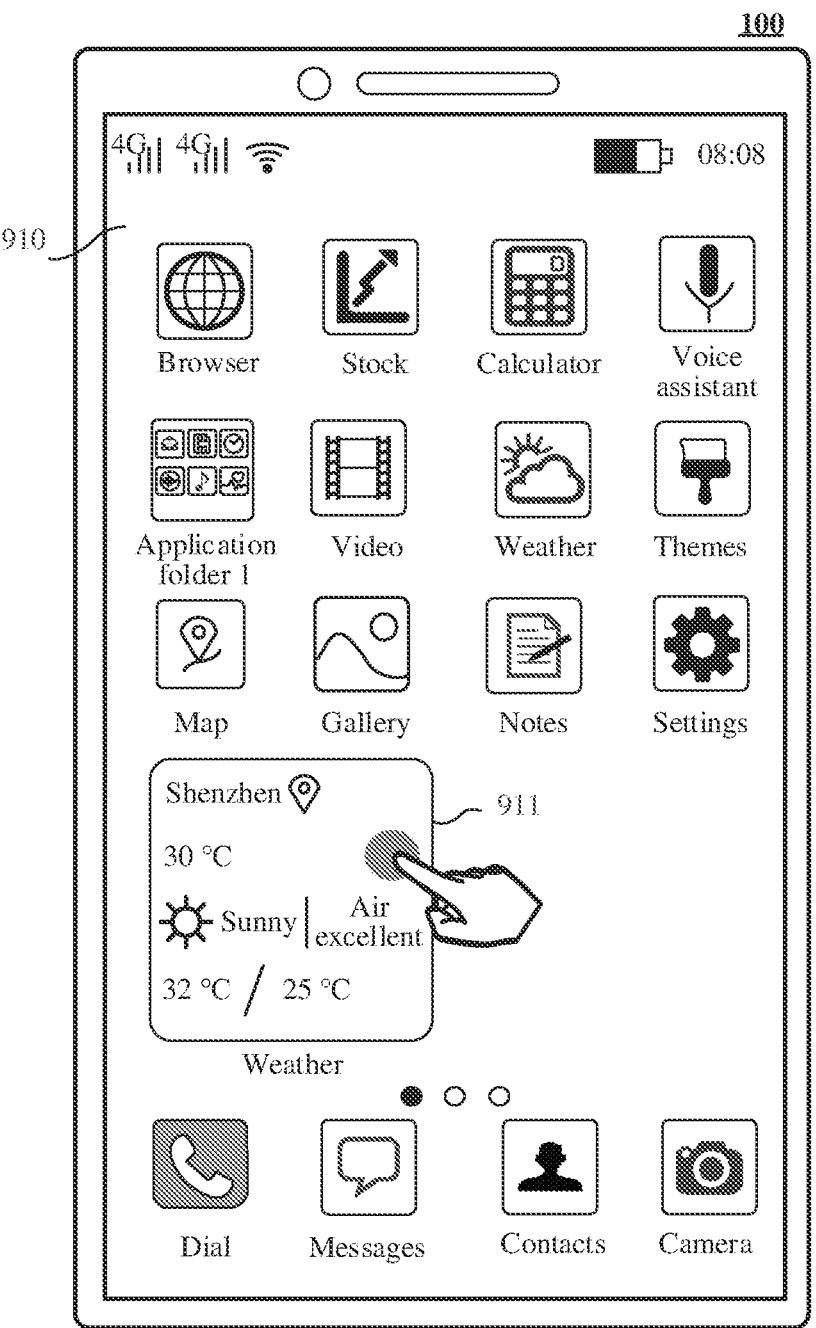
FIG. 9A to FIG. 9H are schematic diagrams of a group of interfaces of moving or deleting a card component added to a desktop according to an embodiment of this application.

For example, as shown in FIG. 9A, an electronic device 100 may add a weather component 911 to an interface 910 on a desktop. For a text description of the interface 910 on the desktop, refer to the text description of the interface 710 shown in FIG. 7C. Details are not described herein again.

Figure 9B:
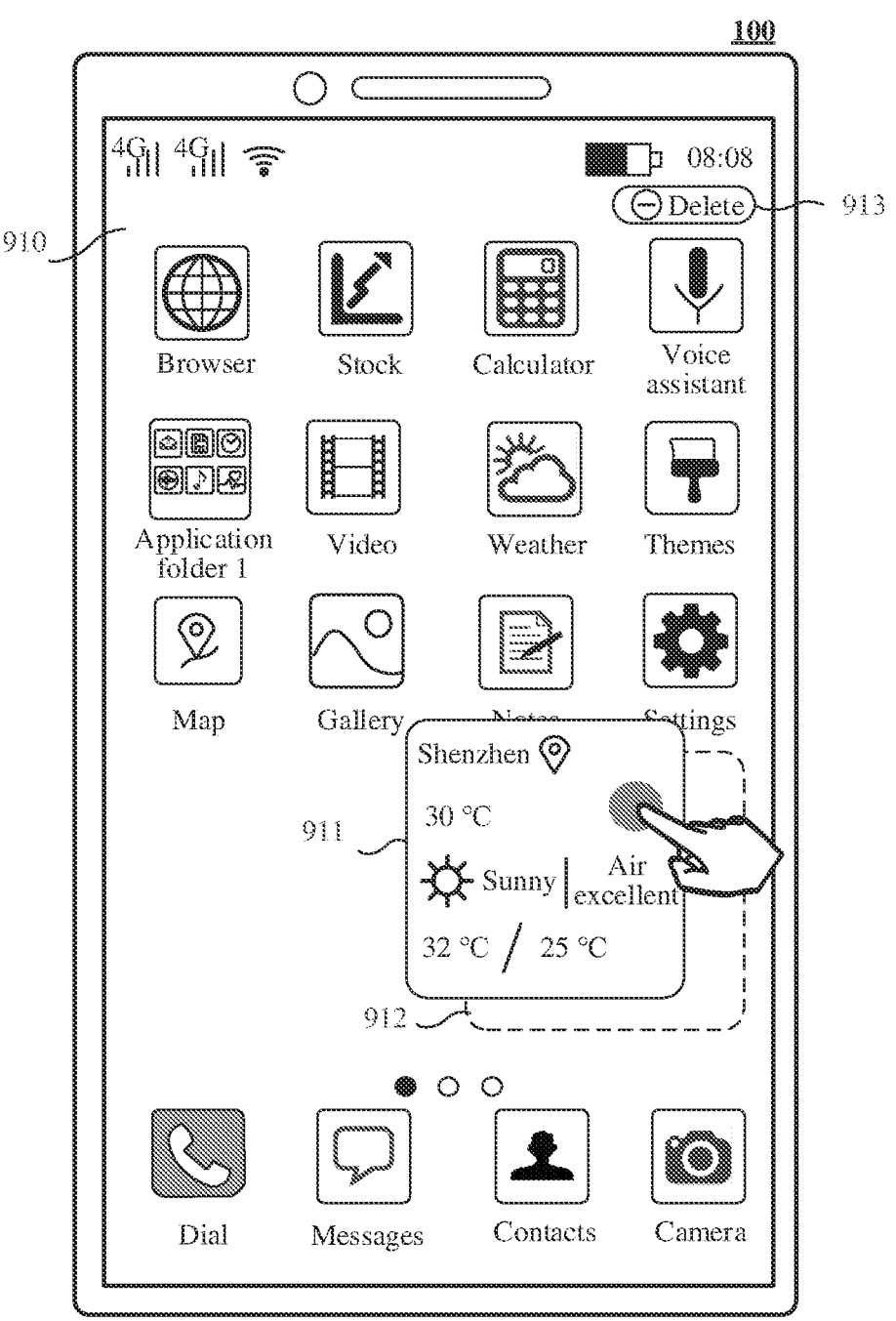

As shown in FIG. 9B, the electronic device 100 may receive a drag operation of the weather component 911. When the weather component 911 is dragged to an area 912, a placement mark may be displayed on the area 912. The placement mark may be used to prompt a user that the weather component 911 may be placed in the area 912. For example, the placement mark may be a dashed box displayed at a boundary of the area 912.

Figure 9C:
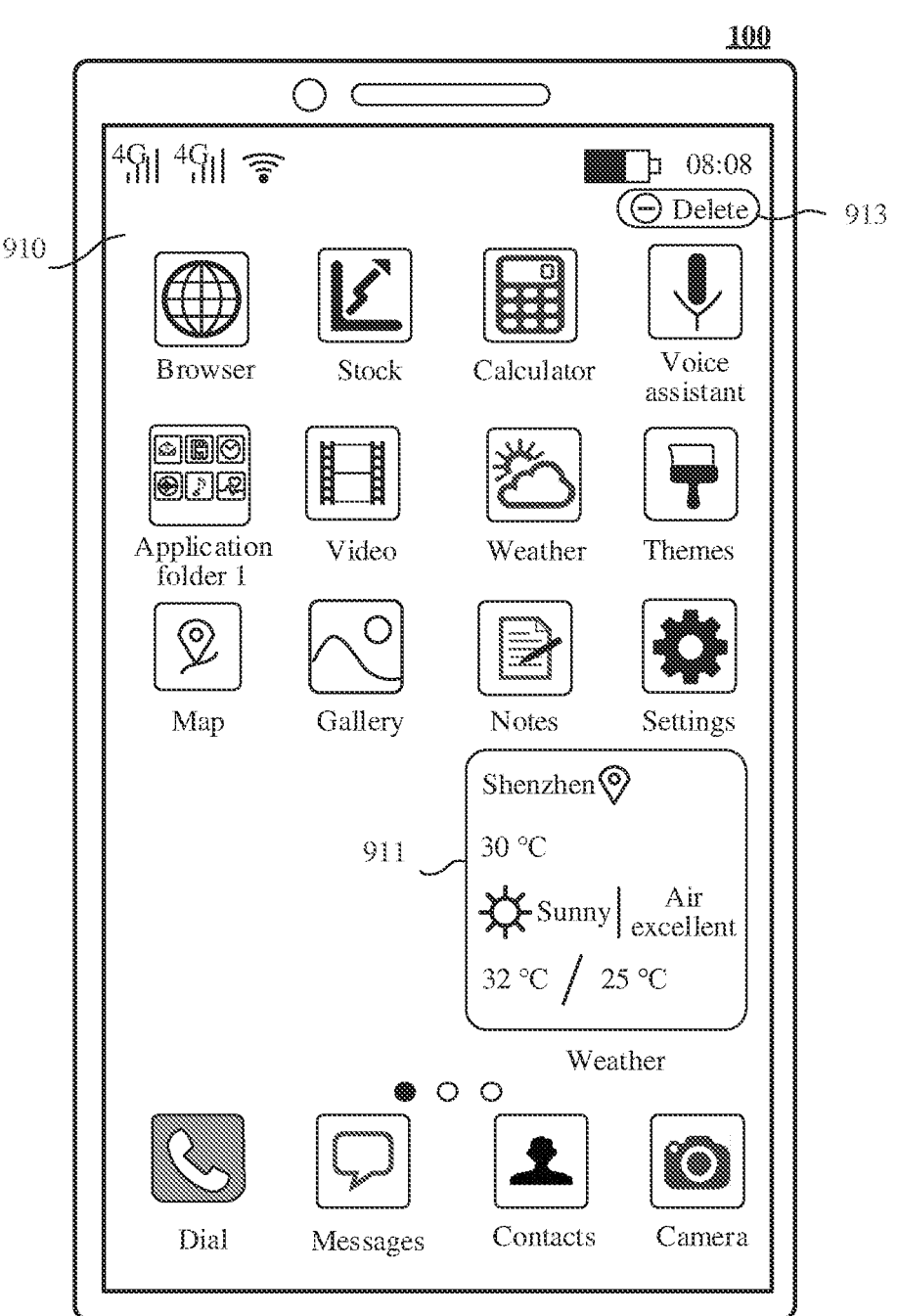

As shown in FIG. 9C, when an end location of the drag operation on the weather component 911 is close to the area 912, the electronic device 100 may place the weather component 911 in the area 912.

In some embodiments, after adding a card component to the desktop, the electronic device 100 may delete the card component through an input by the user. In this way, when the user does not want the card component that has been added on the desktop, the card component may be manually deleted.

Figure 9D:
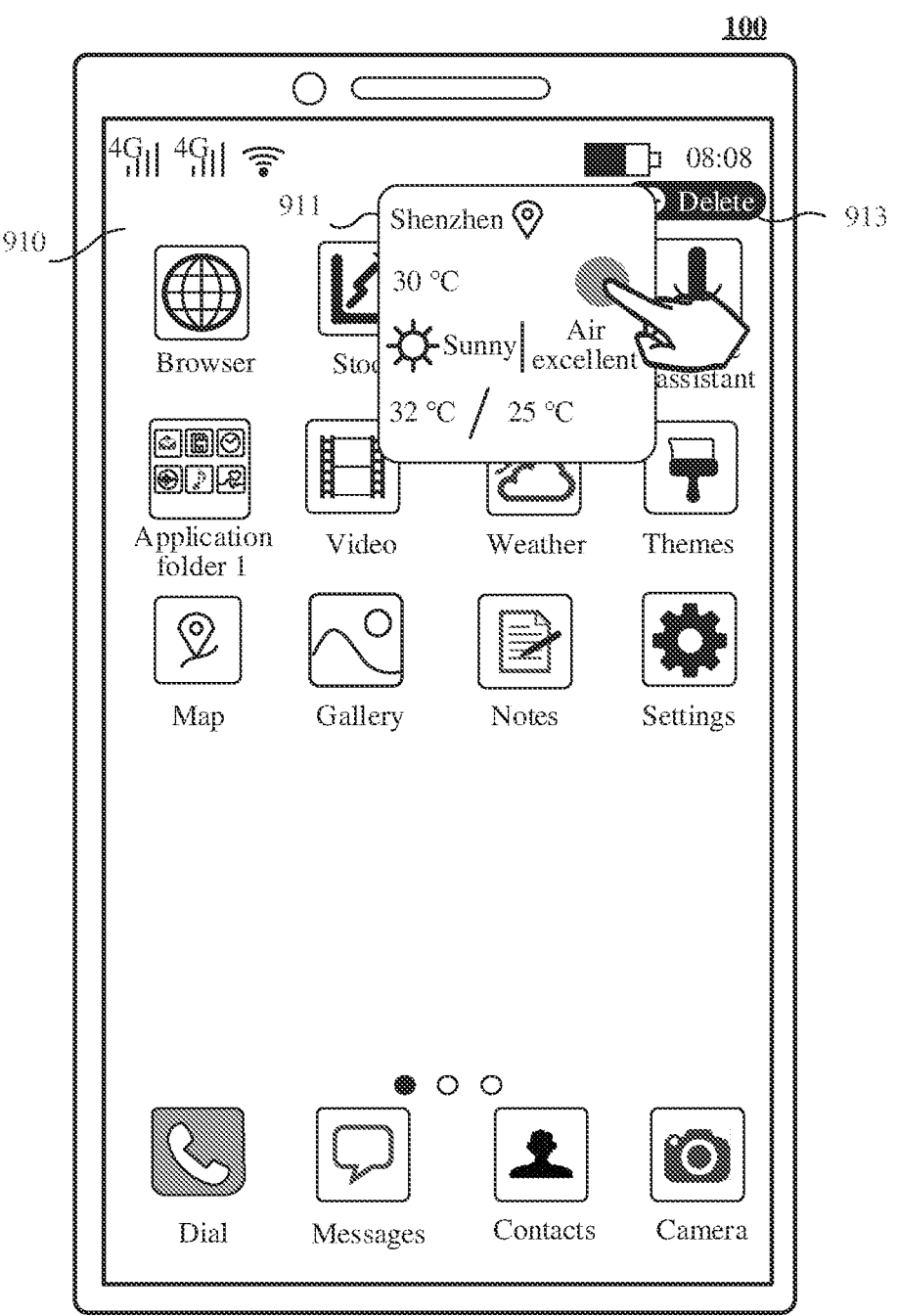
Figure 9E:

For example, as shown in FIG. 9D, the electronic device 100 may add the weather component 911 to the interface 910 on the desktop. For a text description of the interface 910 on the desktop, refer to the text description of the interface 710 shown in FIG. 7C. Details are not described herein again. The electronic device 100 may receive the drag operation of the weather component 911. In a process in which the weather component 911 is dragged, the electronic device 100 may display a deletion hot area 913 on the interface 910. When the weather component 911 is dragged close to the deletion hot area 913 and the dragging ends, as shown in FIG. 9E, the electronic device 100 may delete the weather component 911 from the desktop.

Figure 9F:
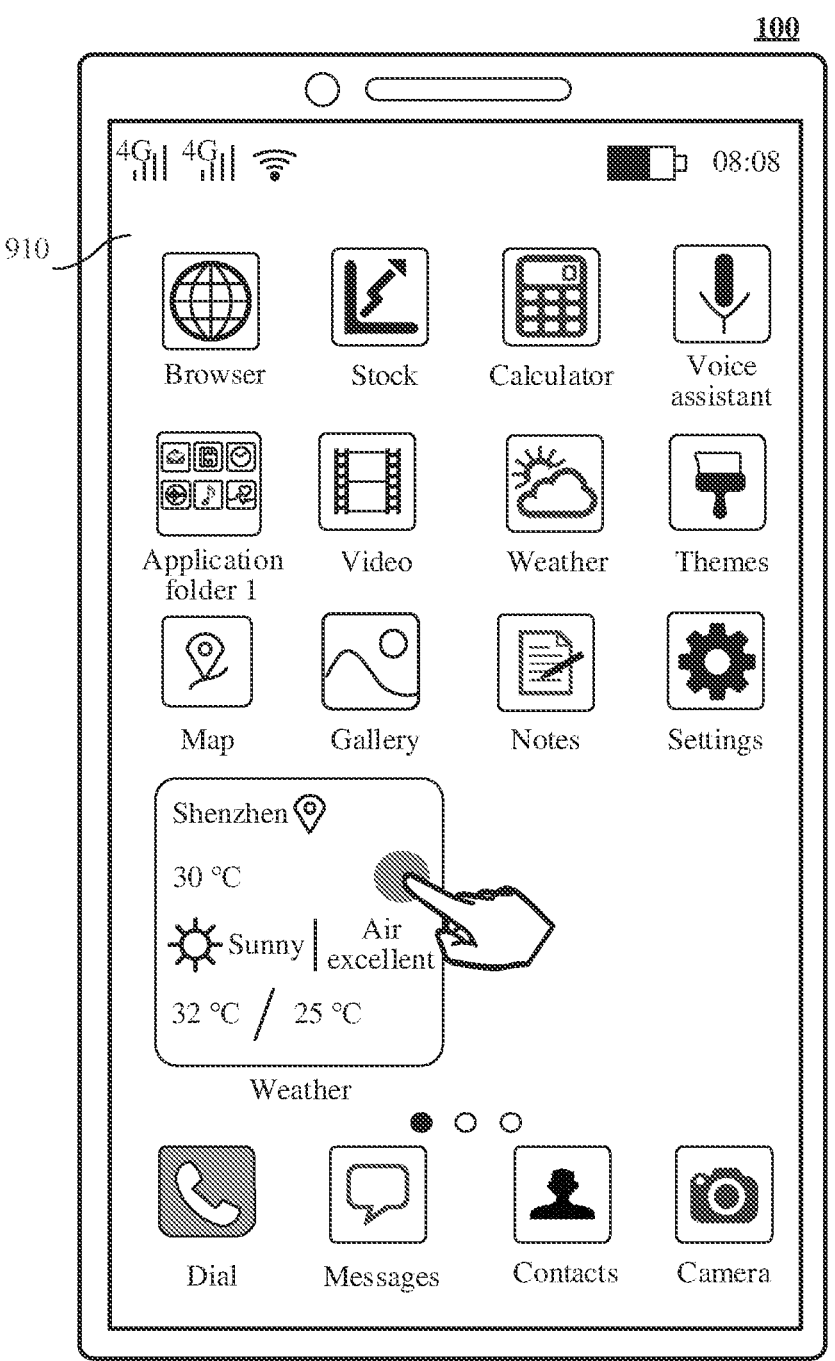
Figure 9G:
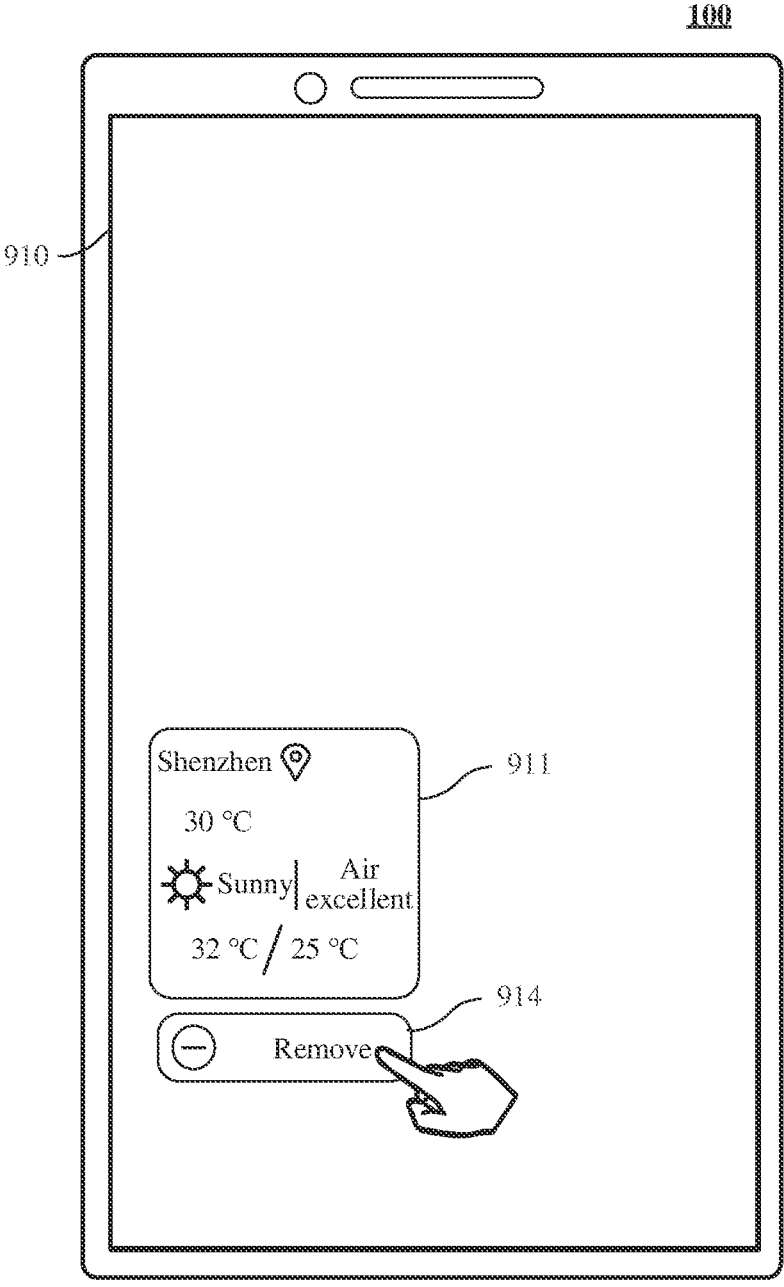
Figure 9H:
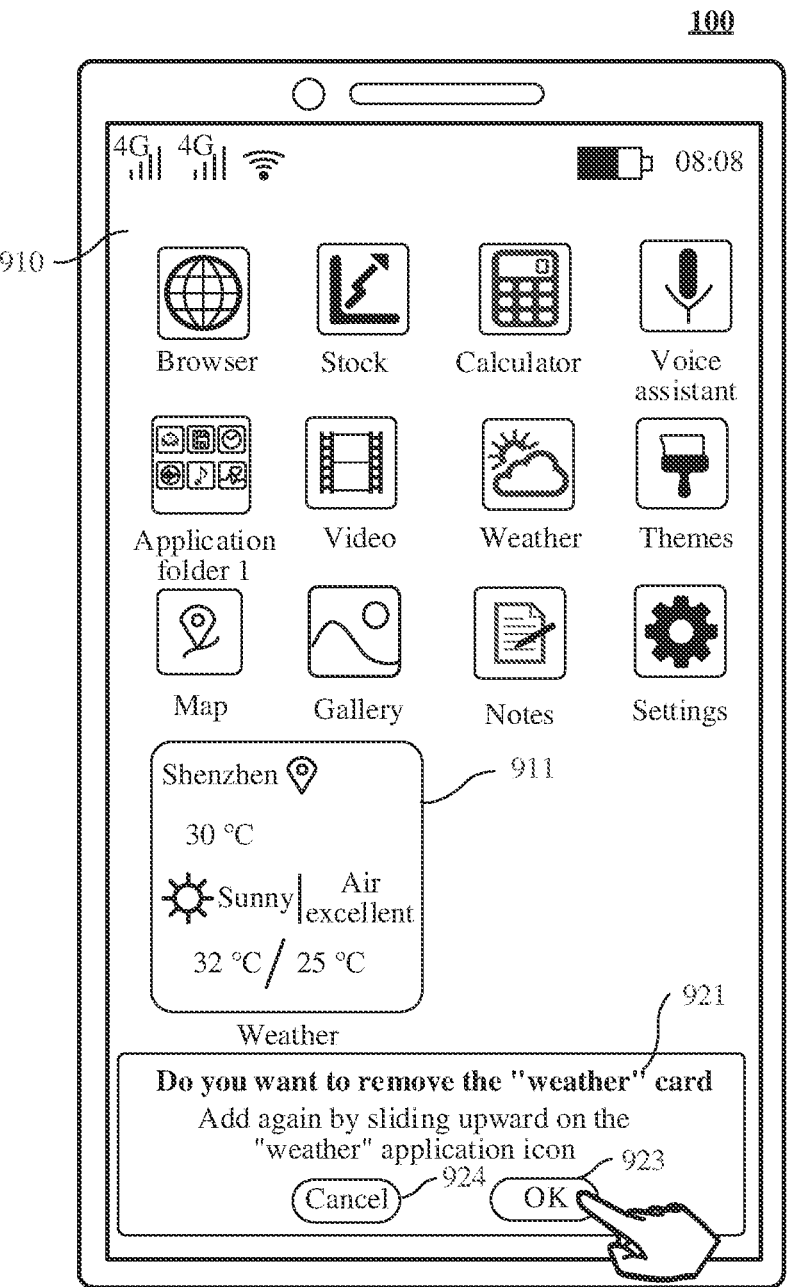

For another example, as shown in FIG. 9F, the electronic device 100 may add the weather component 911 to the interface 910 on the desktop. For a text description of the interface 910 on the desktop, refer to the text description of the interface 710 shown in FIG. 7C. Details are not described herein again. The electronic device 100 may receive a touch-and-hold operation on the weather component 911. In response to the touch-and-hold operation, as shown in FIG. 9G, the electronic device 100 may display a removal control 914. As shown in FIG. 9H, when the electronic device 100 may receive an input (for example, tapping) of the user for the removal control 914, the electronic device 100 may display a deletion prompt box 921.

The deletion prompt box 921 includes deletion prompt information, a deletion confirmation control 923, and a deletion cancellation control 924. The deletion prompt information may be used to prompt the user to delete the weather component 911 from the desktop. For example, the deletion prompt information may be a text prompt that "Add again by sliding upward on a 'weather' application icon". After the electronic device 100 receives the input (for example, tapping) for the deletion confirmation control 923, the electronic device 100 may delete the weather component 911 from the desktop. After the electronic device 100 receives the input (for example, tapping) for the deletion cancellation control 924, the electronic device 100 may keep displaying the weather component 911 on the desktop.

Optionally, the electronic device 100 may directly delete the weather component 911 from the desktop in response to an input for the removal control 914 shown in FIG. 9G.

In some application scenarios, the electronic device 100 may display a component management interface of the first application through the input by the user. Card components of different styles of the first application may be switched to be displayed in a management interface of the component. The electronic device 100 may change, through the input by the user on the component management interface, a default style of the card component corresponding to the first application. When the electronic device 100 receives the sliding operation (for example, upward sliding) of the user on the icon of the first application, the electronic device 100 may display a card component of a default style of the first application. In this way, the user may be allowed to select a favorite style of the card component.

Specifically, the electronic device 100 may display a shortcut menu of the first application after receiving a touch-and-hold operation on the icon of the first application. The shortcut menu may include a card management control. After the electronic device 100 receives a tapping operation on the card management control, the electronic device 100 may display the component management interface of the first application.

Figure 10A:
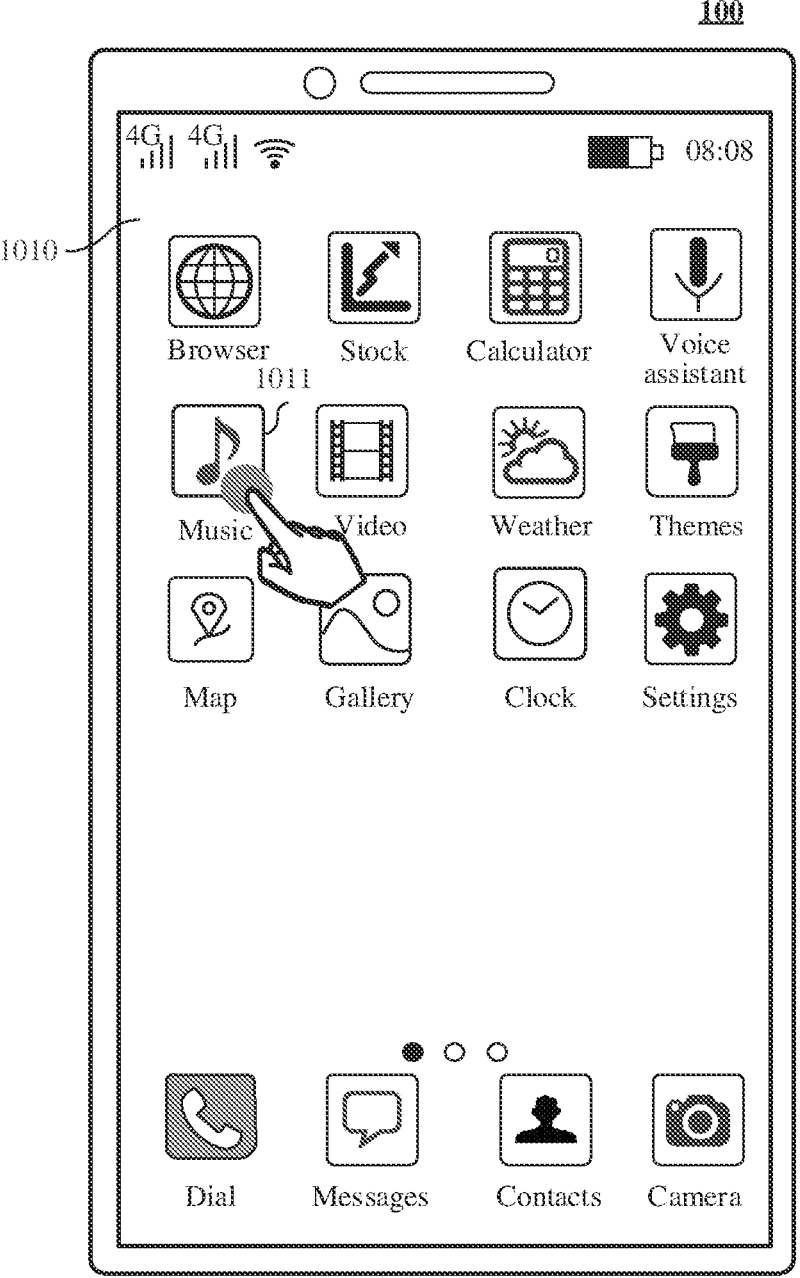
FIG. 10A to FIG. 10H are schematic diagrams of a group of interfaces of changing a style of a card component according to an embodiment of this application.

For example, as shown in FIG. 10A, an electronic device 100 may display an interface 1010 on a desktop. The interface 1010 displays a page on which an application icon is placed, and the page includes a plurality of application icons (for example, a browser application icon, a stock application icon, a calculator application icon, a voice assistant application icon, a music application icon 1011, a video application icon, a weather application icon, a theme application icon, a map application icon, a gallery application icon, a clock application icon, a setting application icon, and the like). For a text part that is not described in detail on the interface 1010, refer to the text description of the interface 310 shown in FIG. 3A. Details are not described herein again.

The electronic device 100 may receive an input (for example, touch-and-hold) of the user for the music application icon 1011. In response to the input, the electronic device 100 may display a shortcut (shortcut) menu 1012 shown in FIG. 10B.

Figure 10B:
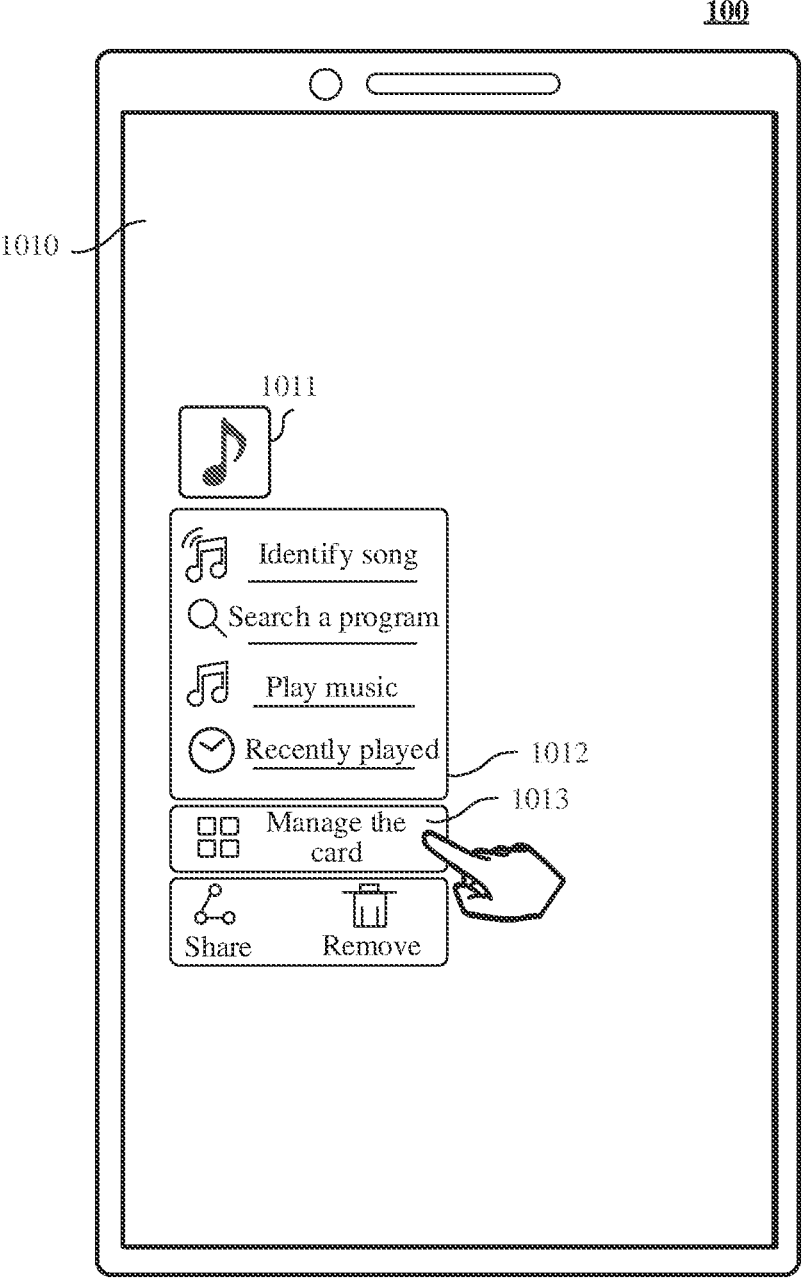

As shown in FIG. 10B, the shortcut menu 1012 may include a card management control 1013 and another functional control (for example, a song identification control, a program searching control, a music playing control, a "recently played" control, a sharing control, a removal control, and the like).

The electronic device 100 receives an input (for example, tapping) of the user for the card management control 1013.

Figure 10C:
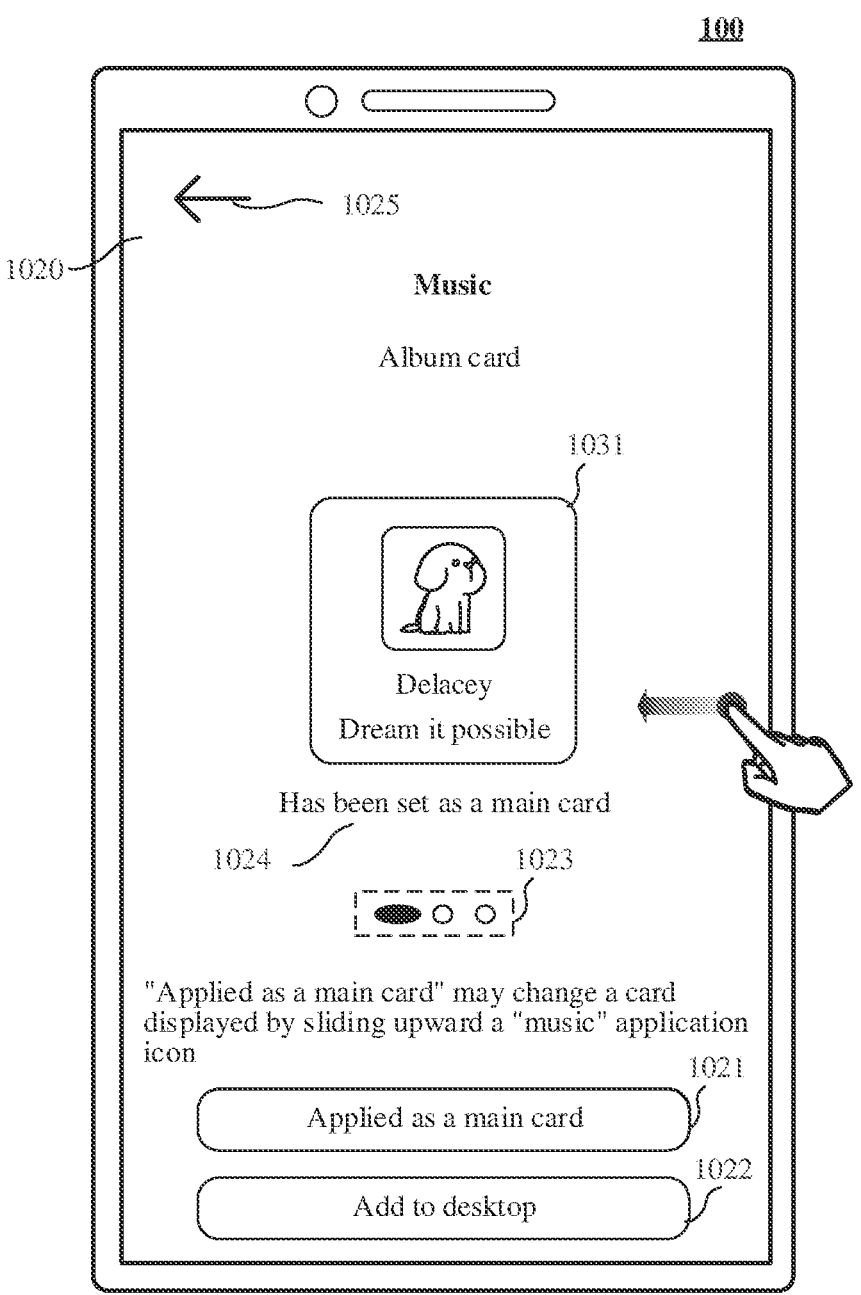

In response to the input, the electronic device 100 may display a component management interface 1020 shown in FIG. 10C.

As shown in FIG. 10C, the component management interface 1020 may display one or more pages of the card component on which a music application is placed (for example, a music component 1031 is placed on a currently displayed page.) The card component has different styles (including a size and/or a functional control) on different pages. A page indicator 1023 is displayed below a page on which the card component is placed. The indicator 1023 may represent a quantity of styles of card components corresponding to a music application, and a location relationship between a page currently displayed on the component management interface 1020 and another page. For example, the component management interface 1020 may include three pages on which the card component is placed, and a black dot in the page indicator 1023 is on the leftmost, which may represent that the currently displayed page is a leftmost page of the three pages. The component management interface 1020 further displays and includes a main card setting control 1021, an add-to-desktop control 1022, a main card setting prompt 1024, a return control 1025, and the like. The main card setting control 1021 may be used to trigger the electronic device 100 to set a card component currently displayed on the component management interface 1020 as a default card component of the music application. When the electronic device 100 receives a sliding operation (for example, upward sliding) on a music application icon, the electronic device 100 may display the default card component. The add-to-desktop control 1022 may be used to trigger the electronic device 100 to add, to a blank area on the desktop, the card component currently displayed on the component management interface 1020. The main card setting prompt 1024 may represent that the default card component of the music application is the card component currently displayed on the component management interface 1020. For example, the default card component of the current music application is the music component 1031. The return control 1025 may be used to trigger the electronic device 100 to return to display a previous-level interface (for example, the interface 1010 on the desktop shown in FIG. 10B).

Figure 10D:
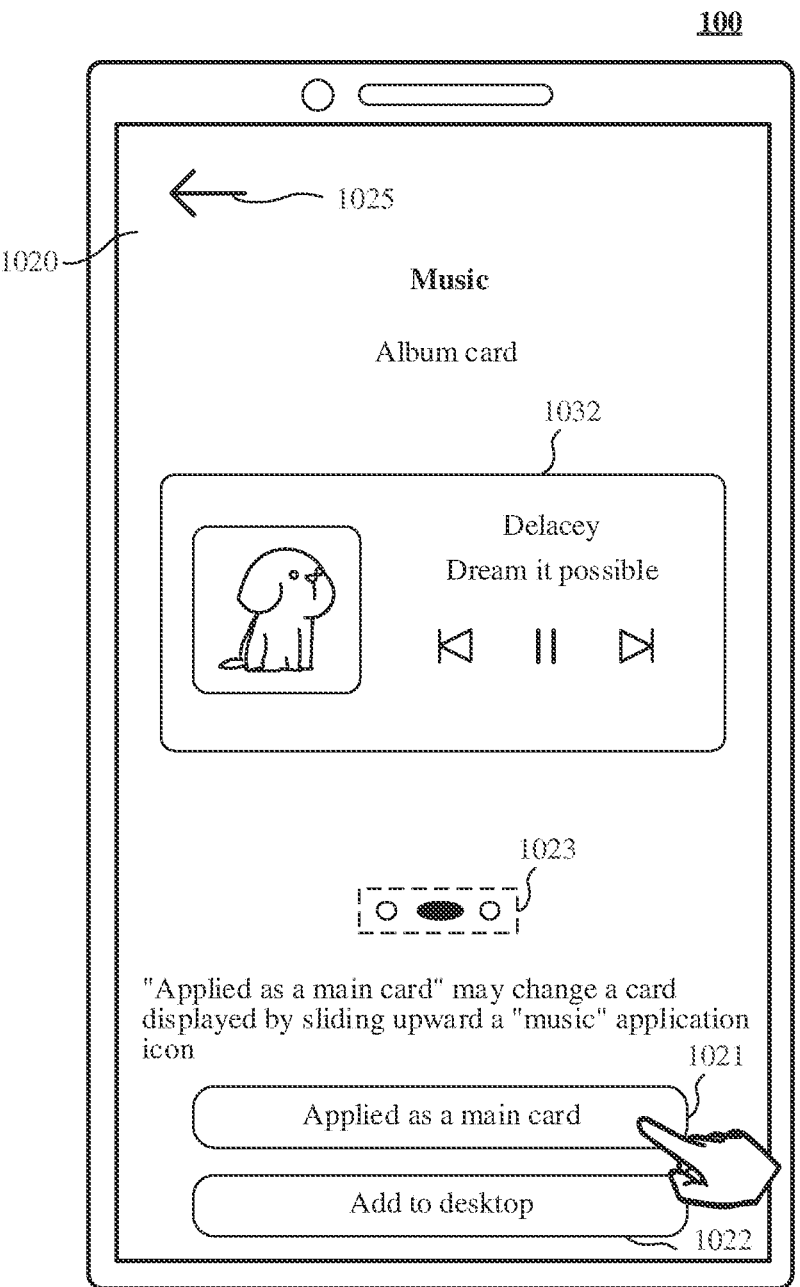

The electronic device 100 may receive a sliding operation (for example, sliding leftward) of the user on a page on which the music component 1031 is placed. In response to the sliding operation, as shown in FIG. 10D, the electronic device 100 may switch to display, on the component management interface 1020, the page on which the music component 1032 is placed. A size of the music component 1032 is different from a size of the music component 1031, and a functional control displayed in the music component 1032 is different from a functional control displayed in the cloud music component 1031.

For example, the size of the music component 1031 may be a size horizontally covering two application icons and vertically covering two application icons. The music component 1031 may display and include an album image, a name of the music, and a name of a singer that include specified music in the music application. The size of the music component 1032 may be a size horizontally covering four application icons and vertically covering two application icons. The music component 1032 may display and include an album image, a name of the music, a name of a singer, a play/pause control, a previous song control, and a next song control that include the specified music in the music application.

When the electronic device 100 switches to display a page on which the music component 1032 is placed on the component management interface 1020, the electronic device 100 may receive an input (for example, tapping) of the user for the main card setting control 1021. In response to the input, the electronic device 100 may set the music component 1032 as the default card component of the music application.

Figure 10E:
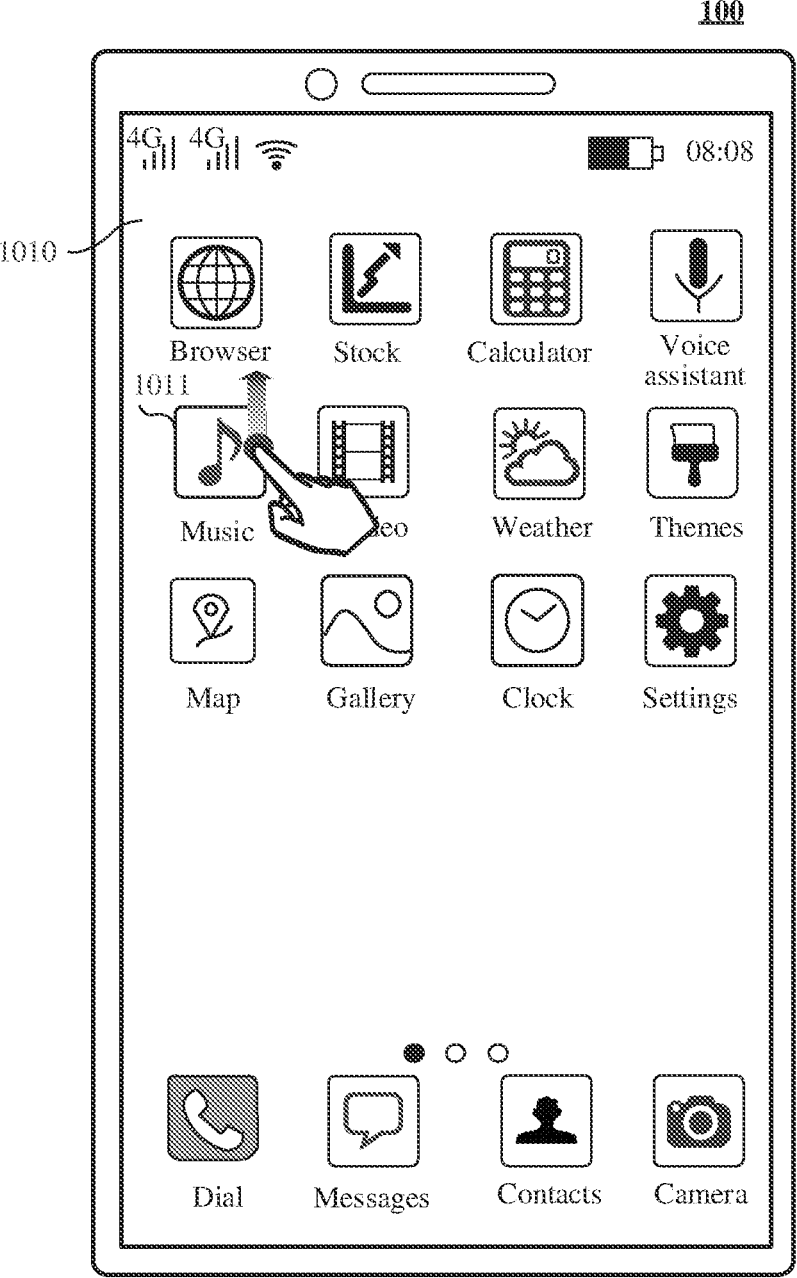
Figure 10F:
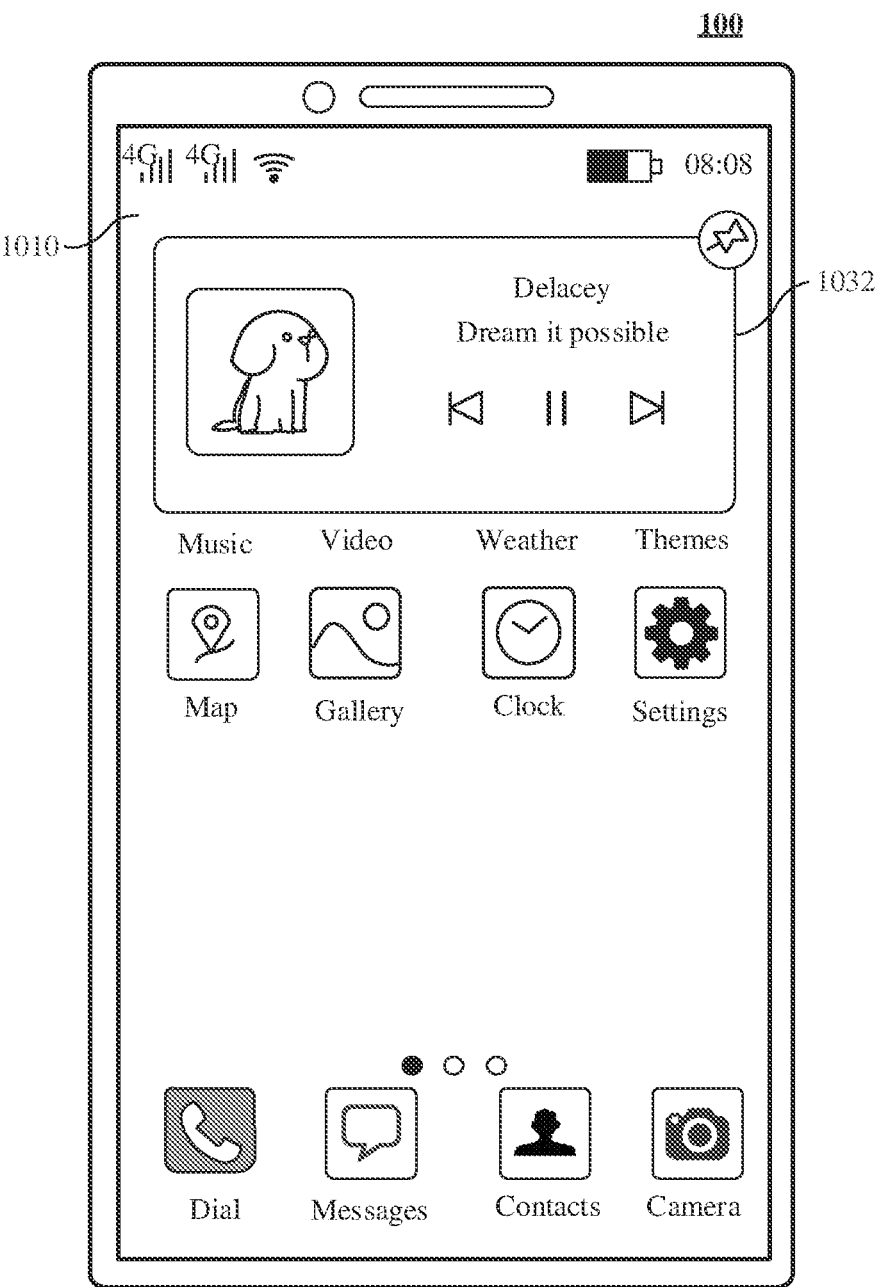

As shown in FIG. 10E, after the electronic device 100 sets the music component 1032 as a default card component of the music application, the electronic device 100 may display the interface 1010 on the desktop shown in FIG. 10A. The electronic device 100 may receive a sliding operation (for example, upward sliding) for the music application 1011. In response to the sliding operation, as shown in FIG. 10F, the electronic device 100 may temporarily display the music component 1032.

After temporarily displaying the music component 1032, the electronic device 100 may receive an input (for example, tapping) of the user for another area on the interface 1010 other than the area in which the music component 1032 is located. In response to the input, the electronic device 100 may disable the temporarily displayed music component 1032.

In a possible implementation, when the electronic device 100 displays the component management interface of the first application, the electronic device 100 may add, to a blank area on the desktop through the input by the user on the component management interface of the first application, the card component displayed on the component management interface.

Figure 10G:
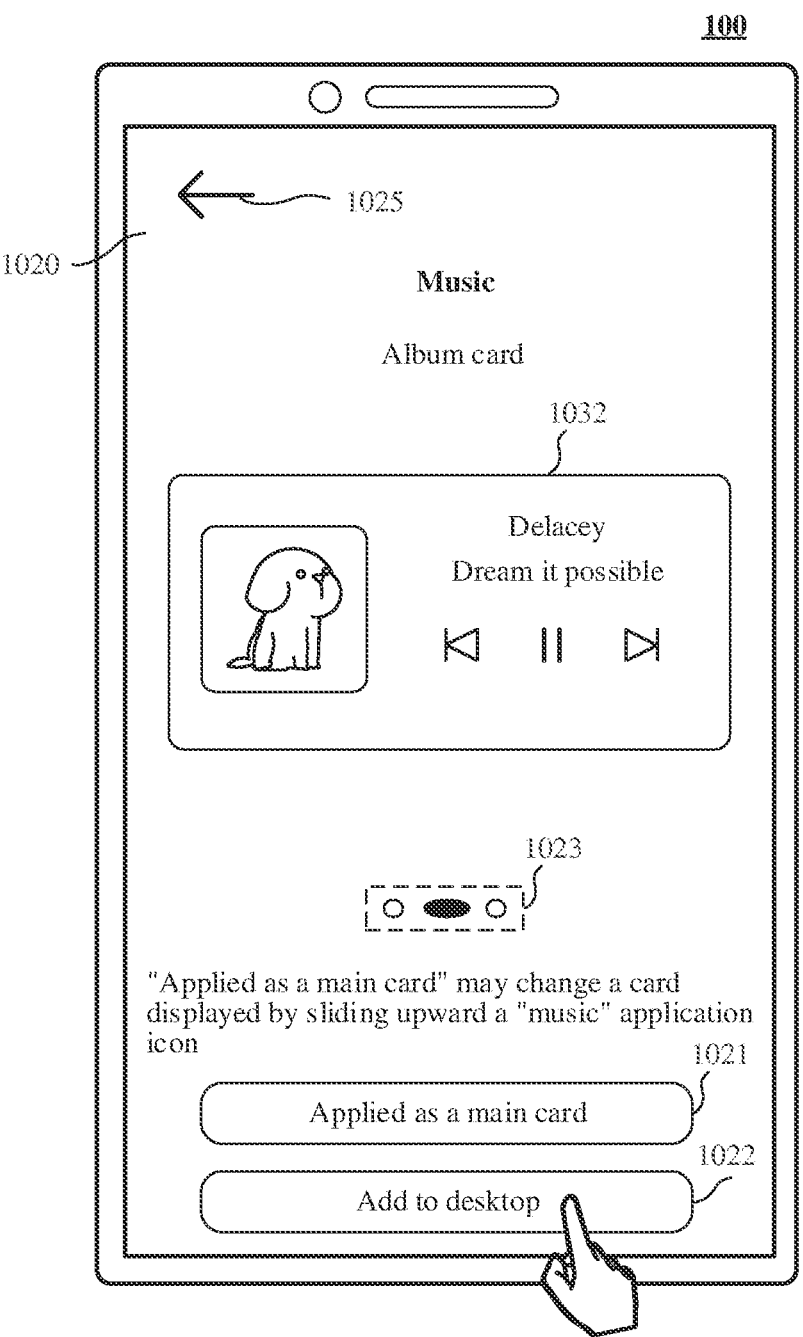

For example, as shown in FIG. 10G, the electronic device 100 may display, on the component management interface 1020, the page on which the music component 1032 is placed, a main card setting control 1021, an add-to-desktop control 1022, and the like. For a text description of the component management interface 1020, refer to the embodiment shown in FIG. 10D. Details are not described herein again.

The electronic device 100 may receive an input (for example, tapping) of the user for the add-to-desktop control 1022. In response to the input, the electronic device 100 may add the music component 1032 to the blank area on the desktop.

Figure 10H:
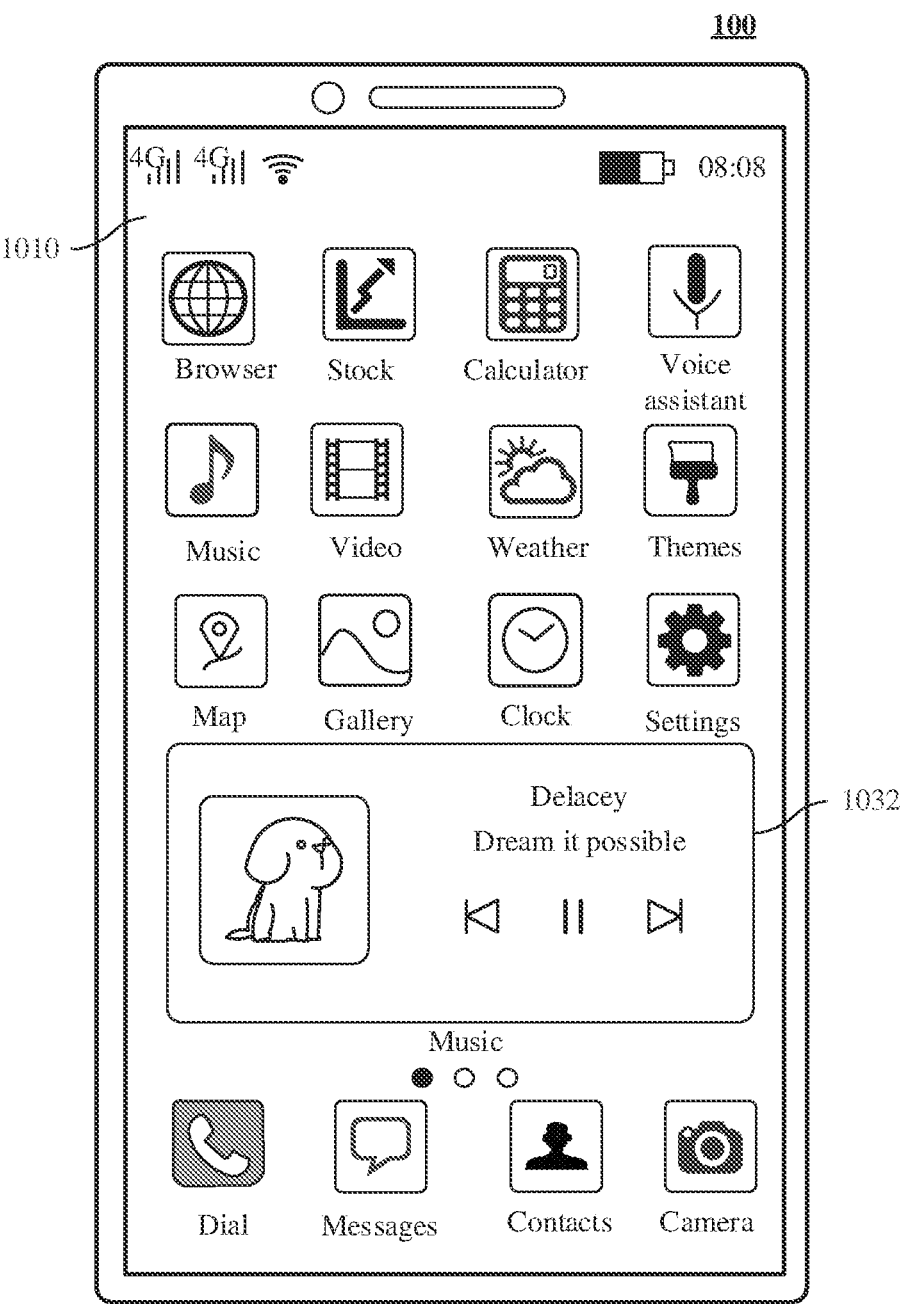

As shown in FIG. 10H, when the electronic device 100 returns to and displays the interface 1010 on the desktop, the music component 1032 may be displayed on the interface 1010.

Optionally, after the electronic device 100 adds the music component 1032 to the blank area on the desktop, when the electronic device 100 continues to receive the input by the user for the add-to-desktop control 1022, the electronic device 100 may further add the music component 1032 to another blank area on the desktop. In other words, card components of the same style may be added to the desktop for a plurality of times, and a plurality of card components of the same style may be displayed in different areas on the desktop.

In embodiments of this application, after the card component of the first application is added to the desktop for fixing, the electronic device 100 may further receive a sliding operation (for example, upward sliding) of the user on the icon of the first application. In response to the sliding operation, the electronic device 100 may further continue to temporarily display the card component of the first application close to the icon of the first application.

Optionally, after the card component of the first application is added to the desktop for fixing, when the electronic device 100 may further receive the sliding operation (for example, upward sliding) of the user on the icon of the first application, the electronic device 100 may no longer continue to display the card component of the first application.

In a possible implementation, the electronic device 100 may temporarily display the card component of the first application after receiving the sliding operation (for example, upward sliding) on the icon of the first application. The electronic device 100 may display a shortcut menu after receiving a touch-and-hold operation on the card component of the first application. The shortcut menu may include a card management control. After the electronic device 100 receives a tapping operation on the card management control, the electronic device 100 may display the component management interface of the first application.

Figure 11A:
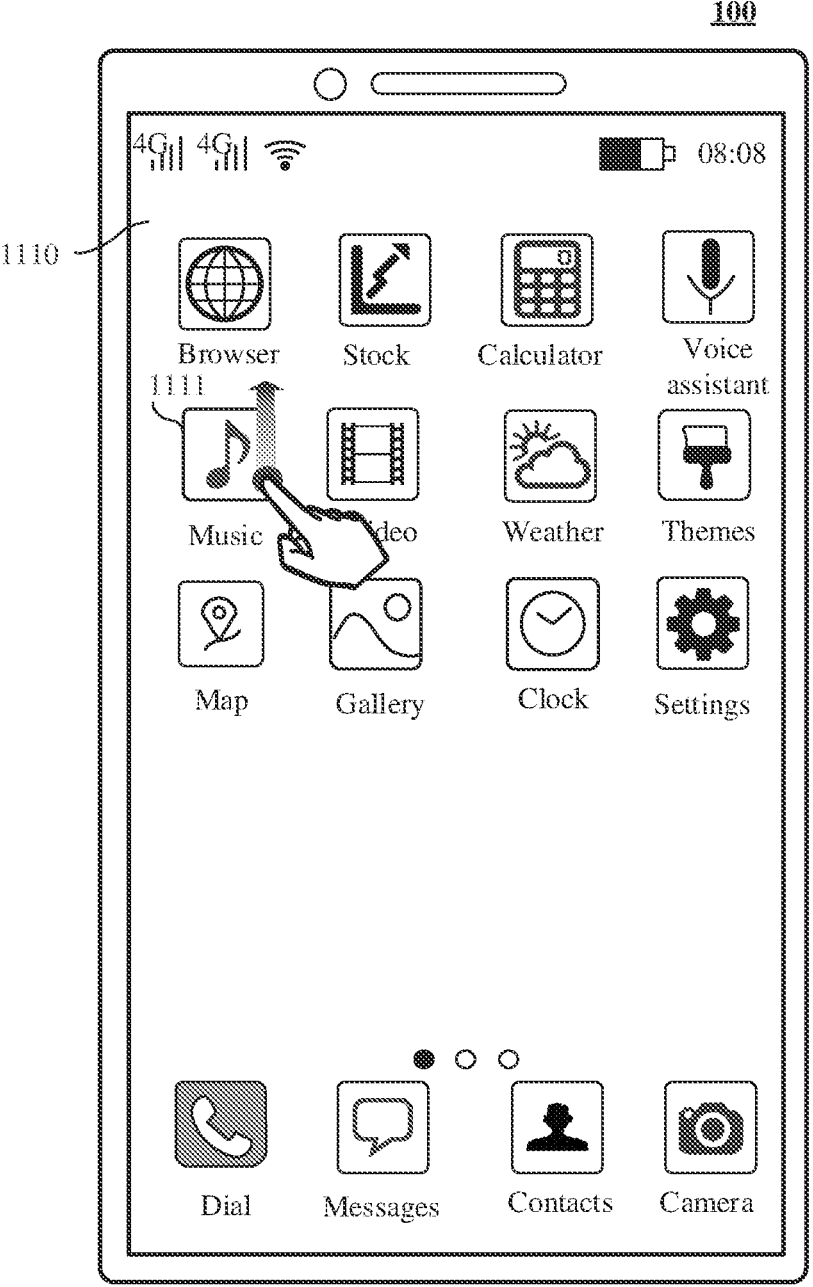
FIG. 11A to FIG. 11F are schematic diagrams of a group of interfaces of entering a card management interface according to an embodiment of this application.

For example, as shown in FIG. 11A, an electronic device 100 may display an interface 1110 on a desktop. For a text description of the interface 1110, refer to the text description of the interface 1010 on the desktop in the embodiment shown in FIG. 10A. Details are not described herein again.

Figure 11B:
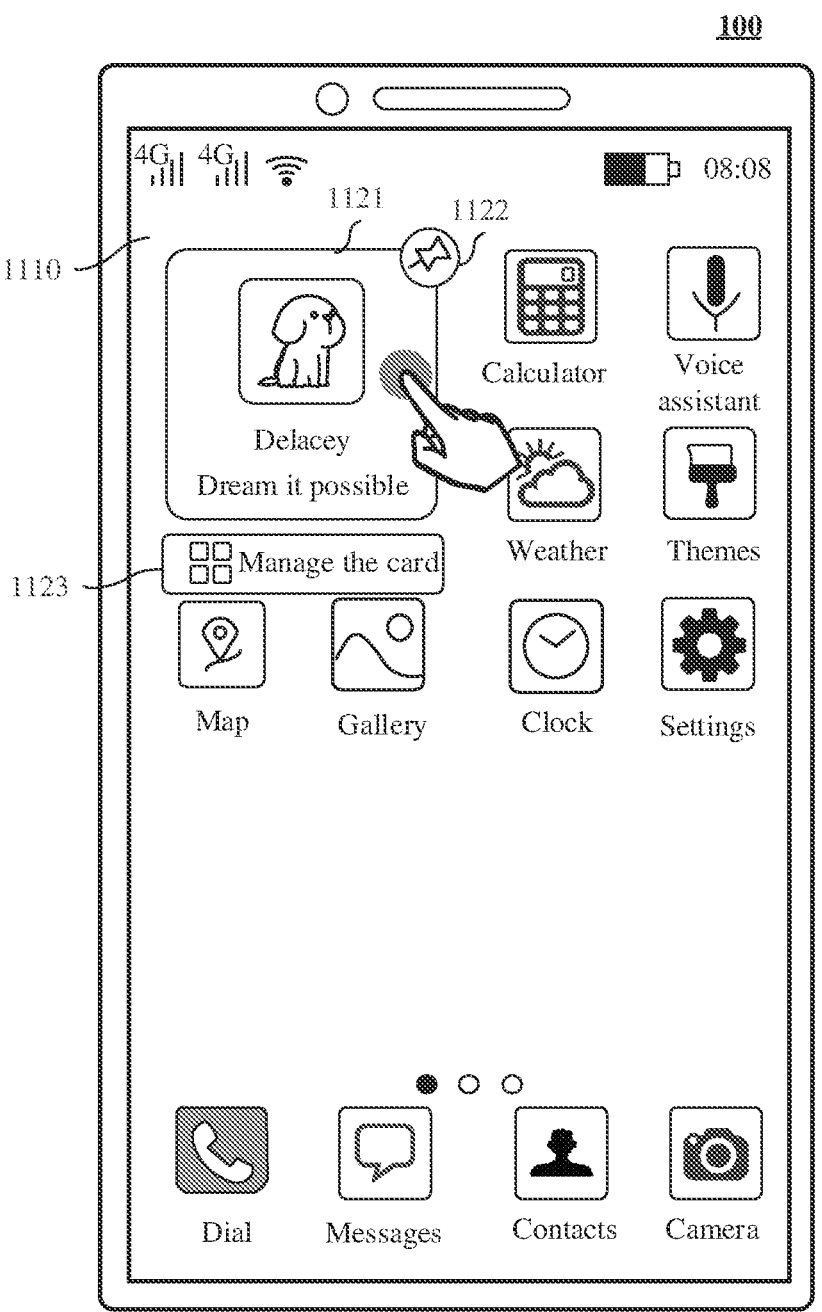

The electronic device 100 may receive a sliding operation (for example, upward sliding) performed by a user on a music application icon 1111. In response to the sliding operation, as shown in FIG. 11B, the electronic device 100 may display a music component 1121. Optionally, the electronic device 100 may further display a fixed control 1122. The fixed control 1122 may be used to trigger the electronic device 100 to add the music component 1121 to a blank area on a desktop.

As shown in FIG. 11B, when the electronic device 100 receives a touch-and-hold operation performed by a user on the music component 1121, the electronic device 100 may display a card management control 1123.

Figure 11C:
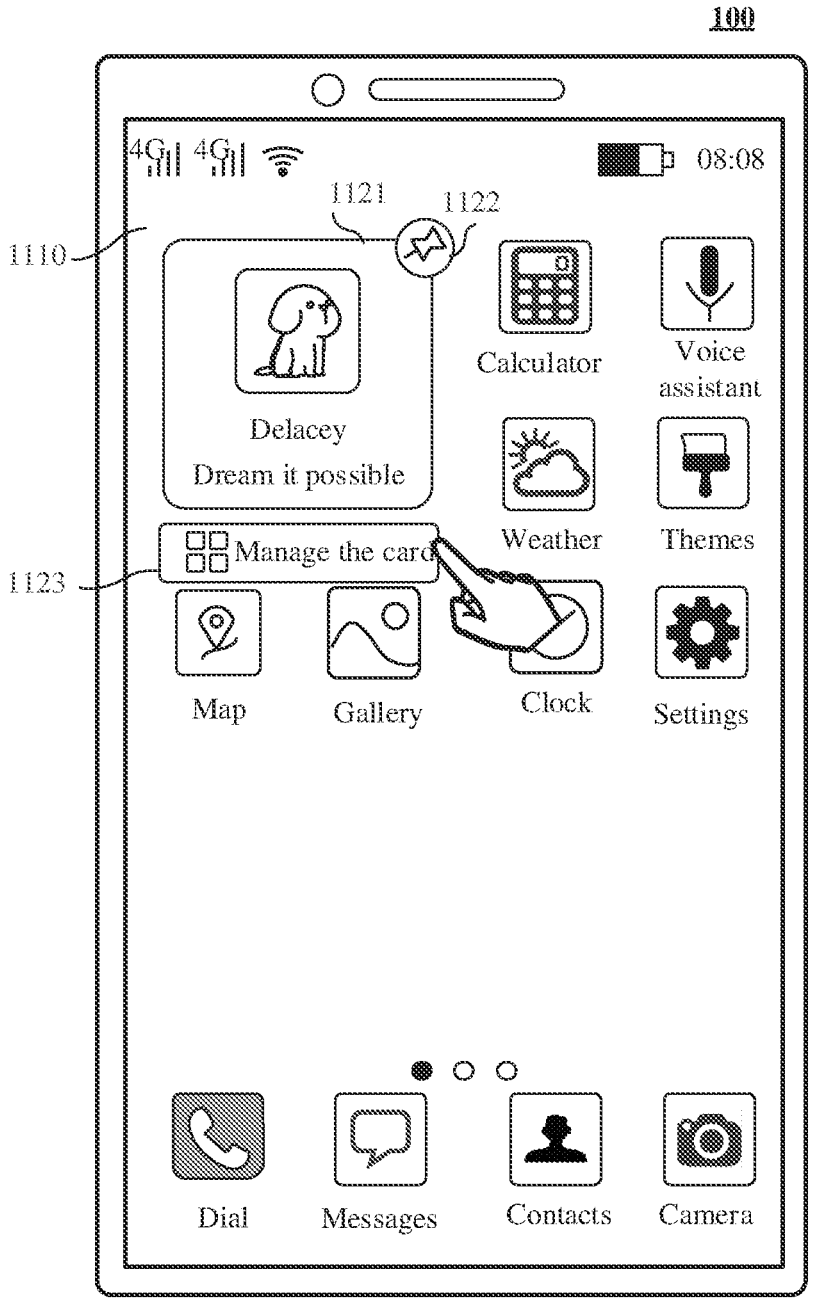
Figure 11D:
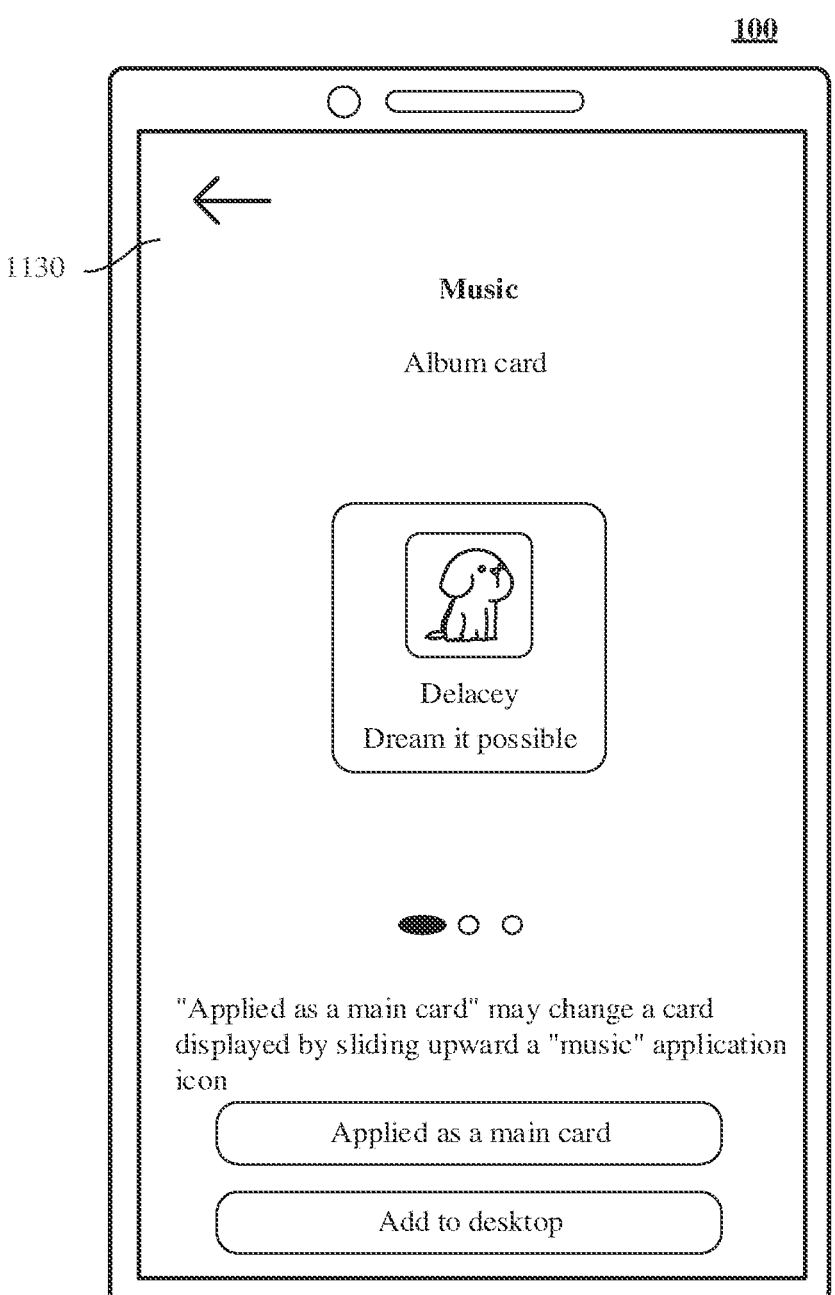

As shown in FIG. 11C and FIG. 11D, when the electronic device 100 receives a tapping operation on the card management control 1123, the electronic device 100 may display a component management interface 1130. For a text description of the component management interface 1130, refer to the text description of the component management interface 1130 in the embodiment shown in FIG. 10C. Details are not described herein again.

In embodiments of this application, card components of different styles in the foregoing component management interface are not limited to being displayed by switching left or right, and may further be displayed by scrolling up or down.

Figure 11E:
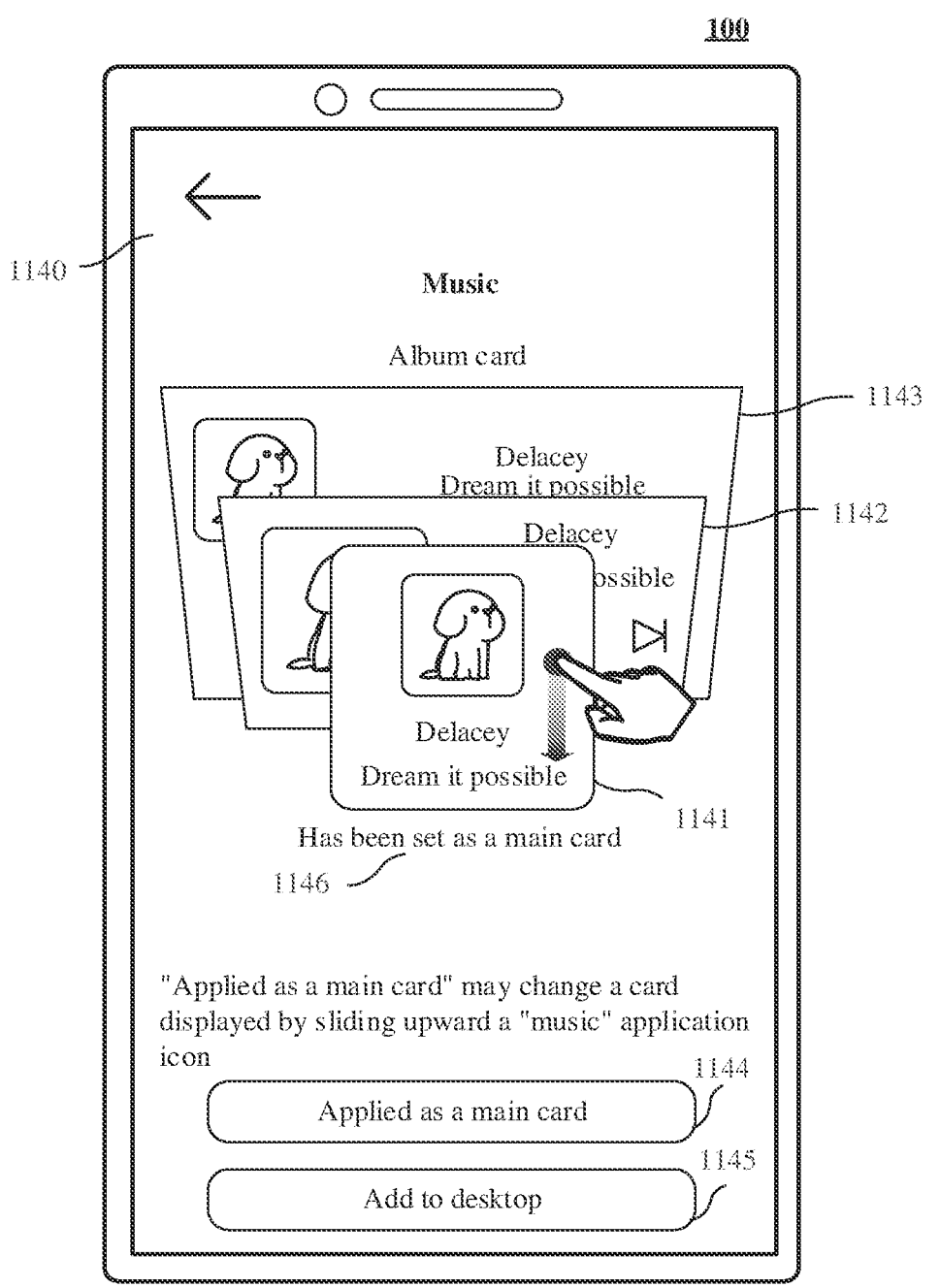

For example, as shown in FIG. 11E, the electronic device 100 may display a component management interface 1140 of a music application. The component management interface 1140 may display and include a music component 1141, a music component 1142, and a music component 1143. The music component 1141 is stacked on an upper layer of the music component 1142, and the music component 1142 is stacked on an upper layer of the music component 1143. Styles (including a size and/or a displayed functional control) of the three card components: the music component 1141, the music component 1142, and the music component 1143 are different. The component management interface 1140 further displays and includes a main card setting control 1144, an add-to-desktop control 1145, and a main card setting prompt 1146. The main card setting control 1144 may be used to trigger the electronic device 100 to set a card component currently stacked and displayed at a top layer of the component management interface 1140 as a default card component of a music application. When the electronic device 100 receives a sliding operation (for example, upward sliding) on a music application icon, the electronic device 100 may display the default card component. The add-to-desktop control 1145 may be used to trigger the electronic device 100 to add, to a blank area on the desktop, the card component currently stacked and displayed at the top layer of the component management interface 1140. The main card setting prompt 1146 may represent that the default card component of the music application is the card component displayed at the top layer on the component management interface 1140. For example, when the music component 1141 is currently stacked and displayed at the top layer of three card components, a main card setting prompt 1146 is displayed on the component management interface 1140, indicating that the electronic device 100 has set the music component 1141 as the default card component of the music application.

Figure 11F:
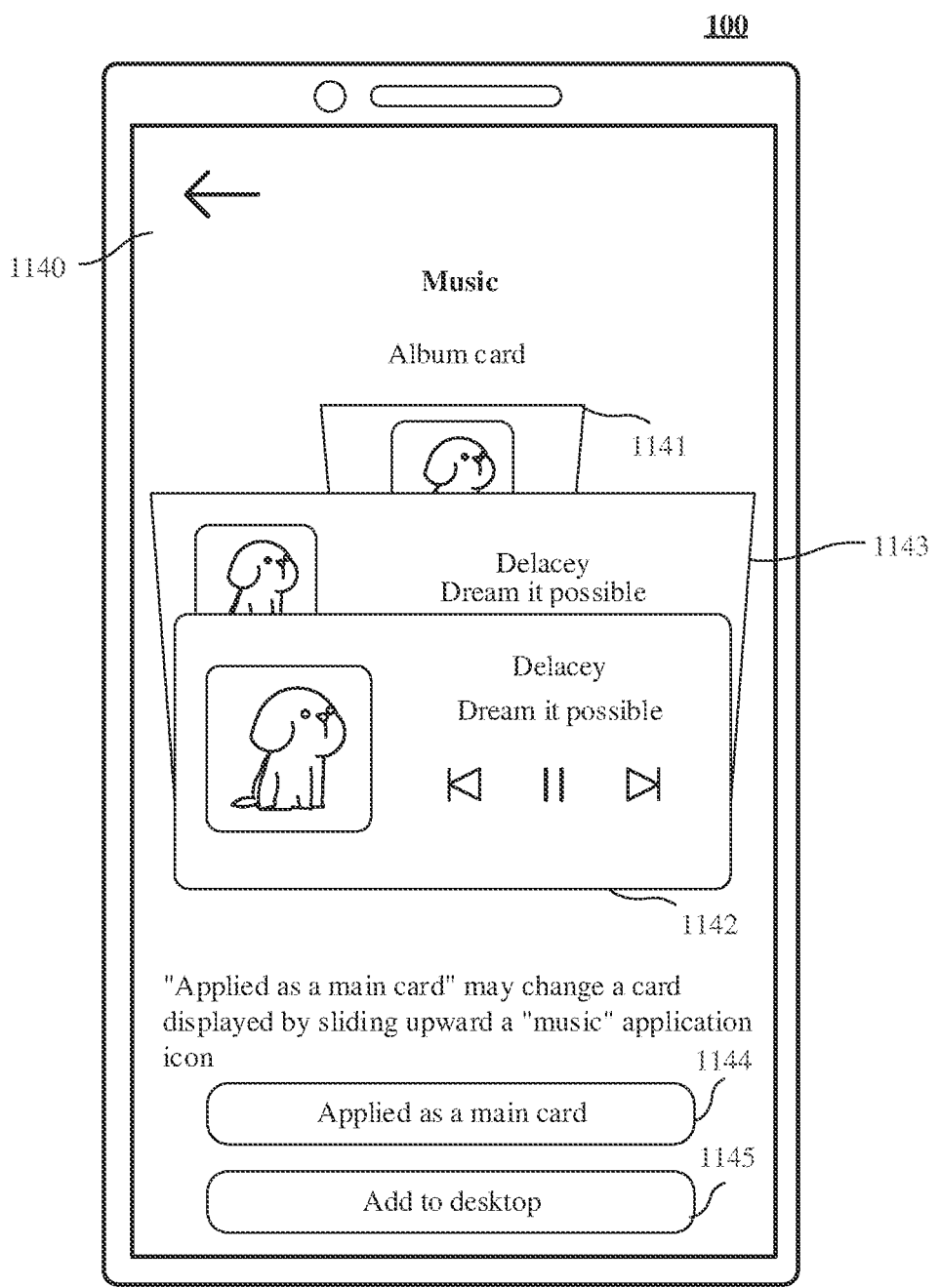

The electronic device 100 may receive a sliding operation (for example, sliding downward) of the user on the music component 1141 on the component management interface 1140. As shown in FIG. 11F, the electronic device 100 may stack and display the music component 1142 at an upper layer of the music component 1143, and stack and display the music component 1143 at an upper layer of the music component 1141.

In some application scenarios, after displaying the card component of the first application, the electronic device 100 may edit displayed content in the card component through the input by the user. In this way, it is convenient for the user to switch display content in the card component.

Figure 12A:
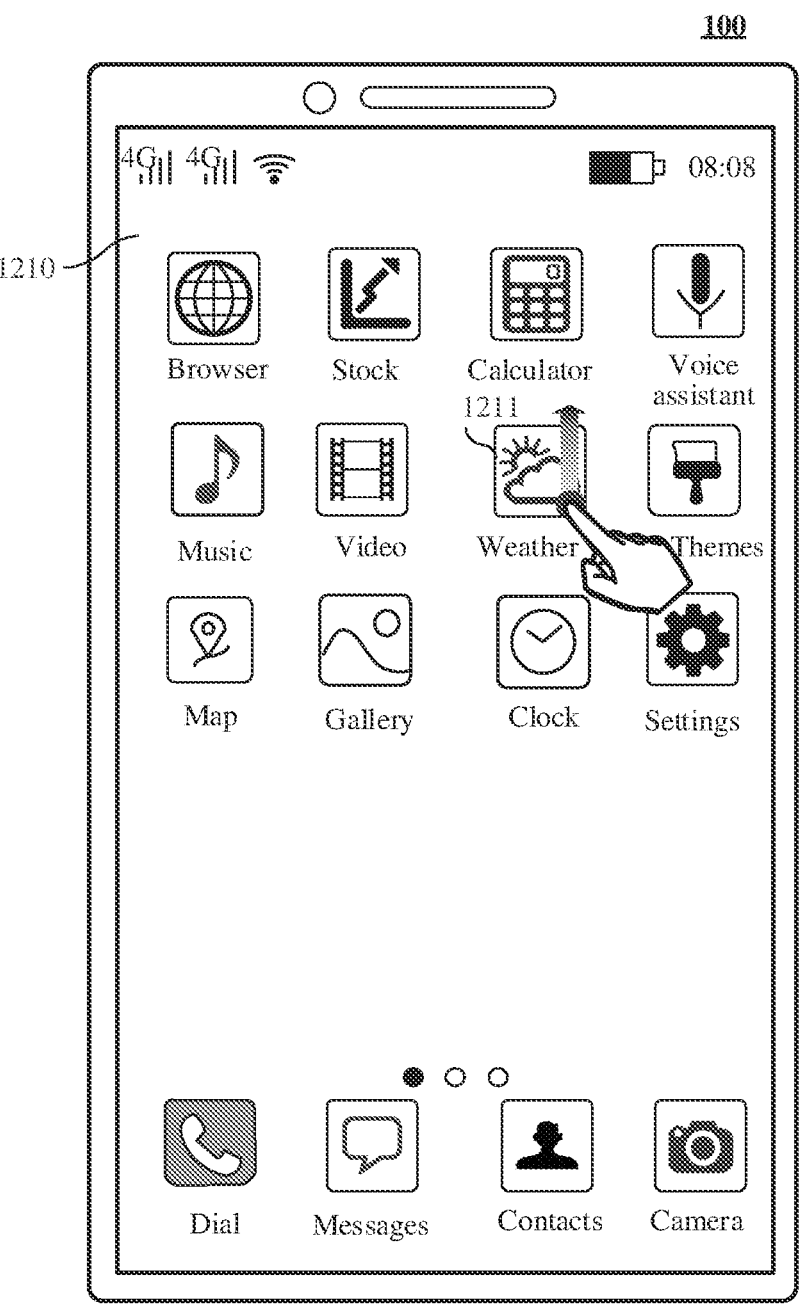
FIG. 12A to FIG. 12G are schematic diagrams of a group of interfaces of editing content in a card component according to an embodiment of this application.

For example, as shown in FIG. 12A, an electronic device 100 may display an interface 1210 on a desktop. For a text description of the interface 1210 on the desktop, refer to the text description of the interface 1010 in the embodiment shown in FIG. 10A. Details are not described herein again.

Figure 12B:
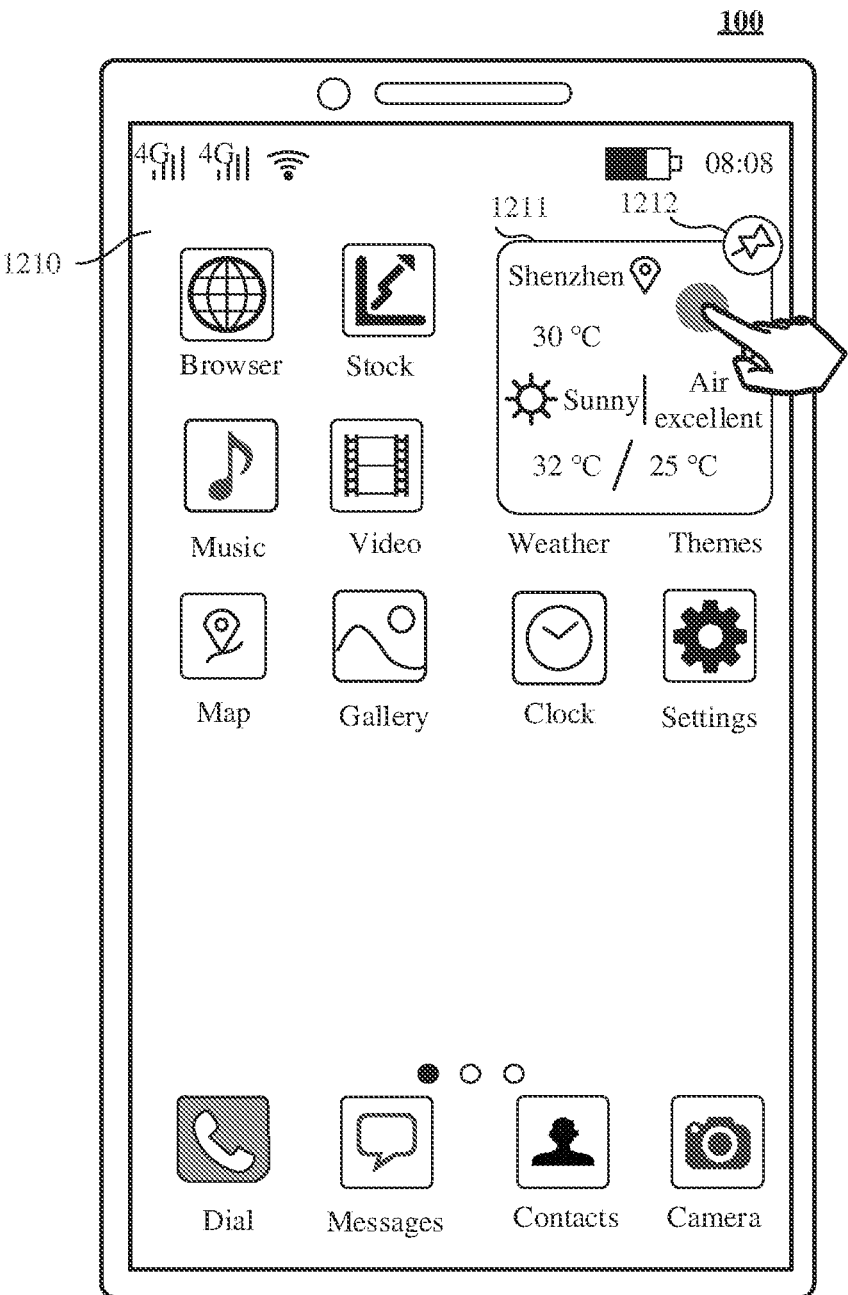

The electronic device 100 may receive a sliding operation (for example, upward sliding) performed by a user on a weather application icon 1211 on the interface 1210. In response to the sliding operation, as shown in FIG. 12B, the electronic device 100 may temporarily display a weather component 1211. The weather component 1211 may be covered and displayed on the weather application icon 1211 and application icons (for example, a calculator application icon, a voice assistant application icon, and a theme application icon) around the weather application icon 1211. Weather information of the "Shenzhen" area is currently displayed on the weather component 1211. The weather information may include one or more of current weather (for example, "sunny"), outdoor temperature (for example, "30 degrees Celsius"), air quality (for example, "air excellent"), maximum temperature of the day (for example, "32 degrees Celsius"), minimum temperature of the day (for example, "25 degrees Celsius"), and the like of a location at a specified area (for example, "Shenzhen"). Optionally, when temporarily displaying the weather component 1211, the electronic device 100 may further display a fixed control 1212. The fixed control 1212 may be used to trigger the electronic device 100 to add the weather component 1211 to a blank area on the desktop.

Figure 12C:
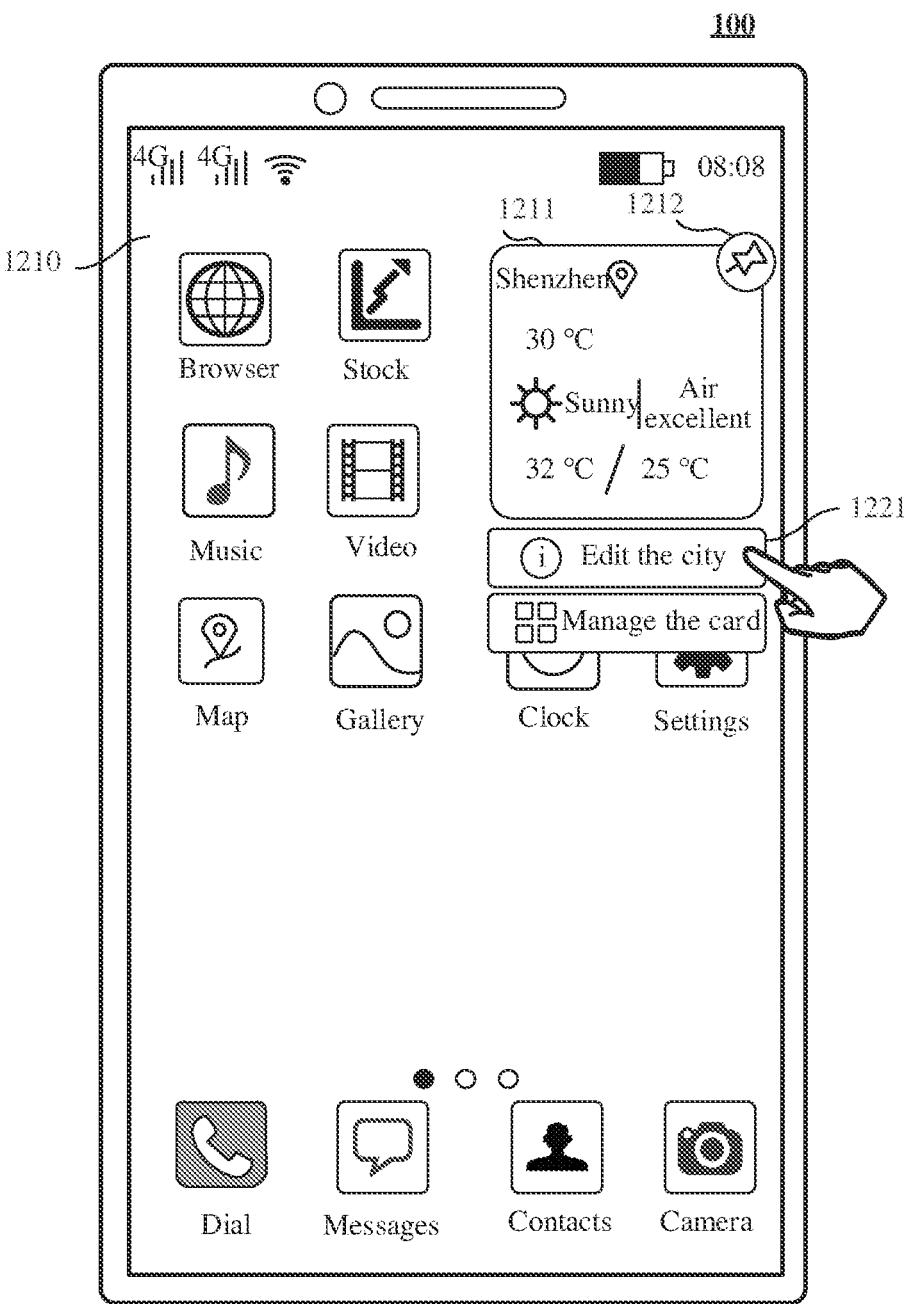

As shown in FIG. 12C, when the electronic device 100 may receive a touch-and-hold operation of the user on the weather component 1211, the electronic device 100 may display a city editing control 1221. Optionally, the electronic device 100 may further display a card management control while displaying the city editing control 1221. The card management control may be used to trigger the electronic device 100 to display a component management interface of a weather application.

The electronic device 100 may receive an input (for example, tapping) of the user for the city editing control 1221. In response to the input, the electronic device 100 may display a city editing interface 1230 shown in FIG. 12D.

Figure 12D:
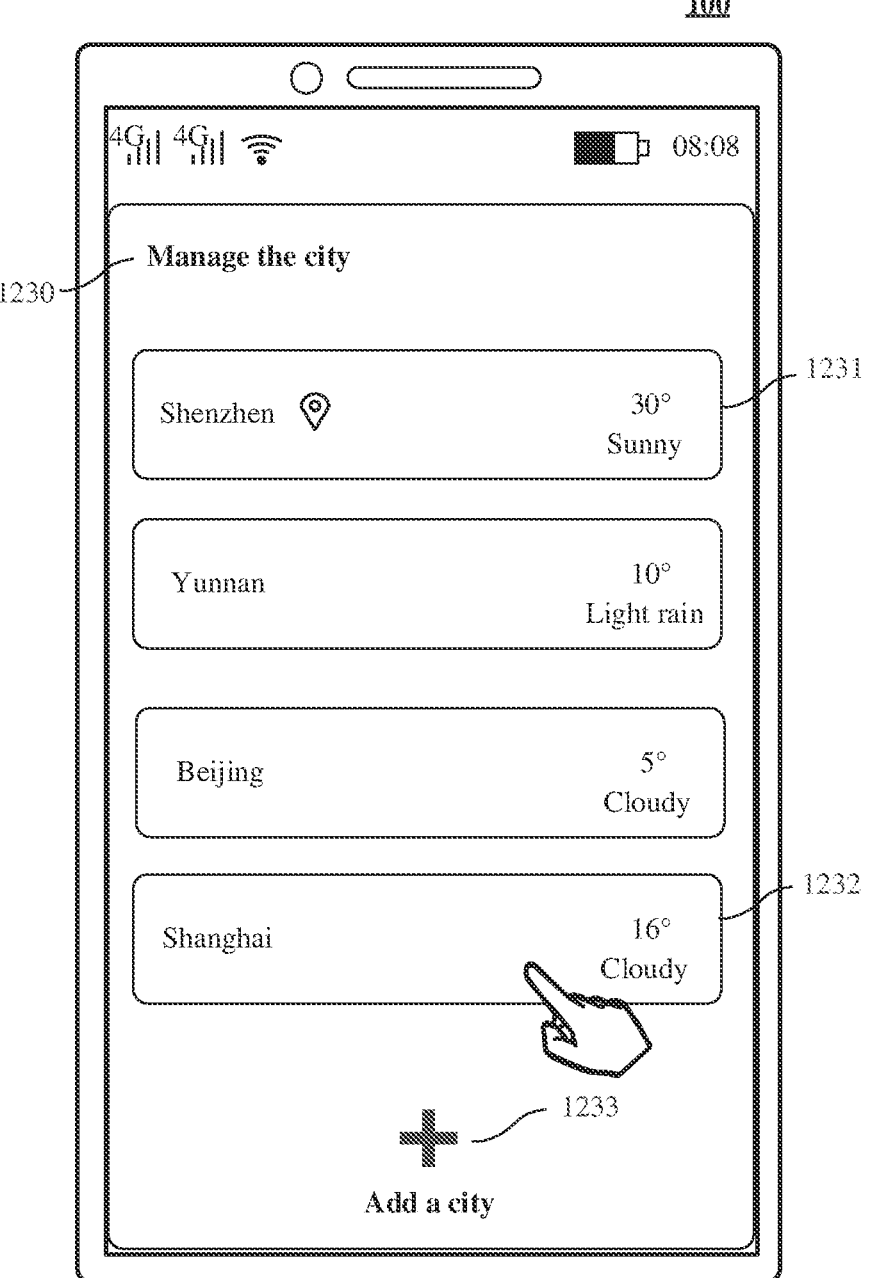

As shown in FIG. 12D, the city editing interface 1230 displays and includes a plurality of city options and a city addition control 1233, for example, a "Shenzhen" city option 1231, a "Yunnan" city option, a "Beijing" city option, and a "Shanghai" city option 1232. The city addition control 1233 may be used to add other city options to the city editing interface 1230.

The electronic device 100 may receive an input (for example, tapping) of the user for the "Shanghai" city option 1232. In response to the input, the electronic device 100 may display weather information of a "Shanghai" city on the weather component.

Figure 12E:
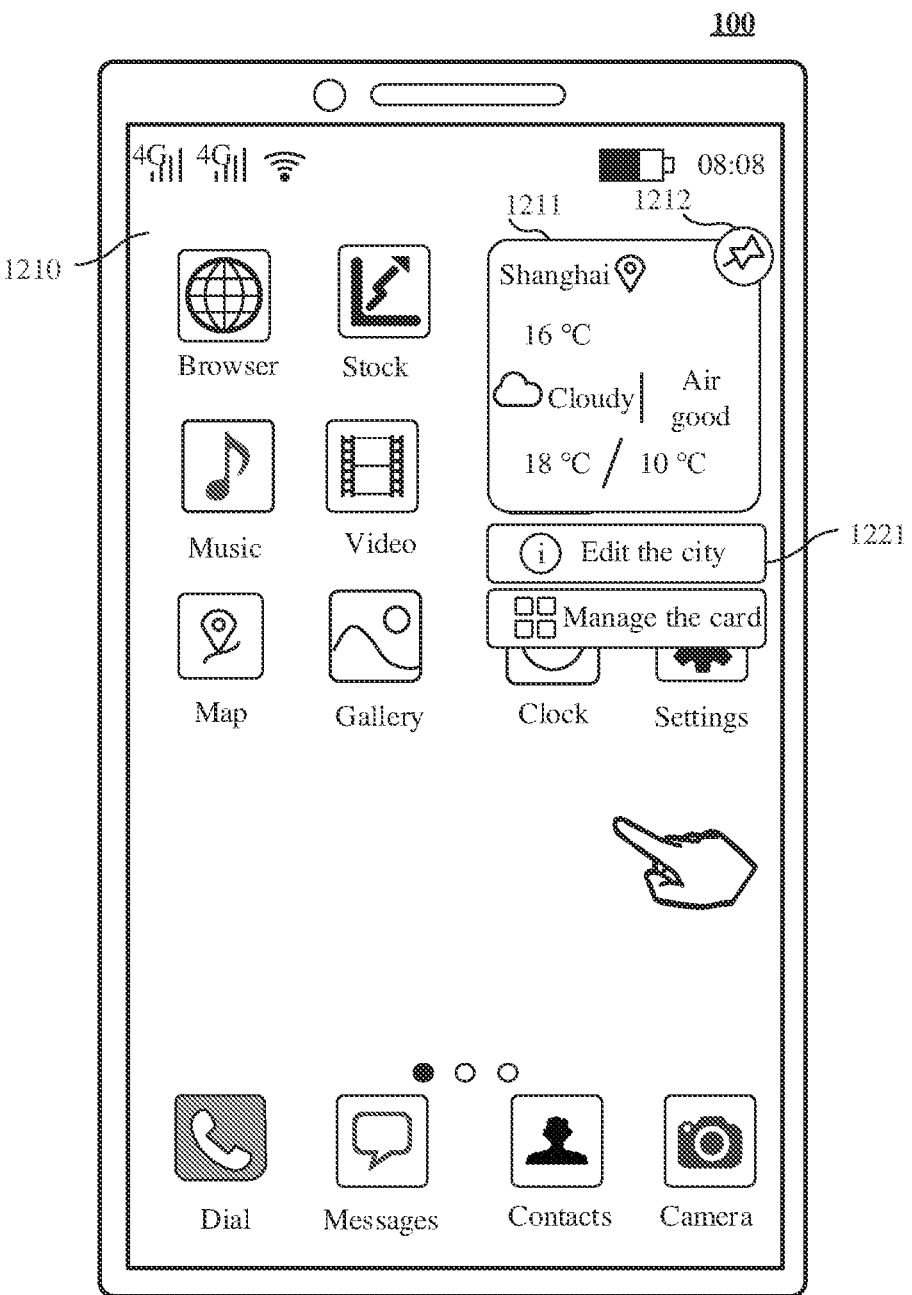

As shown in FIG. 12E, after obtaining the weather information of the "Shanghai" city, the electronic device 100 may display the weather information of the "Shanghai" city on the weather component 1211.

Figure 12F:
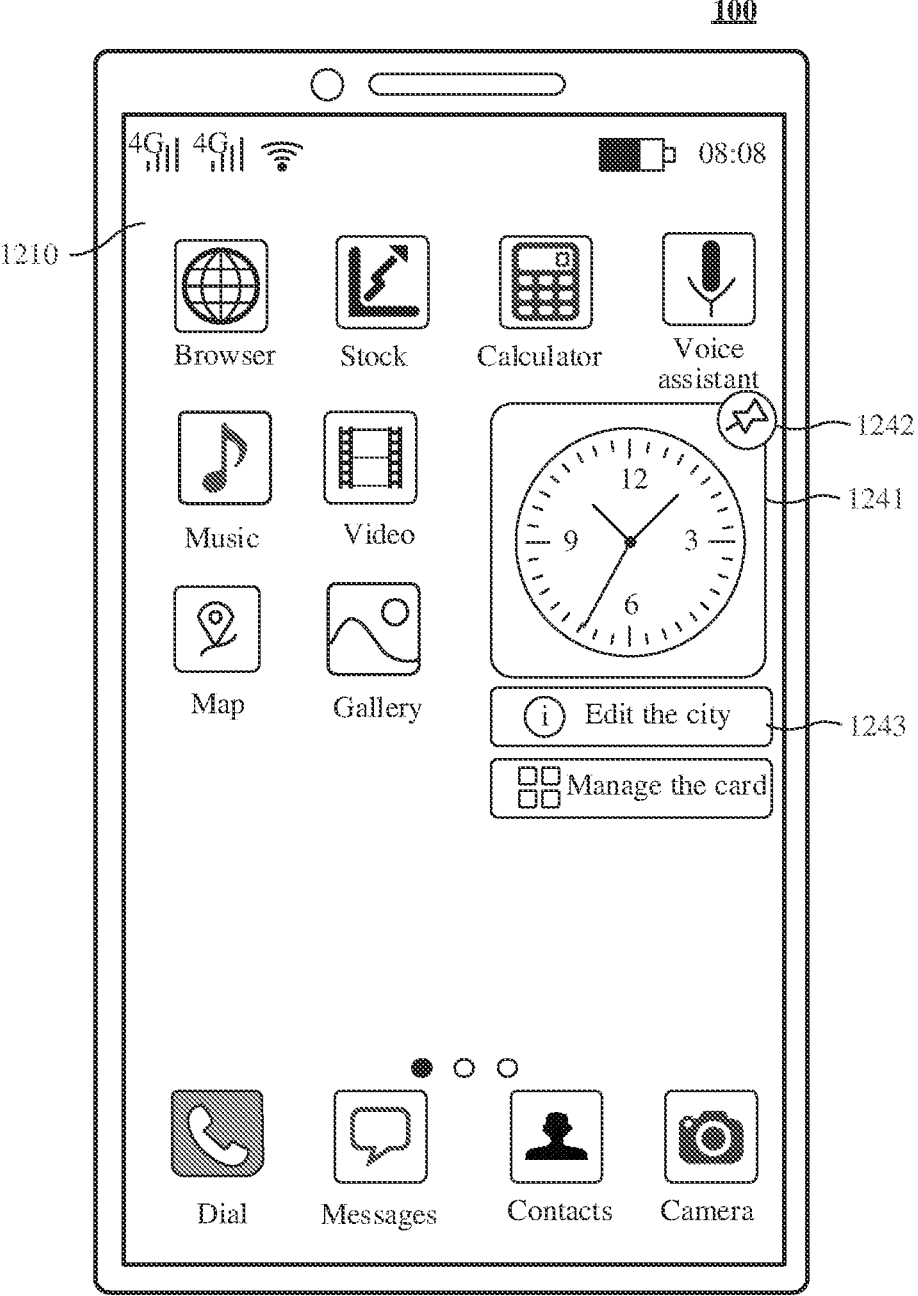

For another example, as shown in FIG. 12F, the electronic device 100 may display the city editing control 1243 after the user performs a touch-and-hold operation on a clock component 1241. The city editing control 1243 may be used to trigger the electronic device 100 to change a time zone city to which a clock displayed on the clock component 1241 belongs. Optionally, the electronic device 100 may further display a card management control while displaying the city editing control 1243. The card management control may be used to trigger the electronic device 100 to display a component management interface of a clock application.

Figure 12G:
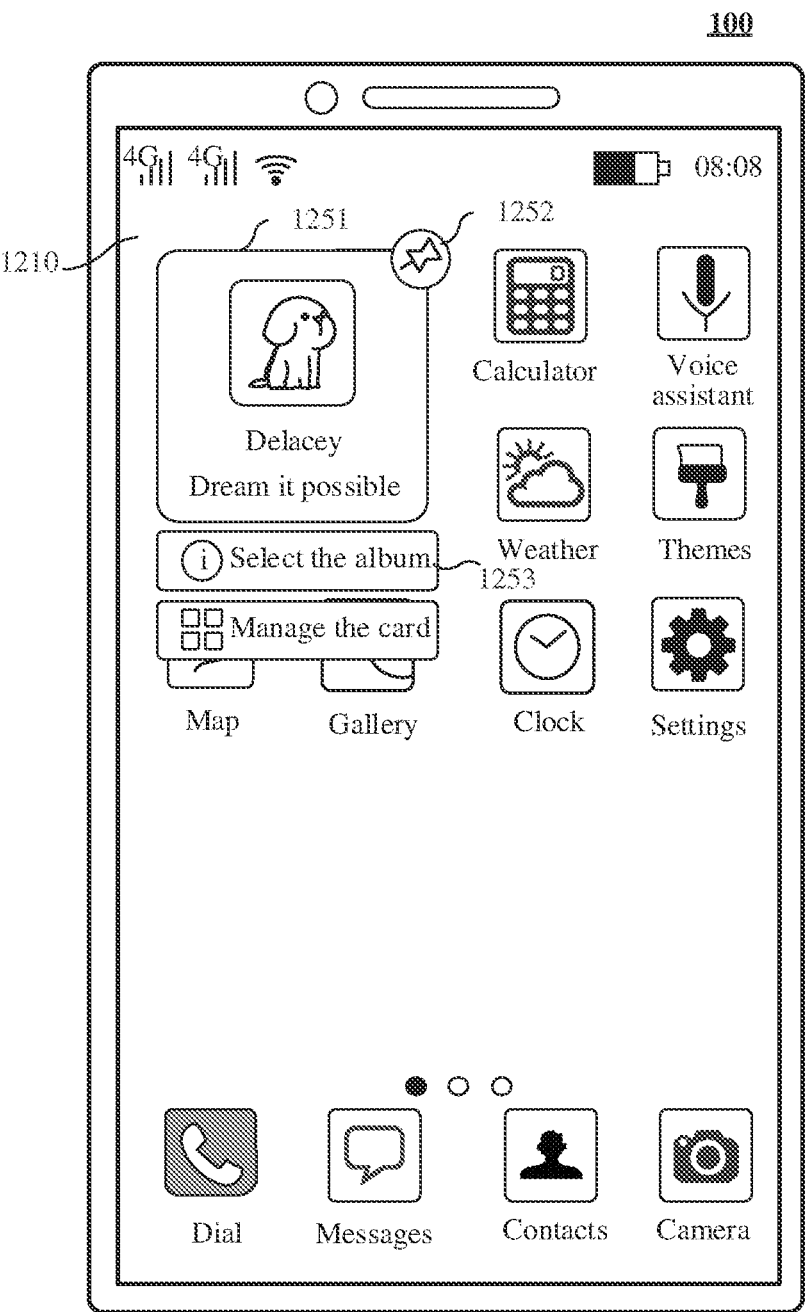

For another example, as shown in FIG. 12G, the electronic device 100 may display an album selection control 1253 after the user performs a touch-and-hold operation on a music component 1251. The album selection control 1253 may be used to trigger the electronic device 100 to change music information displayed in the music component 1251. The music information includes an album image, a name of the music, a name of a singer, and the like. Optionally, the electronic device 100 may further display a card management control while displaying the album selection control 1253. The card management control may be used to trigger the electronic device 100 to display a component management interface of a music application.

In some application scenarios, the electronic device 100 may trigger, on the desktop through an input by the user, to display a card component center interface. All card components on the electronic device 100 are displayed on the card component center interface. The card components on the card component center interface may be arranged in a specified order.

Figure 13A:
FIG. 13A to FIG. 13E are schematic diagrams of a group of interfaces of entering a card center interface according to an embodiment of this application.

For example, as shown in FIG. 13A, an electronic device 100 may display an interface 1310 on a desktop. For a text description of the interface 1310, refer to the text description of the interface 1010 on the desktop in the embodiment shown in FIG. 10A. Details are not described herein again.

The electronic device 100 may receive an input (for example, two fingers slide in opposite directions) of the user for a blank area on the interface 1310 on the desktop. In response to the input, the electronic device 100 may display a page adjustment interface 1320 shown in FIG. 13B.

Figure 13B:
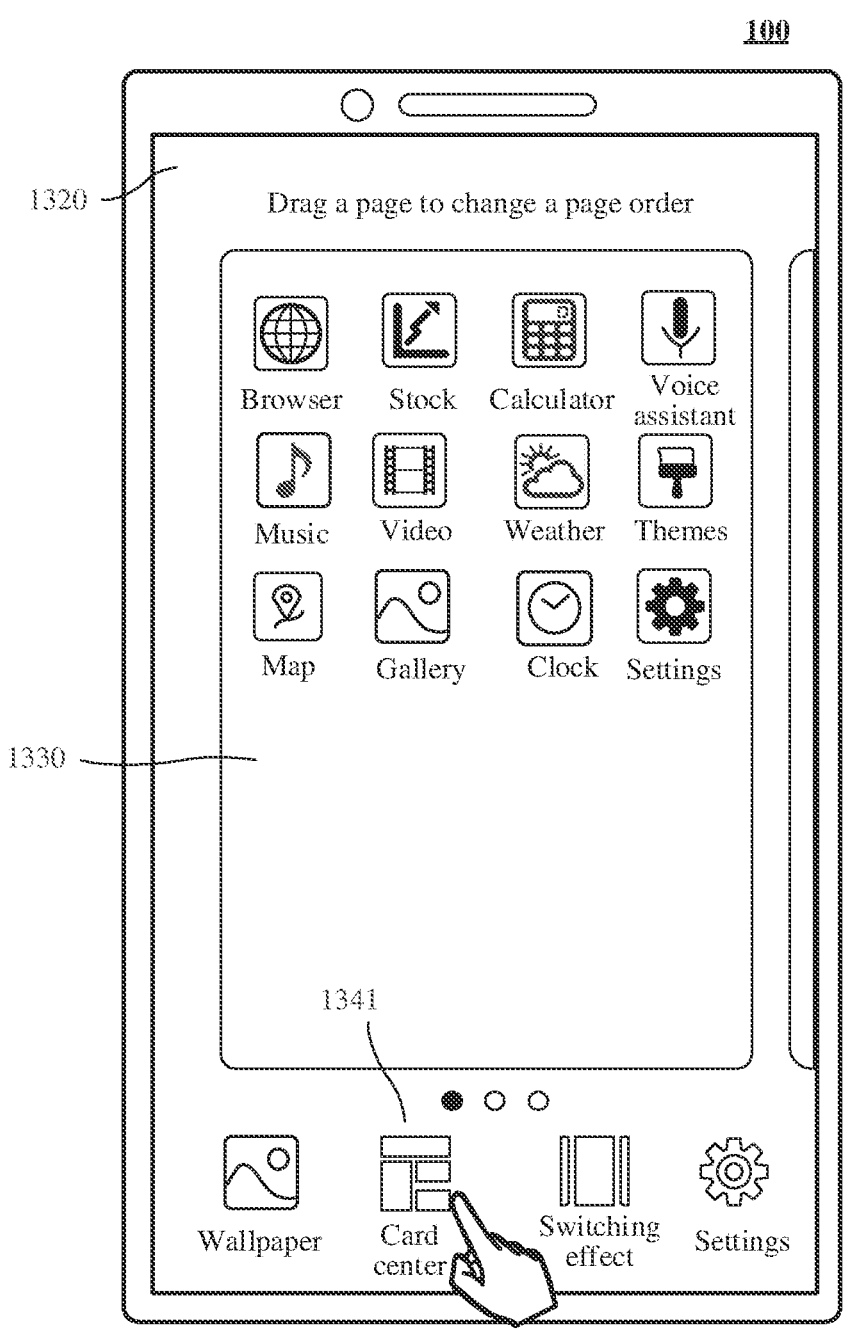

As shown in FIG. 13B, the page adjustment interface 1320 displays and includes a card center control 1341, a page (for example, a page 1331) on which an application icon is placed on the desktop, and another functional control (for example, a wallpaper setting control, a switching effect control, a desktop setting control, a page indicator, or the like). A plurality of application icons are displayed on the page 1331. When the electronic device 100 receives a left-sliding operation of the user on the page 1331, the electronic device 100 may switch to display, on the page adjustment interface 1320, a page on the right of the page 1331 by using a preset switching effect.

The electronic device 100 may receive an input (for example, tapping) of the user for the card center control 1341. In response to the input, the electronic device 100 may display a card component center interface 1350 shown in FIG. 13C.

Figure 13C:
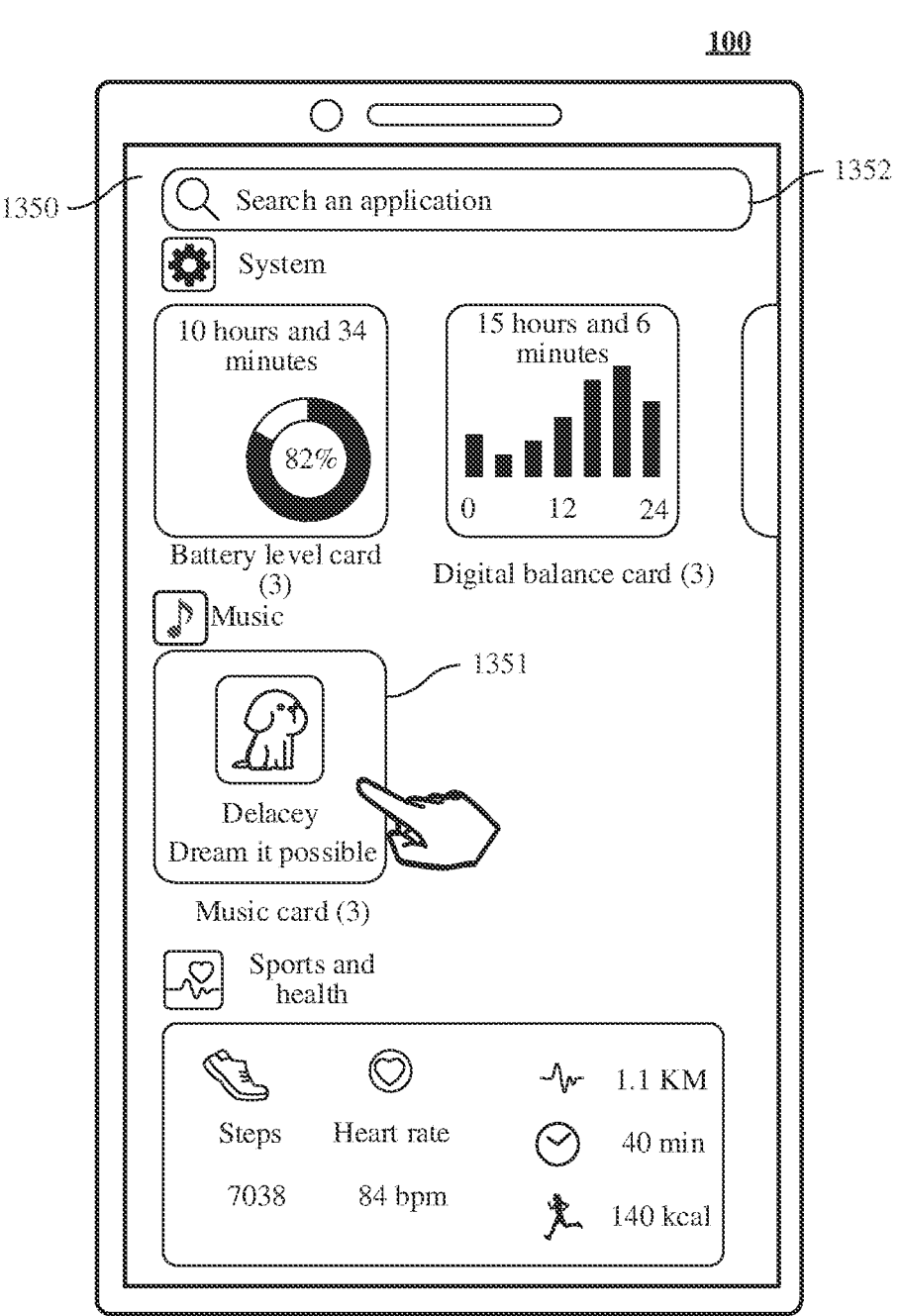

As shown in FIG. 13C, the card component center interface 1350 displays and includes a search box 1352 and a card component set classified based on an application type. The search box 1352 may be used to receive text information entered by the user, and trigger the electronic device 100 to search for and display, based on the text information entered by the user, a card component corresponding to the text information.

For example, the card component set classified based on the application type includes a card component set corresponding to a system application, a card component corresponding to a music application, and a card component corresponding to a sports and health application. When there are a plurality of card components of an application, the electronic device 100 may stack a card component of the application. A default card component of the application is displayed on the card stacking component, and a quantity of types of card components corresponding to the application is displayed below the card stacking component. For example, a card stacking component 1351 of a music application is displayed on the card component center interface 1350. A quantity of types (for example, three types) of card components corresponding to the music application is displayed below the card stacking component 1351. Optionally, when there are a plurality of card components of the application, the electronic device 100 may arrange the plurality of card components of the application in a display bar of the application.

The electronic device 100 may receive an input (for example, tapping) of the user for the card stacking component 1351. In response to the input, the electronic device 100 may display a card component display interface 1360 shown in FIG. 13D.

Figure 13D:
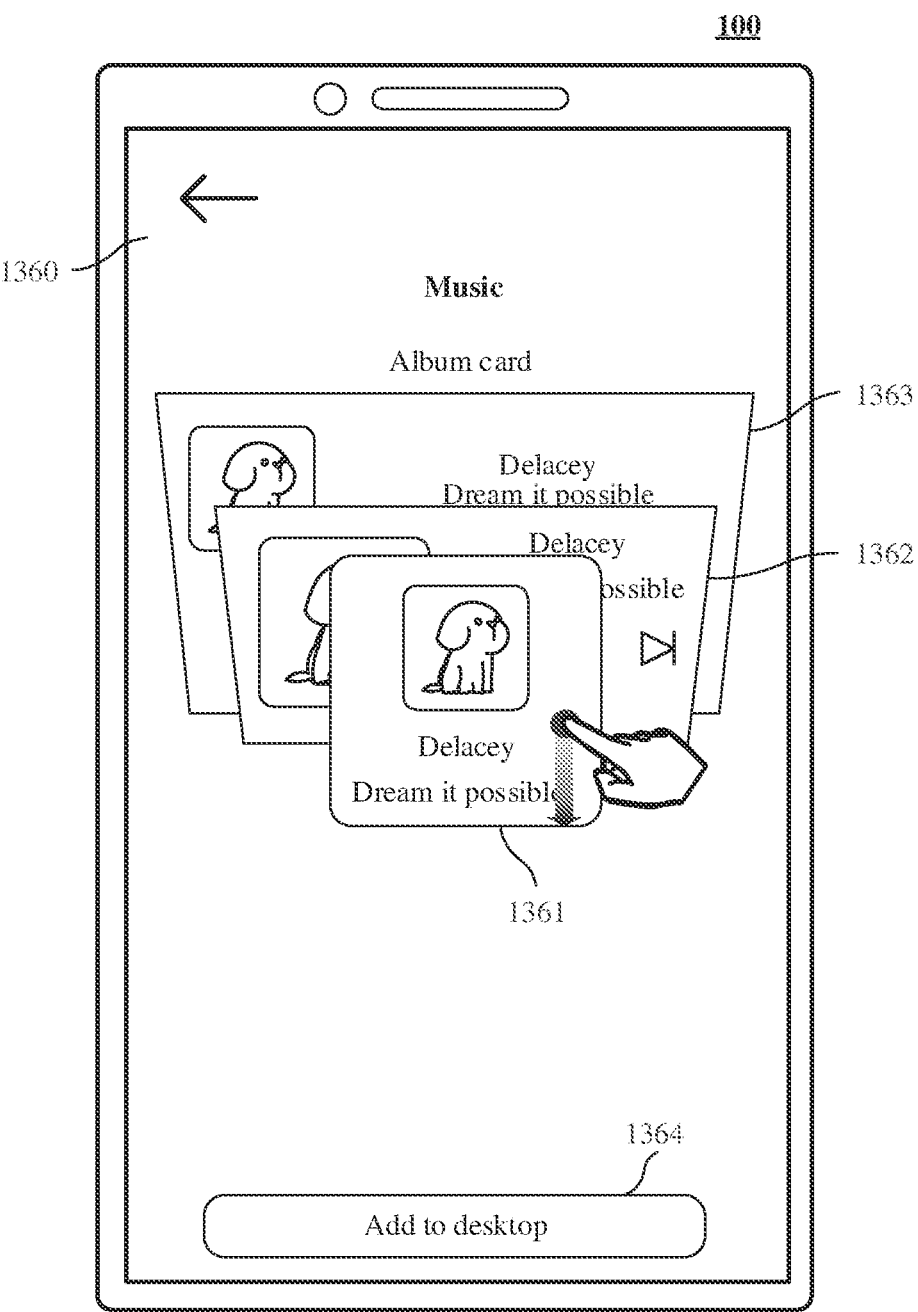

As shown in FIG. 13D, the card component display interface 1360 displays and includes a music component 1361, a music component 1362, a music component 1363, and an add-to-desktop control 1364. The music component 1361 is stacked on an upper layer of the music component 1362, and the music component 1362 is stacked on an upper layer of the music component 1363. Styles (including a size and/or a displayed functional control) of the three card components: the music component 1361, the music component 1362, and the music component 1363 are different. The add-to-desktop control 1364 may be used to add, to a blank area on a desktop, a card component that is stacked and displayed at a top layer on the card component display interface 1360.

Figure 13E:
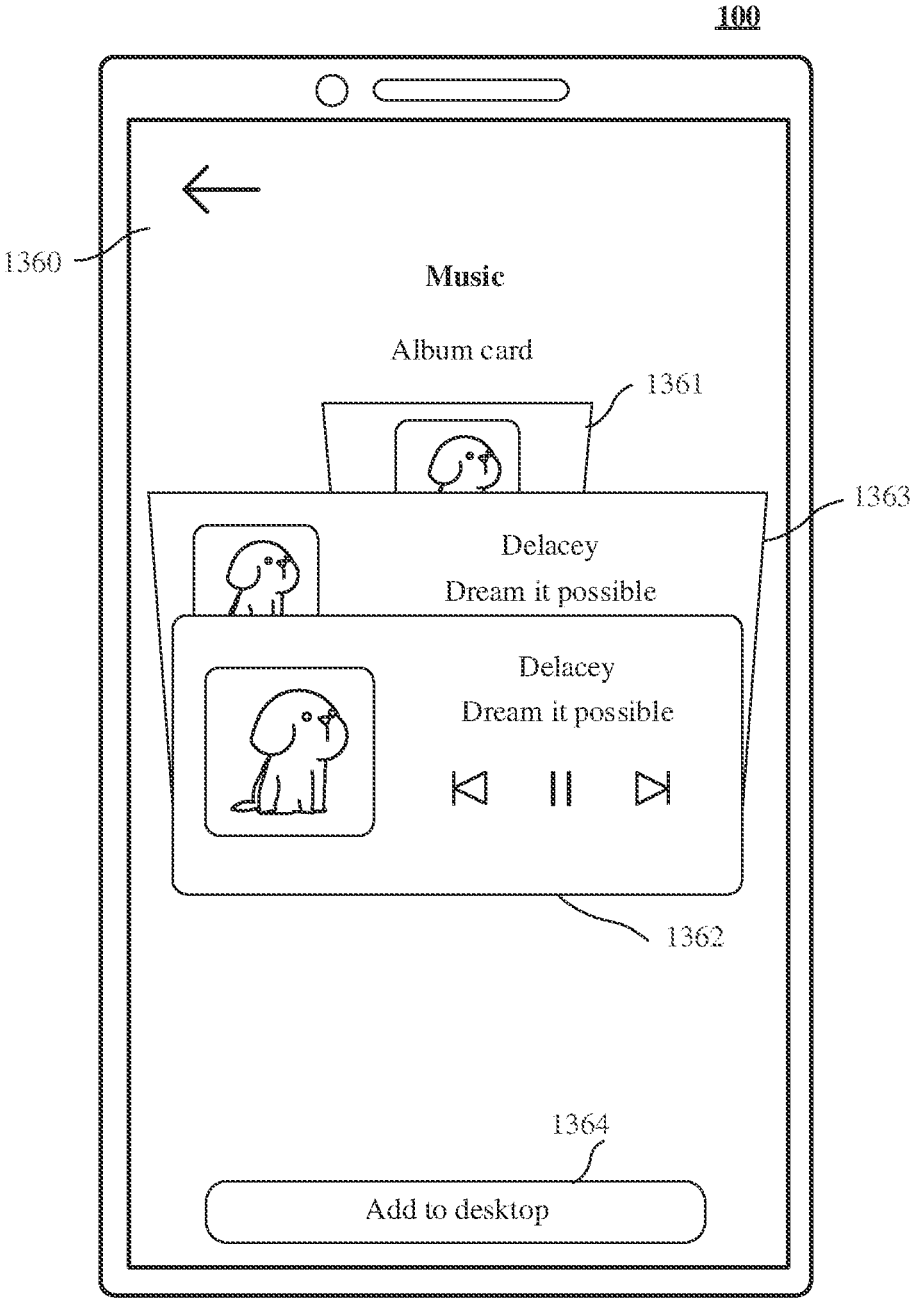

The electronic device 100 may receive a sliding operation (for example, sliding downward) of the user on the music component 1361 on the card component display interface 1360. As shown in FIG. 13E, the electronic device 100 may perform the sliding operation (for example, sliding downward) of the user on the music component 1361 on the card component display interface 1360, stack and display the music component 1362 at an upper layer of the music component 1143, and stack and display the music component 1363 at an upper layer of the music component 1361. Optionally, card components of different styles on the foregoing card component display interface are not limited to being displayed by scrolling up and down, and may further be displayed by switching left and right.

In embodiments of this application, the card component may be displayed in a specified sequence on the foregoing card component center interface. The electronic device 100 may preferentially display, at the top of the card component center interface, a card component corresponding to an application installed before delivery.

Optionally, the electronic device 100 may display, on the top of the card component center interface, a card component corresponding to an application installed within a latest preset time period.

Optionally, the electronic device 100 may be based on historical usage data of the application (for example, one or more of time of use, frequency of use, a location scenario, or the like) to sort card components of each application type on the card component center interface. For example, a card component corresponding to an application that has been used for a long period of time is displayed on the top of the card component center interface, and a card component corresponding to an application that has been used for a short period of time is displayed on the bottom of the card component center interface. For another example, a card component corresponding to an application that is frequently used is displayed on the top of the card component center interface, and a card component corresponding to an application that is not frequently used is displayed on the bottom of the card component center interface.

In some embodiments, some system applications on the electronic device 100 do not have corresponding application icons on the desktop, but these system applications correspond to card components, for example, a battery level component or a digital balance component. The electronic device 100 may temporarily display a card component of the system application through a sliding operation (for example, upward sliding) of the user on a setting application icon. Optionally, the electronic device 100 may display the card component of the system application on the card component center interface, and support the user in adding the card component of the system application on the card component center interface to the desktop.

In some application scenarios, when a spacing distance between application icons on the desktop of the electronic device 100 changes, a size of the card component displayed on the desktop also changes with a change of the spacing distance between application icons.

Figure 14A:
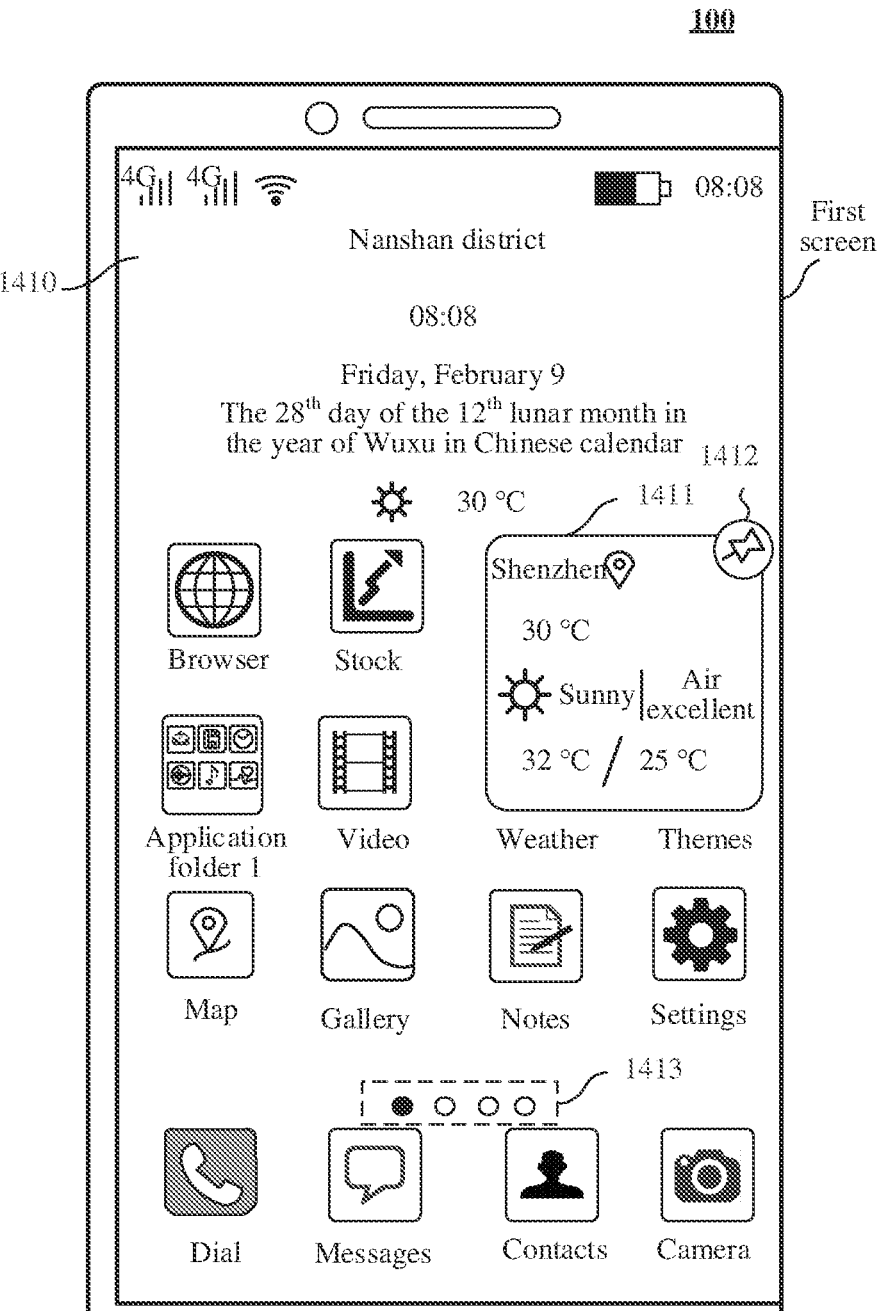
FIG. 14A to FIG. 14C are schematic diagrams of a group of interfaces of displaying a card component on an electronic device configured with a folding screen according to an embodiment of this application.

For example, as shown in FIG. 14A, a display screen of the electronic device 100 may be folded. When the electronic device 100 is in a folded state, the display screen of the electronic device 100 may be divided into a first screen and a second screen, and the electronic device 100 may display an interface 1410 on a desktop on the first screen. The interface 1410 displays and includes a page on which an application icon is placed, and the page includes a plurality of application icons (for example, a browser application icon, a stock application icon, a calculator application icon, a voice assistant application icon, a video application icon, a weather application icon, a theme application icon, a map application icon, a gallery application icon, a notes application icon, a setting application icon, and the like). The page may further include an application folder icon (for example, an icon 312 of an application folder 1), and the application folder icon may be used to trigger the electronic device 100 to display one or more application icons. Optionally, a page indicator 1413 is further displayed and included below a page on which the application icon is placed, to indicate a total quantity of pages on the desktop and a location relationship between a currently displayed page and another page. For example, the interface 1410 on the desktop may include four pages, and a black dot in the page indicator is on the leftmost, which may represent that the currently displayed page is a leftmost page of the four pages. Further, optionally, there may be a dock (dock) area below the page indicator, and the dock area may include one or more dock icons (for example, a dial-up application icon, a messaging application icon, a contact application icon, a camera application icon, or the like). The one or more dock icons in the dock area may remain displayed during page switching.

After receiving a sliding operation (for example, upward sliding) of the user on the weather application icon, the electronic device 100 may temporarily display the weather component 1411 on the interface 1410 on the desktop. The weather component 1411 is covered and displayed on the weather application icon, a calculator application icon, a voice assistant application icon, a theme application icon. Optionally, when displaying the weather component 1411, the electronic device 100 may further display a fixed control 1412 corresponding to the weather component 1411. The fixed control 1412 may be used to trigger the electronic device 100 to add the weather component 1411 to a blank area on the desktop.

Figure 14B:
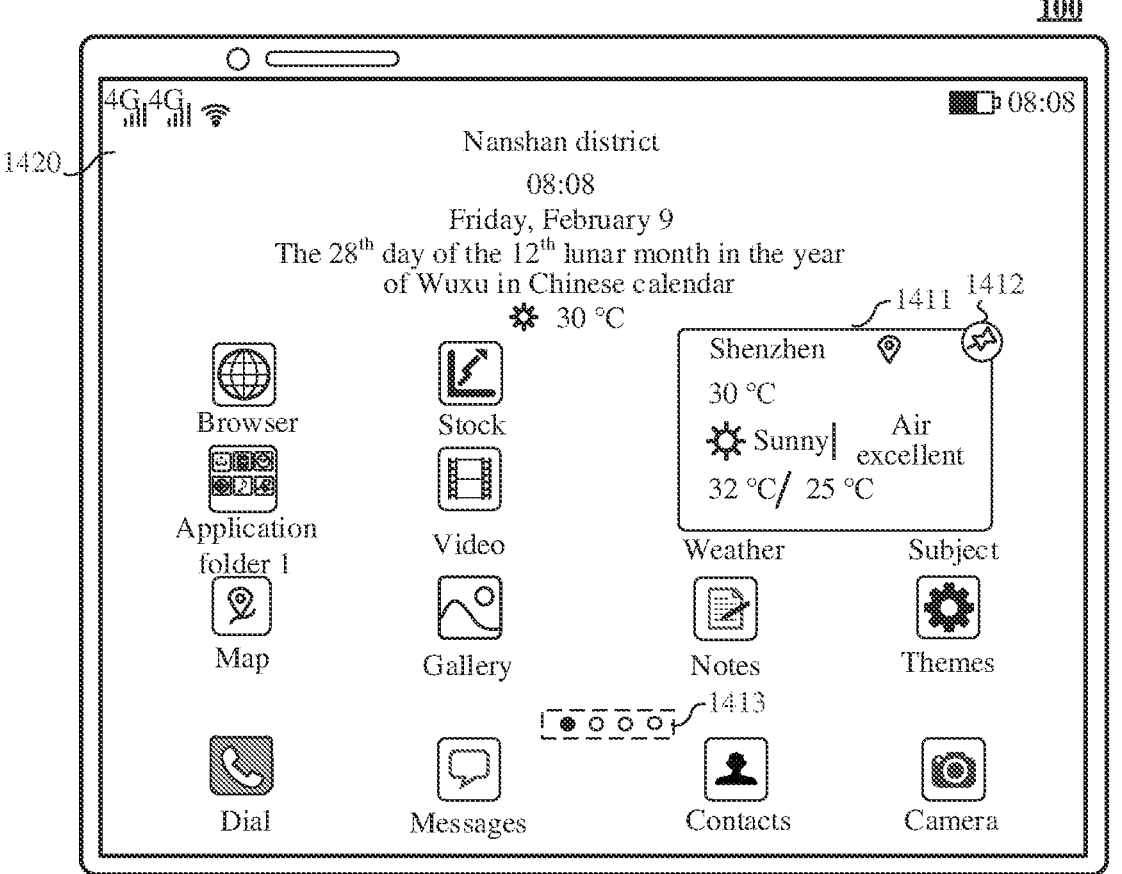

As shown in FIG. 14B, when the display screen of the electronic device 100 is switched from the folded state to an expanded state, the electronic device 100 may display the interface 1420 on the desktop on the display screen. An interface element on the interface 1420 is the same as an interface element on the interface 1410 shown in FIG. 14A. Because a spacing distance between application icons on the interface 1420 increases, a size of the music component 1411 also increases, but the music component 1411 is still covered and displayed on the weather application icon, the calculator application icon, the voice assistant application icon, and the theme application icon.

Optionally, when the display screen of the electronic device 100 is switched from the folded state to the expanded state, the electronic device 100 may combine two adjacent pages on which the application icon is placed on the desktop displayed on the first screen in the folded state into one page, and display the page on the display screen.

Figure 14C:
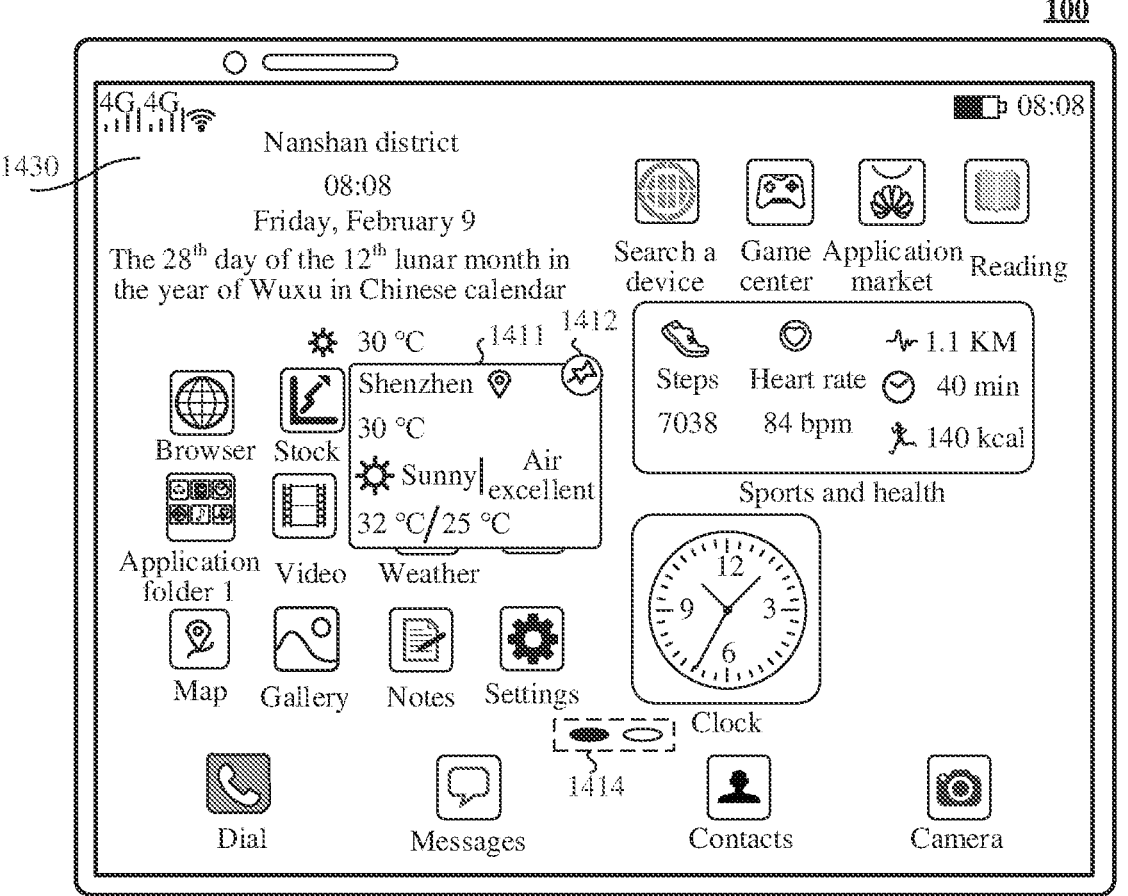

For example, as shown in FIG. 14C, when the display screen of the electronic device 100 is switched from the folded state to an expanded state, the electronic device 100 may display the interface 1430 on the desktop on the display screen. The interface 1430 on the desktop includes the interface element displayed on the interface 1410 shown in FIG. 14A and an interface element on a right page of the page displayed on the interface 1410. For example, a page on the right of the page displayed on the interface 1410 may display a search device application, a game center application, an application market application, a reading application, a sports and health component, a clock component, and the like. When the display screen of the electronic device 100 is switched from the folded state to the expanded state, a spacing distance between application icons in a non-dock area on the interface 1430 on the desktop remains unchanged. Therefore, a size of the music component 1411 also remains unchanged. In addition, the music component 1411 is still covered and displayed on the weather application icon, the calculator application icon, the voice assistant application icon, and the theme application icon.

In some application scenarios, after temporarily displaying the card component corresponding to the first application through a sliding operation (for example, upward sliding) of the user on the icon of the first application, the electronic device 100 may add the card component corresponding to the first application to a specified shortcut interface (for example, a service center interface). The electronic device 100 triggers display of the specified shortcut interface through a specified input on the desktop. In this way, it may be convenient for the user to quickly view, on the specified shortcut interface, the card component corresponding to the first application.

Figure 15A:
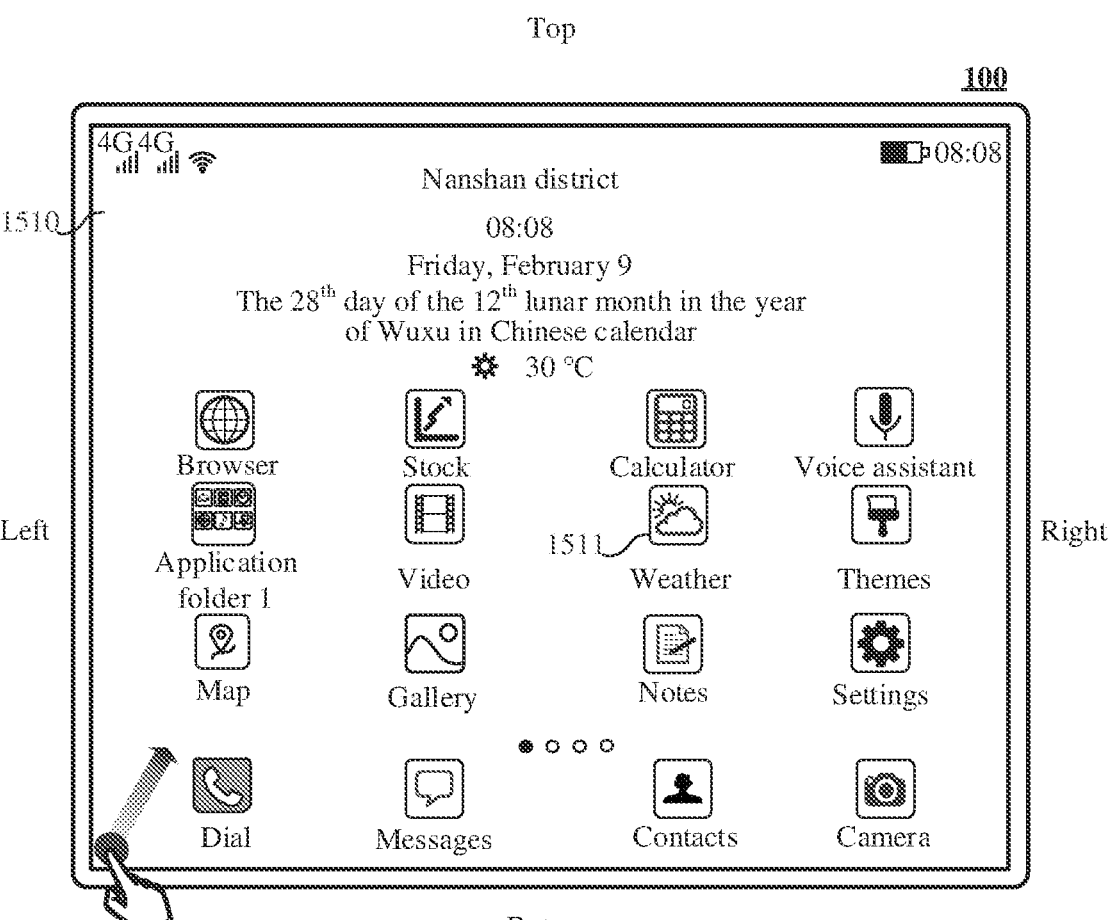
FIG. 15A to FIG. 15F are schematic diagrams of a group of interfaces of adding a card component to a service center according to an embodiment of this application.

For example, as shown in FIG. 15A, an electronic device 100 may display an interface 1510 on a desktop. A weather application icon 1511 is displayed on the interface 1510. For a part that is not described in detail on the interface 1510, refer to the text description of the interface 620 shown in FIG. 6C. Details are not described herein again.

The electronic device 100 may receive a sliding operation (for example, slide obliquely from the bottom left on the desktop to the top right) of the user on the desktop. In response to the sliding operation, the electronic device 100 may display a service center interface 1520 shown in 15B.

Figure 15B:
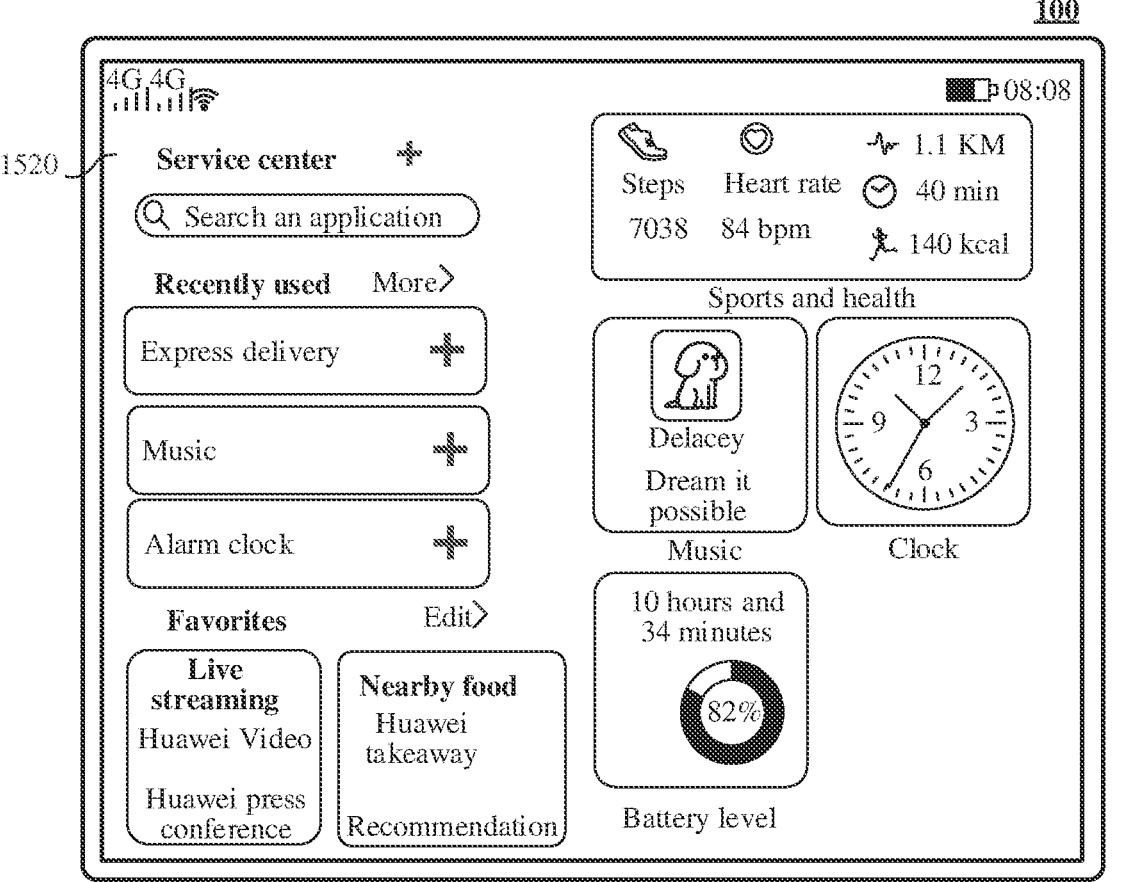

As shown in FIG. 15B, the service center interface 1520 displays and includes a card component that includes one or more service options and has been added to the service center interface. The one or more service options include an express delivery service option, a music service option, an alarm clock service option, and the like. The card components that have been added to the service center interface include a sports and health component, a music component, a clock component, a battery level component, and the like.

Figure 15C:
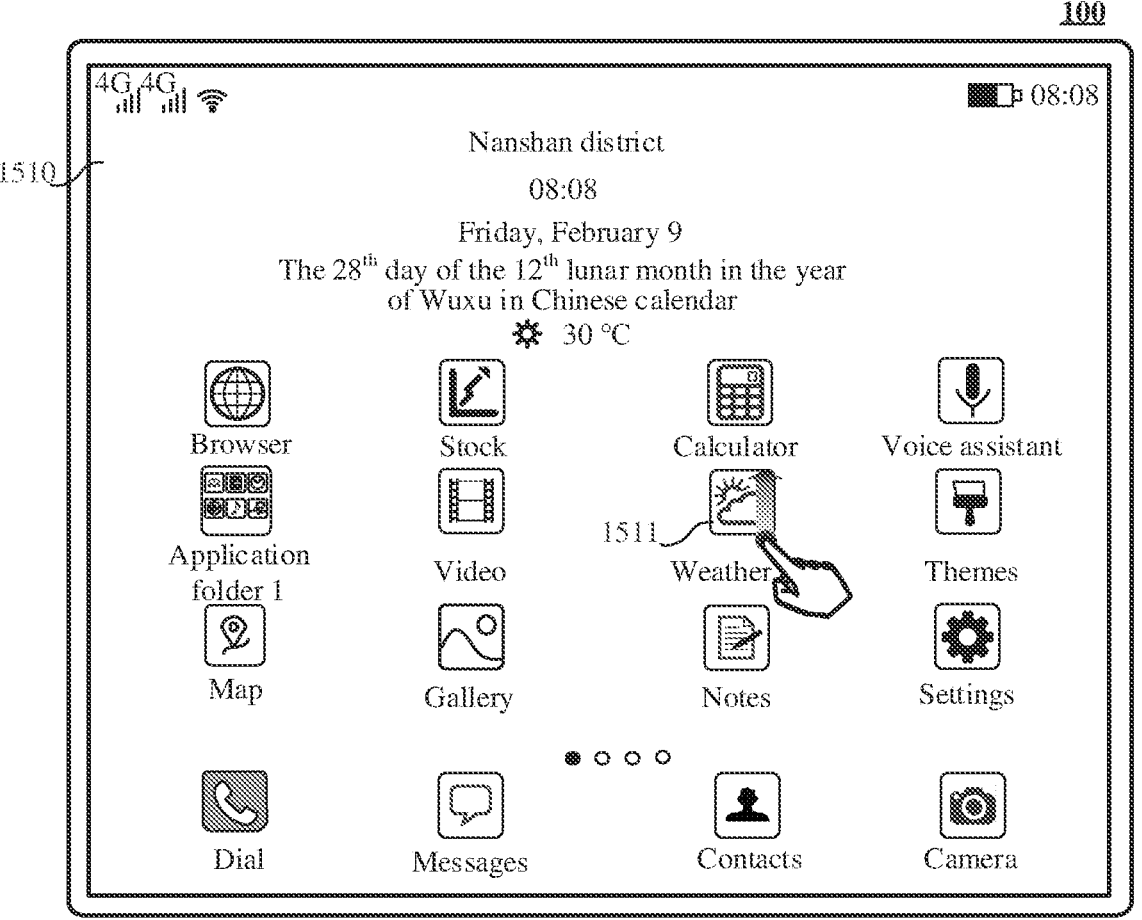

As shown in FIG. 15C, the electronic device 100 may receive a sliding operation (for example, tapping) of the user on the weather application icon 1511. In response to the sliding operation, as shown in FIG. 15D, the electronic device 100 may temporarily display a weather component 1512.

Figure 15D:
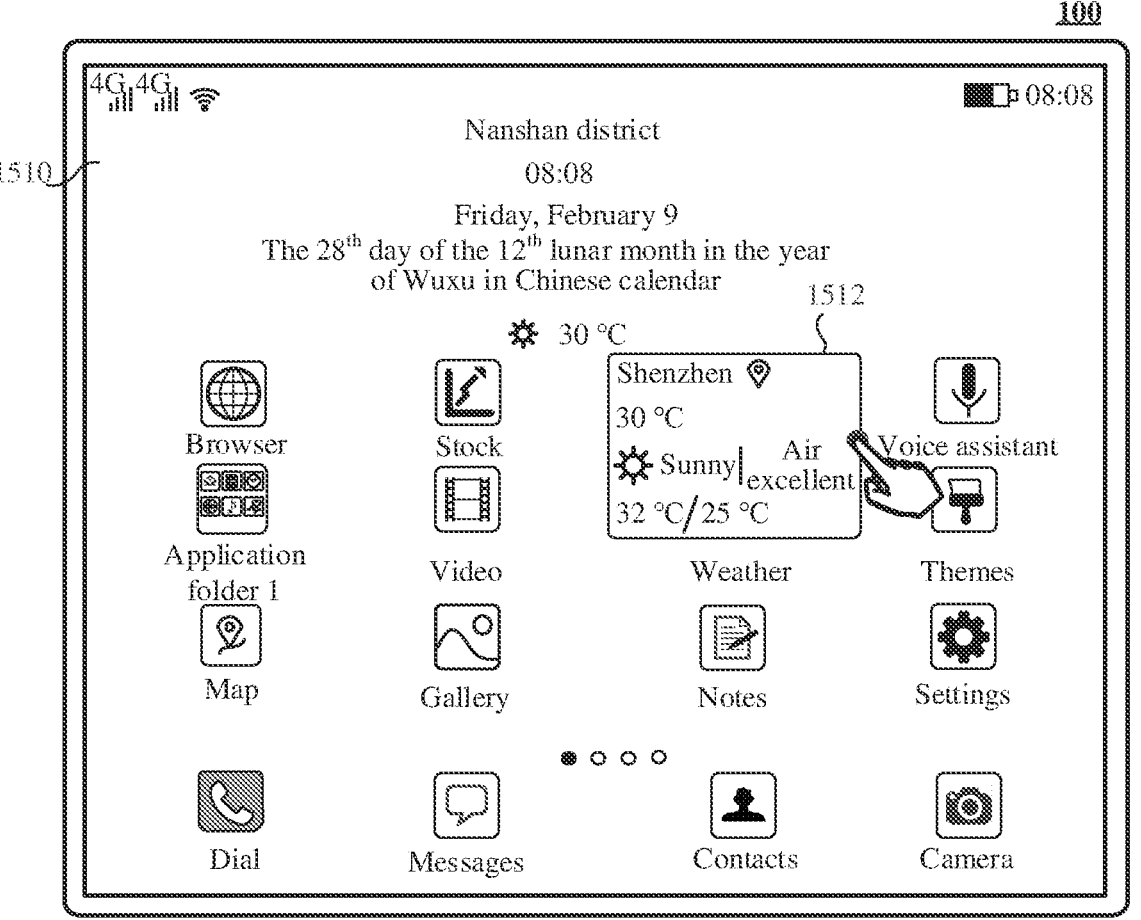

As shown in FIG. 15D, the weather component 1512 may be covered and displayed on the weather application icon and the calculator application icon. The electronic device 100 may receive a touch-and-hold operation of the user on the weather component 1512. In response to the touch-and-hold operation, the electronic device 100 may display a shortcut menu 1513 shown in FIG. 15E.

Figure 15E:
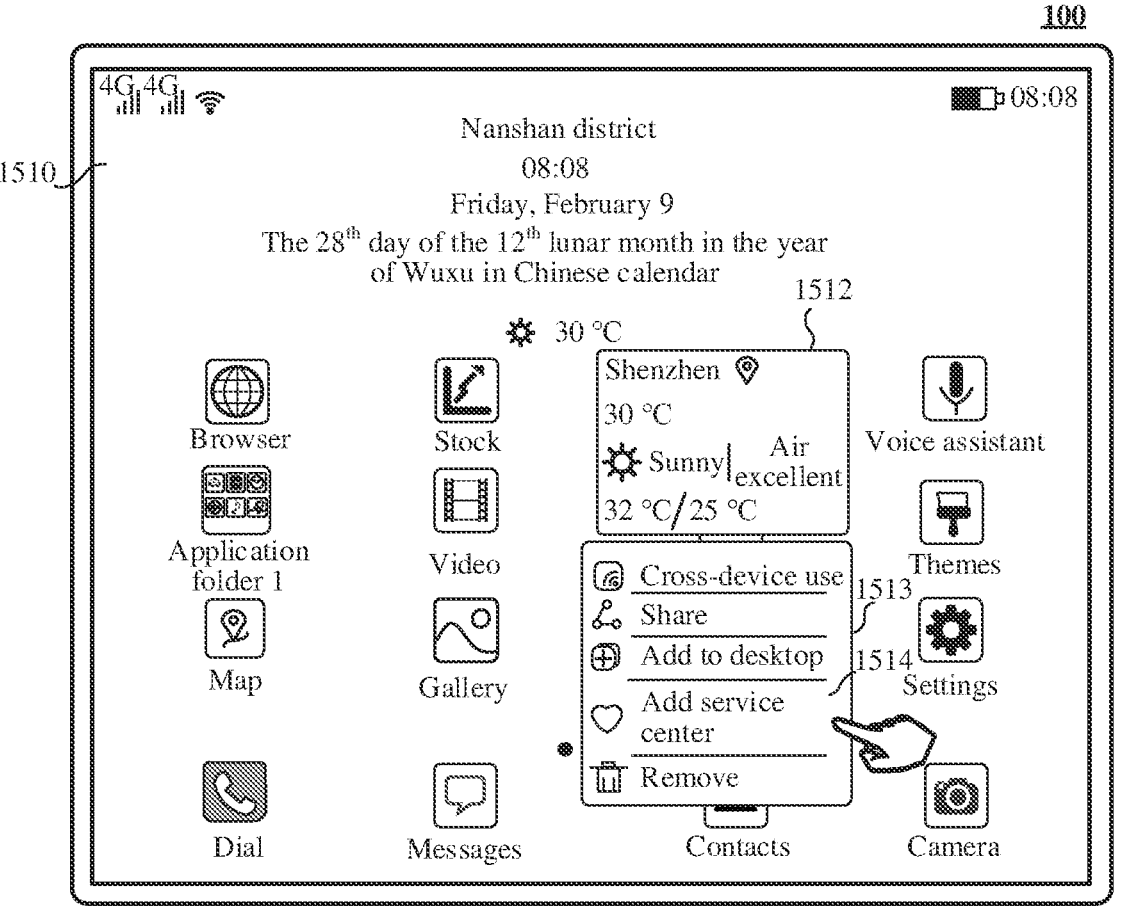

As shown in FIG. 15E, the shortcut menu 1513 displays and includes an add-to-service center control 1514. Optionally, the shortcut menu 1513 further displays and includes another functional control, for example, a cross-device use control, a sharing control, an add-to-desktop control, or a removal control. The add-to-service center control 1514 may be used to trigger the electronic device 100 to add the weather component 1512 to the service center interface. The cross-device use control may be used to trigger the electronic device 100 to provide the weather component 1512 for another device for use. The sharing control may be used to trigger the electronic device 100 to share information displayed in the weather component 1512 with another device. The add-to-desktop control may be used to trigger the electronic device 100 to add the weather component 1512 to a blank area on the desktop.

Figure 15F:
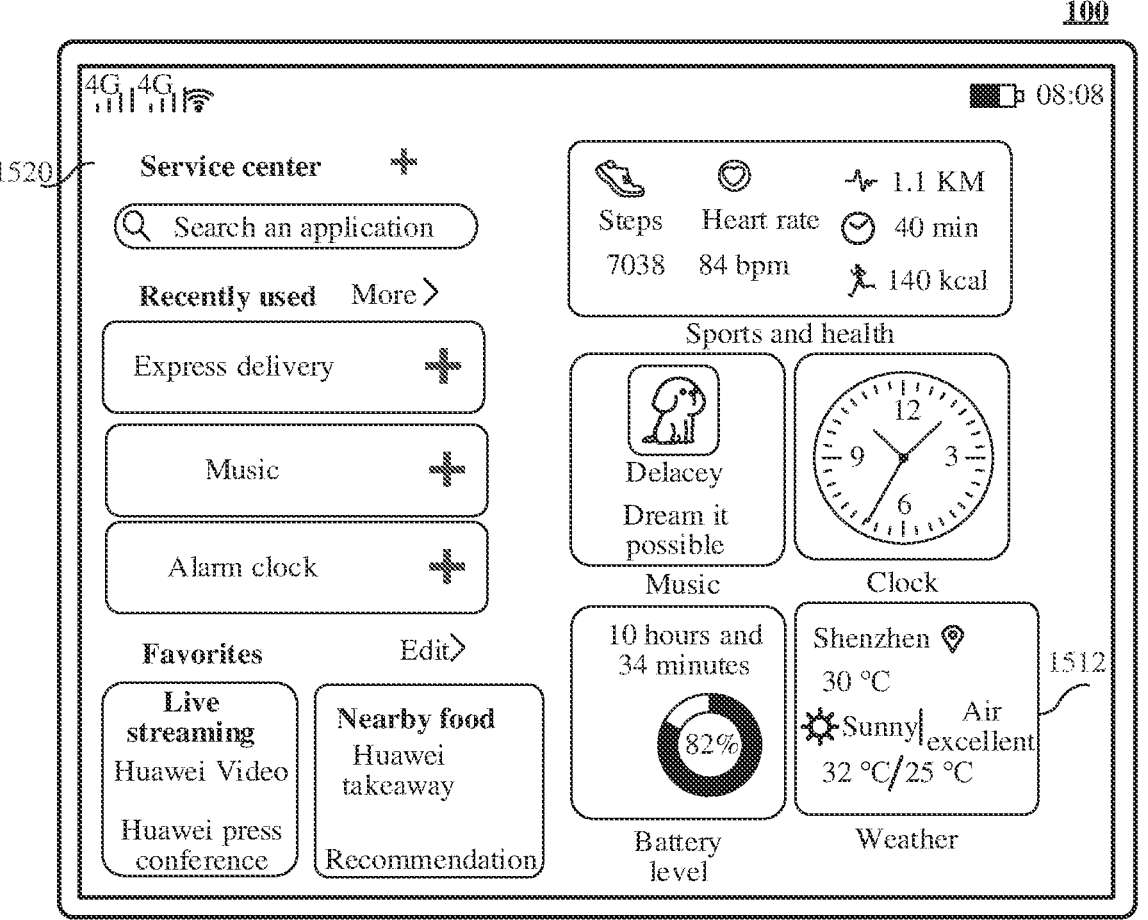

As shown in FIG. 15F, when the electronic device 100 displays the service center interface 1520 again after the electronic device 100 receives the input (for example, tapping) of the user for the add-to-service center control 1514, the electronic device 100 may display the weather component 1512 on the service center interface 1520.

The following describes a display method for a card component provided in embodiments of this application.

FIG. 16 is a schematic flowchart of a display method for a card component according to an embodiment of this application.

As shown in FIG. 16, the method includes the following steps.

S1601: An electronic device displays a first interface on a desktop, where the first interface includes an icon of a first application.

For example, the first interface may be the interface 310 on the desktop shown in FIG. 4A. The icon of the first application may be an icon (for example, a weather application icon 311) on a page on which an application icon is placed on the desktop, or may be an icon (for example, a dial-up application icon 313) in a dock area. Alternatively, the first interface may be the interface 420 shown in FIG. 4F that is displayed after an application folder (for example, an application folder 1) on the desktop is opened. The icon of the first application may be an application icon (for example, the music application icon 421) included in the application folder. For specific content, refer to the foregoing embodiment, and details are not described herein again.

S1602: The electronic device receives a first sliding operation on the icon of the first application.

S1603: In response to the first sliding operation, the electronic device displays, in a floating manner, a first card component corresponding to the first application around the icon of the first application. The first card component includes first display information of a first function in the first application.

For example, the first application may be a weather application, and the first card component may be the weather component 411 shown in FIG. 4B. For another example, the first application may be a dial-up application, and the first card component may be the dial-up component 413 shown in FIG. 4C. For another example, the first application may be a music application, and the first card component may be the music component 422 shown in FIG. 4G. For specific content, refer to the foregoing embodiment, and details are not described herein again.

S1604: When the electronic device receives a first input for a first area on the first interface, the electronic device skips displaying the first card component. The first area does not overlap with a display area of the first card component.

Display of the first card component corresponding to the first application may be temporary. For example, when the electronic device receives an input for another area other than the first card component on the desktop, the electronic device may disable displaying the temporarily displayed first card component. In this way, it may be convenient for the user to quickly view a card component of an application, and the temporarily displayed card component may also be quickly closed.

In a possible implementation, the electronic device adds and displays the first card component on the desktop when the electronic device receives a second input. After the card component is fixedly added to a blank area on the desktop, if the electronic device receives an input by the user for another blank area, in this way, the user may quickly find, from the application icon, the card component corresponding to the application icon, or may quickly and fixedly add the temporarily displayed card component to the desktop.

The electronic device may add and display the first card component in a blank area on the first interface on the desktop. Before the first card component is added and displayed to the blank area on the first interface, no interface element such as an application icon, an application folder, a card component, or a text is displayed in the blank area on the first interface.

For example, the first interface may be the interface 610 on the desktop shown in FIG. 6B, the first card component may be the weather component 611, and the weather component 611 may be added to the blank area on the interface 610. For specific content, refer to the foregoing embodiment, and details are not described herein again.

Optionally, the electronic device may add and display the first card component in a blank area on a second interface on the desktop. Before the first card component is added and displayed to the blank area on the second interface, no interface element such as an application icon, an application folder, a card component, or a text is displayed in the blank area on the second interface.

For example, the second interface on the desktop may be the interface 630 shown in FIG. 6D when the desktop displays a page on which an application icon is placed on a last page. For specific content, refer to the foregoing embodiment, and details are not described herein again.

Optionally, the electronic device may newly create a third interface on the desktop, and add and display the first card component on the third interface.

The third interface may be newly created on a left page of the first interface, or newly created on a right page of the first interface. This is not limited. For example, the third interface may be the interface 640 shown in FIG. 6E.

In a possible implementation, when displaying the first card component on the first interface on the desktop in response to the first sliding operation, the electronic device may further display a first fixed control corresponding to the first card component. The second input may be an input for the first fixed control. For specific content, refer to the embodiments shown in FIG. 6A to FIG. 6E. Details are not described herein again.

In a possible implementation, a process in which the electronic device adds and displays the first card component on the desktop through the received second input may be: The electronic device may receive a first drag operation on the first card component; and when the electronic device drags the first card component to a second area on the desktop through the first drag operation, the electronic device adds and displays the first card component in the second area on the desktop. In this way, the user may add the card component that is temporarily displayed to a specified placement location on the desktop through one operation. This simplifies an operation step of adding the card component to the specified placement location on the desktop by the user.

For specific content, refer to the embodiments shown in FIG. 7A to FIG. 7C. Details are not described herein again.

The electronic device may further display a cancellation hot area on the desktop in a process of the first drag operation. When the electronic device drags the first card component to the cancellation hot area through the first drag operation, the electronic device cancels adding and displaying of the first card component on the desktop. In this way, in a process in which the user adds the temporarily displayed card component to the desktop through a drag operation, there may be an opportunity to cancel the return.

For specific content, refer to the embodiments shown in FIG. 7H to FIG. 7I. Details are not described herein again.

In a possible implementation, when a fifth card component is displayed in the second area, the electronic device may display a second card stacking component in the second area, where the second card stacking component includes the first card component and the fifth card component. In this way, a plurality of card components may be combined into one card stacking component and placed on the desktop. This saves use space on the desktop.

For example, the first card component may be the weather component 721 shown in FIG. 7D, and the fifth card component may be the clock component 722 in the embodiment shown in FIG. 7D. The second card stacking component may be the card stacking component 731 in the embodiment shown in FIG. 7F or FIG. 7G. For specific content, refer to the embodiments shown in FIG. 7D to FIG. 7G. Details are not described herein again.

In a possible implementation, a process in which the electronic device adds and displays the first card component on the desktop through the received second input may be: The electronic device receives a first touch-and-hold operation on the first card component; the electronic device displays a second fixed control in response to the first touch-and-hold operation; the electronic device receives a fourth input for the second fixed control; and in response to the fourth input, the electronic device adds and displays the first card component on the desktop.

For example, the first card component may be the weather component 811 in the embodiment shown in FIG. 8B, and the second fixed control may be the add-to-desktop control 813 in the embodiment shown in FIG. 8B. For specific content, refer to the embodiments in FIG. 8A to FIG. 8C. Details are not described herein again.

In a possible implementation, when the electronic device receives a third input for the first card component, the electronic device displays a fourth interface corresponding to the first function in the first application. In this way, the user may directly trigger, through the first card component, the electronic device to directly jump to display an interface of the first function in the first application. This simplifies an operation of opening the interface of the first function by the user.

Figure 4K:
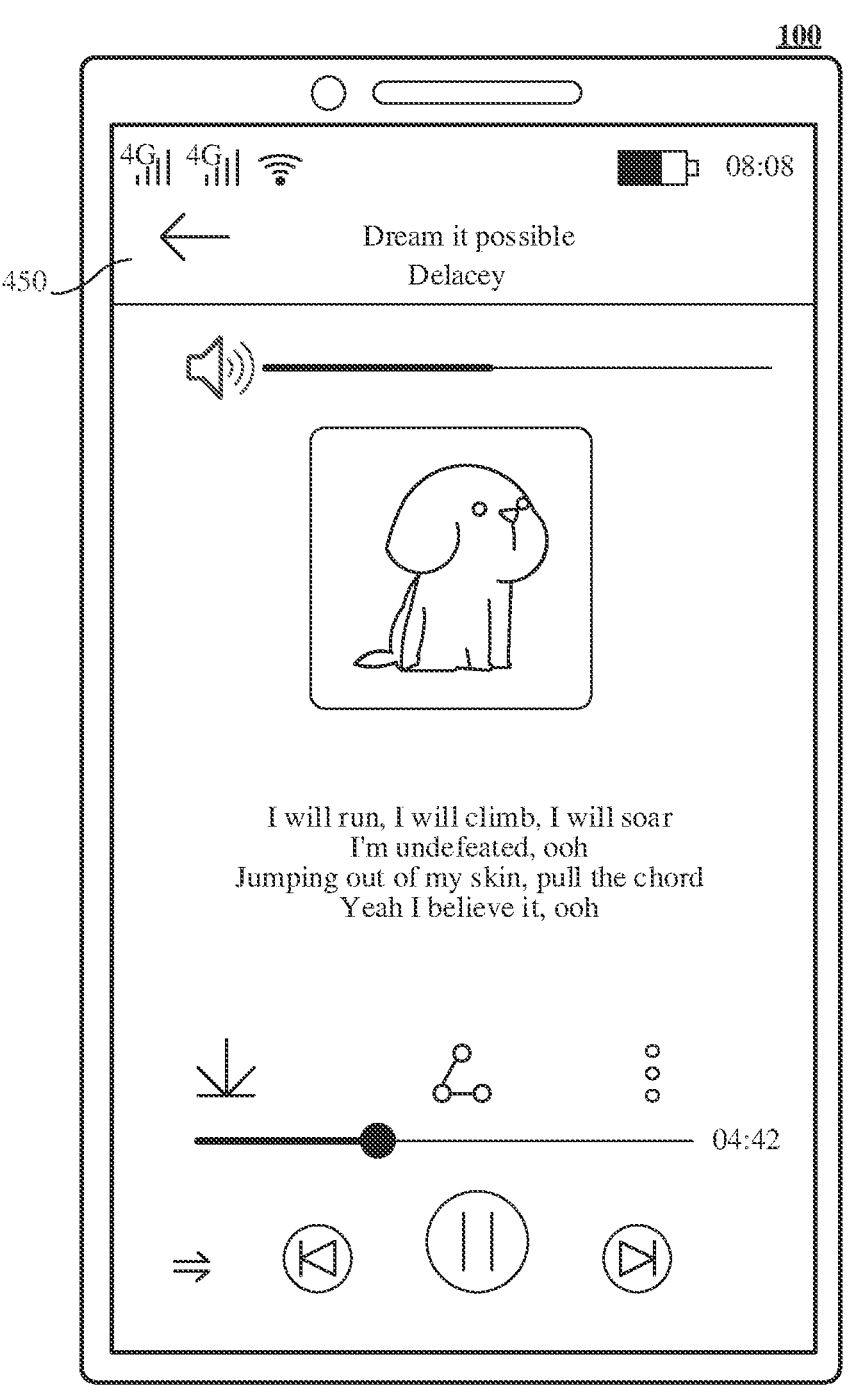

For example, the first application may be a music application, the first function may be a music playing function in the music application, and the fourth interface may be a music playing interface 450 corresponding to the music playing function in the embodiment shown in FIG. 4K. For specific content, refer to the foregoing embodiment, and details are not described herein again.

In a possible implementation, the first card component further displays and includes a first control. The electronic device receives a fifth input for the first control. In response to the fifth input, the electronic device controls the first application to perform a first control operation corresponding to the first control. In this way, the user directly controls, on the first card component, the first application to perform some control operations, without first invoking a control interface of these control operations, and then triggers the first application to perform these control operations. This simplifies operations performed by the user.

For example, the first card component may be the dial-up component 413 in the embodiment shown in FIG. 4D, and the first control may be the contact "dad" dial-up control 415. The first control operation may be a dial-up operation on the contact "dad". For specific content, refer to the foregoing embodiment, and details are not described herein again.

In a possible implementation, after the electronic device adds and displays the first card component on the desktop, the electronic device may receive a second drag operation of dragging the first card component displayed in the second area on the desktop to a third area on the desktop. The electronic device places the first card component from the second area to the third area in response to the second drag operation. In this way, it may be convenient for the user to adjust a display location of the card component on the desktop. This improves user experience.

For specific content, refer to the embodiments shown in FIG. 9A to FIG. 9C. Details are not described herein again.

In a possible implementation, after the electronic device adds and displays the first card component on the desktop, the electronic device receives a third drag operation on the first card component. The electronic device displays a deletion hot area on the desktop in a process of the third drag operation, where an end location of the third drag operation is in the deletion hot area. The electronic device removes the first card component from the desktop in response to the third drag operation. In this way, when the user does not want the card component that has been added on the desktop, the card component may be manually deleted.

For specific content, refer to the embodiments shown in FIG. 9D to FIG. 9E. Details are not described herein again.

In a possible implementation, after the electronic device adds and displays the first card component on the desktop, the electronic device may receive the second touch-and-hold operation on the first card component. The electronic device may display a removal control corresponding to the first card component in response to the second touch-and-hold operation. After the electronic device receives a sixth input for the removal control, the electronic device removes the first card component from the desktop. In this way, when the user does not want the card component that has been added on the desktop, the card component may be manually deleted.

For specific content, refer to the embodiments shown in FIG. 9F to FIG. 9H. Details are not described herein again.

In a possible implementation, after the electronic device displays, in a floating manner around an area of the icon of the first application, the first card component corresponding to the first application, the electronic device displays the first interface on the desktop after receiving a seventh input of switching, by a user, the first card component corresponding to the first application to a second card component. The electronic device receives a second sliding operation on the icon of the first application. In response to the second sliding operation, the electronic device displays, in a floating manner, the second card component corresponding to the first application around the icon of the first application, where a style of the second card component is different from a style of the first card component. In this way, the user may be allowed to select a favorite style of the card component.

For specific content, refer to the embodiments shown in FIG. 10A to FIG. 10F. Details are not described herein again.

In a possible implementation, after the electronic device displays, in a floating manner around the area of the icon of the first application, the first card component corresponding to the first application, the electronic device displays the first interface on the desktop after receiving an eighth input of switching, by a user, the first display information displayed in the first card component to the second display information. The electronic device receives a third sliding operation on the icon of the first application; and in response to the third sliding operation, the electronic device displays, in a floating manner, the first card component corresponding to the first application around the icon of the first application, and displays the second display information on the first card component. In this way, it is convenient for the user to switch display content in the card component.

For specific content, refer to the embodiments shown in FIG. 12A to FIG. 12G. Details are not described herein again.

In a possible implementation, the first interface further includes an application folder, the application folder includes an icon of a second application and an icon of a third application, and the electronic device may receive a fourth sliding operation on the application folder. In response to the fourth sliding operation, the electronic device displays, in a floating manner, a first card stacking component corresponding to the application folder around the application folder, where the first card stacking component includes a third card component corresponding to the second application and a fourth card component corresponding to the third application. The third card component and the fourth card component may be switched to be displayed on the first card stacking component. In this way, use space on the interface may be saved.

For example, the first interface may be the interface 430 on the desktop shown in FIG. 4H, the application folder may be the application folder 2 on the interface 430, the second application may be a clock application in the application folder 2, and the third application may be a music application in the application folder 2. The first card stacking component may be the card stacking component 440 shown in FIG. 4I or FIG. 4J, the third card component may be the clock component 443, and the fourth card component may be the music component 444. For specific content, refer to the embodiments shown in FIG. 4H to FIG. 4K. Details are not described herein again.

In embodiments of this application, when the electronic device displays, in a floating manner, the first card component corresponding to the first application around the icon of the first application, the electronic device skipping displaying an application name of an application icon covered by the first card component, and/or the application icon covered by the first card component. For specific content, refer to the embodiments shown in FIG. 5A to FIG. 5N. Details are not described herein again.

Embodiments of this application provide a display method for a card component. An electronic device may temporarily display, in a floating manner, a card component corresponding to a first application around an icon of the first application in response to a sliding operation (for example, upward sliding) performed by a user on the icon of the first application on a desktop, where display information of a first function in the first application is displayed on the card component. When the electronic device receives an input for another area other than the card component on the desktop, the electronic device may disable displaying the temporarily displayed card component. The electronic device may alternatively add and display the temporarily displayed card component in a specified area on the desktop. In this way, the electronic device may be quickly triggered, on the desktop through an input operation of the user, to display a card component corresponding to an application, so that the user may quickly view the card component, and a display layout of application icons or card components on the desktop is not disrupted.

The foregoing embodiments may be used separately, or may be used in combination to implement different technical effects.

In the foregoing embodiments provided in this application, the methods provided in embodiments of this application are described from a perspective in which an electronic device is used as an execution entity. To implement functions in the foregoing methods provided in embodiments of this application, the electronic device and the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Embodiments of this application further provide an electronic device, including: a display screen, a processor, a memory, an application program, and a computer program. The foregoing components may be connected through one or more communication buses. The one or more computer programs are stored in the memory and are configured to be executed by the one or more processors. The one or more computer programs include instructions, and the instructions may be used to enable the electronic device to perform the steps of the interface display method in the foregoing embodiments.

For example, the processor may be specifically the processor 110 shown in FIG. 1, the memory may be specifically the internal memory 120 shown in FIG. 1 and/or an external memory connected to the electronic device, and the display screen may be specifically the display screen 130 shown in FIG. 1. This is not limited in embodiments of this application.

In addition, embodiments of this application further provide a graphical user interface (graphical user interface, GUI) on an electronic device. The graphical user interface specifically includes a graphical user interface displayed when the electronic device performs the foregoing method embodiments.

As used in the foregoing embodiments, based on the context, the terms "when" or "after" may be interpreted to mean "if . . . " or "after" or "in response to determining . . . " or "in response to detecting . . . ". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semi-conductor medium (for example, a solid-state drive Solid-State Disk (SSD)), or the like. In a case in which no conflict occurs, the solutions in the foregoing embodiments may be combined for use.

What is claimed is:

1. An electronic device, comprising:
one or more processors, a display screen, and one or more memories, wherein the display screen and the one or more memories are coupled to the one or more processors, the one or more memories store computer program code, and the computer program code comprises computer instructions, and when the one or more processors execute the computer instructions, the electronic device is enabled to perform:
displaying a first interface on a desktop, wherein the first interface comprises an icon of a first application;
receiving a first operation on the icon of the first application;
in response to receiving the first operation, displaying a first card component corresponding to the first application in a floating manner, and displaying a first fixed control corresponding to the first card component, wherein the first card component comprises first display information of a first function in the first application; and
stopping displaying the first card component when receiving a first input while displaying the first card component in the floating manner, and adding and displaying the first card component on the desktop when receiving a second input while displaying the first card component in the floating manner, wherein the second input is an input for the first fixed control; and
wherein adding and displaying the first card component on the desktop comprises:
adding and displaying the first card component in a blank area on the first interface on the desktop or a blank area on a second interface on the desktop; or
creating a third interface on the desktop, and adding and displaying the first card component on the third interface.

2. The electronic device according to claim 1, wherein when the one or more processors execute the computer instructions, the electronic device is enabled to further perform:
when receiving a third input for the first card component, displaying a fourth interface corresponding to the first function in the first application.

3. The electronic device according to claim 1, wherein when the one or more processors execute the computer instructions, the electronic device is enabled to further perform:
after adding and displaying the first card component on the desktop, receiving a second drag operation of dragging the first card component displayed in a second area on the desktop to a third area on the desktop; and
placing the first card component from the second area to the third area in response to the second drag operation.

4. The electronic device according to claim 1, wherein when the one or more processors execute the computer instructions, the electronic device is enabled to further perform:

after adding and displaying the first card component on the desktop, receiving a second touch-and-hold operation on the first card component;

displaying a removal control corresponding to the first card component in response to the second touch-and-hold operation;

receiving a sixth input for the removal control; and removing the first card component from the desktop in response to the sixth input.

5. The electronic device according to claim 1, wherein when the one or more processors execute the computer instructions, the electronic device is enabled to further perform:

after displaying the first card component corresponding to the first application, displaying the first interface on the desktop after receiving a seventh input of switching, by a user, the first card component corresponding to the first application to a second card component;

receiving a second operation on the icon of the first application; and in response to receiving the second operation, displaying, in the floating manner, the second card component corresponding to the first application around the icon of the first application, wherein a style of the second card component is different from a style of the first card component.

6. The electronic device according to claim 1, wherein when the one or more processors execute the computer instructions, the electronic device is enabled to further perform:

after displaying the first card component corresponding to the first application, displaying the first interface on the desktop after receiving an eighth input of switching, by a user, the first display information displayed in the first card component to second display information;

receiving a third operation on the icon of the first application; and in response to receiving the third operation, displaying, in the floating manner, the first card component corresponding to the first application around the icon of the first application, and displaying the second display information on the first card component.

7. The electronic device according to claim 1, wherein adding and displaying the first card component on the desktop comprises:

adding and displaying the first card component in the blank area on the first interface on the desktop or the blank area on the second interface on the desktop.

8. The electronic device according to claim 1, wherein adding and displaying the first card component on the desktop comprises:

creating the third interface on the desktop, and adding and displaying the first card component on the third interface.

9. A method for an electronic device, the method comprising:

displaying a first interface on a desktop, wherein the first interface comprises an icon of a first application;

receiving a first operation on the icon of the first application;

in response to receiving the first operation, displaying a first card component corresponding to the first application in a floating manner, and displaying a first fixed control corresponding to the first card component, wherein the first card component comprises first display information of a first function in the first application; and stopping displaying the first card component when receiving a first input while displaying the first card component in the floating manner; and adding and displaying the first card component on the desktop when receiving a second input while displaying the first card component in the floating manner, wherein the second input is an input for the first fixed control; and wherein adding and displaying the first card component on the desktop comprises:

adding and displaying the first card component in a blank area on the first interface on the desktop or a blank area on a second interface on the desktop; or creating a third interface on the desktop, and adding and displaying the first card component on the third interface.

10. The method according to claim 9, further comprising:

when receiving a third input for the first card component, displaying a fourth interface corresponding to the first function in the first application.

11. The method according to claim 9, wherein after adding and displaying the first card component on the desktop, the method further comprises:

receiving a second drag operation of dragging the first card component displayed in a second area on the desktop to a third area on the desktop; and placing the first card component from the second area to the third area in response to the second drag operation.

12. The method according to claim 9, wherein after adding and displaying the first card component on the desktop, the method further comprises:

receiving a second touch-and-hold operation on the first card component;

displaying a removal control corresponding to the first card component in response to the second touch-and-hold operation;

receiving a sixth input for the removal control; and removing the first card component from the desktop in response to the sixth input.

13. The method according to claim 9, wherein after displaying the first card component corresponding to the first application, the method further comprises:

displaying the first interface on the desktop after receiving a seventh input of switching, by a user, the first card component corresponding to the first application to a second card component;

receiving a second sliding operation on the icon of the first application; and in response to receiving the second sliding operation, displaying, by the electronic device in the floating manner, the second card component corresponding to the first application around the icon of the first application, wherein a style of the second card component is different from a style of the first card component.

14. The method according to claim 9, wherein after displaying the first card component corresponding to the first application, the method further comprises:

displaying the first interface on the desktop after receiving an eighth input of switching, by a user, the first display information displayed in the first card component to second display information;

receiving a third operation on the icon of the first application; and in response to receiving the third operation, displaying, by the electronic device in the floating manner, the first card component corresponding to the first application around the icon of the first application, and displaying the second display information on the first card component.

15. A non-transitory computer storage medium, comprising computer instructions, wherein when the computer instructions are run on an electronic device, the electronic device is enabled to perform:

displaying a first interface on a desktop, wherein the first interface comprises an icon of a first application;

receiving a first operation on the icon of the first application;

in response to receiving the first operation, displaying a first card component corresponding to the first application in a floating manner, and displaying a first fixed control corresponding to the first card component, wherein the first card component comprises first display information of a first function in the first application; and stopping displaying the first card component when the electronic device receives a first input while displaying the first card component in the floating manner; and adding and displaying the first card component on the desktop when the electronic device receives a second input while displaying the first card component in the floating manner, wherein the second input is an input for the first fixed control; and wherein adding and displaying the first card component on the desktop comprises:

adding and displaying the first card component in a blank area on the first interface on the desktop or a blank area on a second interface on the desktop; or creating a third interface on the desktop, and adding and displaying the first card component on the third interface.

16. The non-transitory computer storage medium according to claim 15, wherein when the computer instructions are run on the electronic device, the electronic device is enabled to further perform:

when receiving a third input for the first card component, displaying a fourth interface corresponding to the first function in the first application.

17. The non-transitory computer storage medium according to claim 15, wherein when the computer instructions are run on the electronic device, the electronic device is enabled to further perform:

after adding and displaying the first card component on the desktop, receiving a second drag operation of dragging the first card component displayed in a second area on the desktop to a third area on the desktop; and placing the first card component from the second area to the third area in response to the second drag operation.

18. The non-transitory computer storage medium according to claim 15, wherein when the computer instructions are run on the electronic device, the electronic device is enabled to further perform:

after adding and displaying the first card component on the desktop, receiving a second touch-and-hold operation on the first card component;

displaying a removal control corresponding to the first card component in response to the second touch-and-hold operation;

receiving a sixth input for the removal control; and removing the first card component from the desktop in response to the sixth input.

19. The non-transitory computer storage medium according to claim 15, wherein when the computer instructions are run on the electronic device, the electronic device is enabled to further perform:

after displaying the first card component corresponding to the first application, displaying the first interface on the desktop after receiving a seventh input of switching, by a user, the first card component corresponding to the first application to a second card component;

receiving a second operation on the icon of the first application; and in response to receiving the second operation, displaying, in the floating manner, the second card component corresponding to the first application around the icon of the first application, wherein a style of the second card component is different from a style of the first card component.

20. The non-transitory computer storage medium according to claim 15, wherein when the computer instructions are run on the electronic device, the electronic device is enabled to further perform:

after displaying the first card component corresponding to the first application, displaying the first interface on the desktop after receiving an eighth input of switching, by a user, the first display information displayed in the first card component to second display information;

receiving a third operation on the icon of the first application; and in response to receiving the third operation, displaying, in the floating manner, the first card component corresponding to the first application around the icon of the first application, and displaying the second display information on the first card component.

* * * * *